United States Patent
Simpson et al.

(10) Patent No.: US 9,292,254 B2
(45) Date of Patent: Mar. 22, 2016

(54) INTERACTIVE USER INTERFACE FOR AN INTELLIGENT ASSISTANT

(71) Applicant: Maluuba Inc., Waterloo (CA)

(72) Inventors: James Simpson, Waterloo (CA); Sam Pasupalak, Waterloo (CA); Mohamed Musbah, Waterloo (CA); Jennifer Lee, Toronto (CA)

(73) Assignee: Maluuba Inc., Waterloo (CA)

( * ) Notice: Subject to any disclaimer, the term of this patent is extended or adjusted under 35 U.S.C. 154(b) by 30 days.

(21) Appl. No.: 14/278,283

(22) Filed: May 15, 2014

(65) Prior Publication Data

US 2014/0343950 A1    Nov. 20, 2014

Related U.S. Application Data

(60) Provisional application No. 61/823,557, filed on May 15, 2013.

(51) Int. Cl.
| | |
|---|---|
| G10L 21/00 | (2013.01) |
| G06F 3/16 | (2006.01) |
| G06F 17/30 | (2006.01) |
| G10L 15/18 | (2013.01) |
| G10L 15/22 | (2006.01) |
| G10L 15/26 | (2006.01) |

(52) U.S. Cl.
CPC .......... *G06F 3/167* (2013.01); *G06F 17/30867* (2013.01); *G10L 15/22* (2013.01); *G10L 15/1822* (2013.01); *G10L 15/26* (2013.01); *G10L 2015/221* (2013.01)

(58) Field of Classification Search
CPC ....... G10L 15/26; G10L 15/22; G10L 15/063; G10L 15/18; G10L 15/24; G10L 21/06; G10L 15/265; G10L 21/10; G10L 15/01; G06F 17/24; G06F 17/273; H04N 21/42203; H04M 2201/40
USPC ........ 704/235, 215, E15.043, E15.04, 275, 9, 704/E21.019, 257, E15.001, 251
See application file for complete search history.

(56) References Cited

U.S. PATENT DOCUMENTS

| | | | | |
|---|---|---|---|---|
| 5,031,113 | A  * | 7/1991 | Hollerbauer | .................. 704/235 |
| 6,161,087 | A  * | 12/2000 | Wightman et al. | ........... 704/215 |
| 6,360,237 | B1 * | 3/2002 | Schulz et al. | ................. 715/255 |

(Continued)

*Primary Examiner* — Marivelisse Santiago Cordero
*Assistant Examiner* — Stephen Brinich
(74) *Attorney, Agent, or Firm* — Perry + Currier Inc.

(57) ABSTRACT

A system, method and computer program for performing voice commands on a mobile device and presenting the results on an interactive timeline is disclosed. A user may utter a voice command into the microphone of their mobile device while an application is running. The voice command is processed to derive the intention of the user, specifically by determining the domain, at least one task and at least one parameter for the task from the voice command. A services component performs the task identified and presents the results on the mobile device screen. In various embodiments, the results are presented on a timeline and may be grouped together by domains and sorted by the time that the results were obtained. A search history view may also be viewed that includes search results sorted chronologically each of which is represented graphically by an icon that represents the category of each search. When a user utters a voice command, the text representation is displayed together with an edit button, a resay button, and a progress bar. A user may modify the text representation at any time while the natural language processing is being performed.

9 Claims, 54 Drawing Sheets

(56) References Cited

U.S. PATENT DOCUMENTS

| | | | |
|---|---|---|---|
| 6,424,357 B1* | 7/2002 | Frulla et al. | 715/728 |
| 6,871,179 B1* | 3/2005 | Kist et al. | 704/275 |
| 6,920,425 B1* | 7/2005 | Will et al. | 704/275 |
| 2006/0080102 A1* | 4/2006 | Roy et al. | 704/260 |
| 2006/0253280 A1* | 11/2006 | Harband et al. | 704/223 |
| 2008/0167879 A1* | 7/2008 | Du Bois | 704/278 |
| 2011/0010174 A1* | 1/2011 | Long et al. | 704/235 |
| 2011/0099011 A1* | 4/2011 | Jaiswal | 704/235 |
| 2013/0054240 A1* | 2/2013 | Jang et al. | 704/235 |
| 2013/0117027 A1* | 5/2013 | Choi et al. | 704/275 |

* cited by examiner

INTERACTIVE USER INTERFACE FOR AN INTELLIGENT ASSISTANT

BACKGROUND

Mobile computing devices such as smartphones and tablet computers are continuously evolving into more complex devices with increasing computational and storage capacity. As mobile devices become more powerful, users are storing increasing amount of data on their mobile computing devices, executing an increasing number of applications on their mobile computing devices, and accessing an increasing number of services on their mobile computing devices. The increasing amount of applications and services used to find information in a particular domain is making it increasingly difficult for users to retrieve the information they desire. A user must often navigate through a series of menus and screens associated with different applications or services to find and retrieve information that a user desires.

Many applications have built-in search mechanisms to search for information associated with the application. For example, some applications specialize in finding information related to certain domains such as restaurants, music, sports, stocks and so forth. Furthermore, even when a user is able to find useful results, it is often difficult to organize and retrieve the results when a user wants to view results at a later time A user is often required to relaunch the particular application that previously found information for the user, navigate a history page and select the desired entry if the user can find it. History pages often don't summarize results so finding the desired entry from a previous search is often a challenge.

Furthermore, although voice functionality is included in some applications, such functionality is often cumbersome and frustrating for many users. Users are often reluctant to utter voice commands in a natural way, and instead, attempt to modify their natural way of speaking so that the application on the mobile computing device will accurately derive their intention.

SUMMARY

Embodiments disclose a method, non-transitory computer readable storage medium and a system for performing commands and presenting search results associated with applications and services on a computing device such as a smartphone. The search results are provided by applications or services that are configured to retrieve and present search results to a user for a specific domain.

In one embodiment, the method includes the steps of receiving a command from the user of the computing device, the command including at least one command and being related to a domain and at least one task. The command may be a voice command uttered by the user such as "Find me a Chinese restaurant in San Francisco". The domain, task and at least one parameter are identified from the command, and suitable services that are configured to perform the command are also identified. At least one service is selected and the command is performed by the service. In various embodiments, the command is executed by calling an application programming interface made available by a third-party. The service returns results once the command is performed and a results page is generated and presented to the user on the display screen of the mobile device. At least a portion of the results are stored so that the user may access the results at a later time if desired.

The results are organized on a results history page in which each result is visually indicated by a graphical representation identifying the domain of each result. Each result also includes a summary of details for the result, formatted to optimize the real estate available on the screen of the particular mobile computing device. The summary may include the time that the command was performed, the location and time of specific events such as sports games, the number of results that match a query such as "Chinese restaurants in San Francisco" and so forth. The results history page is displayed on the screen of the mobile computing device when a user input is received to show the results history page.

When a user is viewing the results history page, and in response to receiving a user input for selecting one of the results on the results history page, the results page associated with the selected item is displayed on the screen of the mobile computing device.

The command inputted by the user may be inputted by any input device such as a voice command with a microphone, a touchscreen, keyboard, mouse, and so forth. In cases where the inputted command is a voice command uttered by the user, natural language processing is performed on the voice command to identify the domain, the at least one parameter, and the at least one task to which the voice command relates.

In some embodiments, the results are presented on the history results page in chronological or reverse-chronological order. In some embodiments, the results are grouped by domain and/or ordered by time.

This summary is provided to introduce a selection of representative concepts in a simplified form that are further described below in the Description. This Summary is not intended to identify key features or essential features of the claimed subject matter, nor is it intended to be used in any way that would limit the scope of the claimed subject matter.

Other aspects and advantages of the invention will become apparent from the following detailed description taken in conjunction with the accompanying drawings which illustrate, by way of example, the principles of the invention.

BRIEF DESCRIPTION OF THE DRAWINGS

The disclosed embodiments have other advantages and features which will be more readily apparent from the detailed description, the appended claims, and the accompanying claims, in which:

For convenience, like reference numerals may refer to like parts and components in the various drawings.

DESCRIPTION OF EXAMPLE EMBODIMENTS

Figure 1:
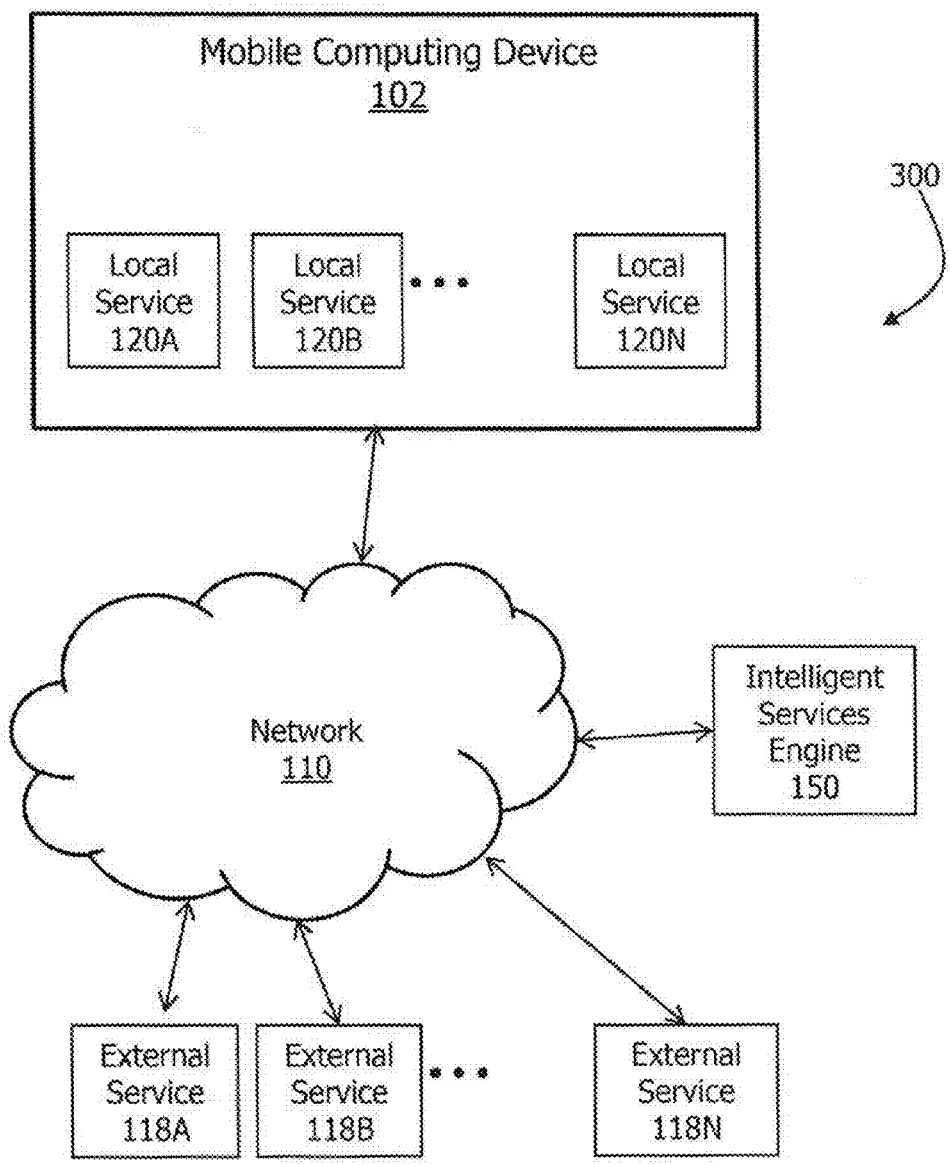
FIG. 1 is a block diagram of an exemplary conversational system in a networked environment for performing services and obtaining search results according to one embodiment.

The Figures (FIGS.) and the following description relate to preferred embodiments by way of illustration only. It should be noted that from the following discussion, alternative embodiments of the structures, components and methods disclosed herein will be readily recognized as viable alternatives that may be employed without departing from the principles disclosed herein.

As will be appreciated by one of skill in the art, the present invention may be embodied as a method, system, apparatus or computer program product. Accordingly, the present invention may take the form of an entirely hardware embodiment, an entirely software embodiment (including firmware, resident software, micro-code, etc.) or an embodiment combining software and hardware aspects all generally referred to herein as a "circuit", "module", "library" and the like. Furthermore, the present invention may take the form of a computer program product on a computer-usable storage medium having computer-usable program code embodied in the medium.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (and method) for the purposes of illustration only. One skilled in the art will readily recognize from the following description that alternative embodiments of structures, components and methods illustrated herein may be employed without departing from the principles described herein.

Embodiments disclosed include a method, a device, a system and a non-transitory computer readable storage medium for enhancing user experience associated with searching for and retrieving information associated with one or more applications/services on a computing device 102. The result of a particular search is organized on a results history page and is grouped by the domain to which a search relates and/or ordered by time (chronologically or reverse-chronologically). Each search result includes a visual representation (such as a graphical icon and/or color coding) and additional details related to the search result. Additional details may include the time that the search was performed, an indication of the service that was called to perform the search, and/or a summary of the results, as well as other information. A user may click on a part of a particular result which will direct the user to the original results screen that was shown to the user after the command was performed.

As an example, a user may perform a search such as "When are the Yankees playing next?" using an application 201 such as an intelligent assistant configured to find information using a variety of services and/or applications. The search may be entered by a touchscreen, a keyboard, and/or may be uttered by a user in the form of a voice command. The voice command in this case includes information about the domain to which the search relates, the task the user would like performed, as well as parameters that are included for finding specific information desired by the user. In this specification, a domain refers to a general field or classification of information. In various embodiments, the example query may be classified as belonging to the domain of SPORTS. Domain classification may be performed for any command by the application 201 so that an appropriate service may be identified that is capable of finding the information that the user wants. The command is analyzed to obtain the specific task that the user intends to have performed, in this case, finding the next Yankees game. Parameter information is also extracted from the command. In this case, some of the parameters that may be extracted from the command include the name of the team (i.e. the New York Yankees) and the date of the game (i.e. closest game in the future to the present time). The intelligent assistant 201 may then create a software object and/or data structure containing the domain, task and parameters that were derived from the command and call an appropriate service that is configured to find and return information about sports games.

In various embodiments, the invention is implemented on a mobile computing device 102 that can be carried around by a user. The mobile computing device 102 includes, amongst others, an MP3 player, a cellular phone, a smartphone, a PDA (Personal Digital Assistant), a set-top box, a video game console, and so forth. The invention may also be implemented with other hardware comprising a computer processor such as personal computers, notebook computers, appliances, etc.

Applications are computer programs that interact with users to allow the users to perform desired tasks on their mobile computing device. The application programs may include, among others, web browsers, media players, calendars, time and reminder applications, search programs specializing in specific domains such as restaurants and movie tickets, and so forth. Two or more applications may operate in conjunction to perform a desired task on the mobile computing device.

Services are a group of data and/or functions accessible by applications. The services are often managed independently of the applications. The services provide various useful data and perform various functions in conjunction with the applications. The services may be implemented locally on the mobile computing device or remotely in a computing device separate from the mobile computing device. An application may call external and internal services via pre-determined interface such as an application programming interface (API). When used in the context of web development, an API is typically defined as a set of Hypertext Transfer Protocol (HTTP) request messages, along with a definition of the structure of response messages, which is usually in an Extensible Markup Language (XML) or JavaScript Object Notation (JSON) format. A "Web API" is often used as a synonym for web service, and include Simple Object Access Protocol (SOAP) based services as well as direct Representational State Transfer (REST) style communications. Web APIs allow the combination of multiple services into new applications known as mashups.

Services that may be used with the invention include, among others, web mapping services, traffic information services, public transit services, contact management services, calendar services, news services, business finder services, global positioning system (GPS) services, and so forth. Functions conventionally provided by applications may be moved to services where the applications provided basic user interfaces while the service performs the bulk of the functions. For example, an application 201 may perform functions of receiving user inputs, deriving the intent of the user, identifying and calling an appropriate services to accomplish a command according to the derived intent of the user, and generating output screen views while a contact information services (for example) searches contacts, manages contacts, and retrieves contact information requested from the application.

A data entry is a piece of information associated with an application or service. The data entry includes, among others, a file, an entry in a database, and a string of characters in a menu or parameter setting of an application or a service. Each data entry may be associated with one or more applications or services.

FIG. 1 is a schematic diagram illustrating the network architecture of the mobile computing device 102 used as part of a conversational system 300 environment, according to one embodiment. The mobile computing device 102 accesses one or more remote services 118*a* through 118*n* (hereinafter, collectively referred to as "remote services 120") and an intelligent services engine 150 via a network 110 such as the Internet. The network 110 may be implemented using any conventional methods using wireless and wired communications. The mobile computing device 102 also loads and executes local services 120*a* through 120*n* (hereinafter, collectively referred to as "local services 118").

The network architecture illustrated in FIG. 1 is advantageous compared to a stand-alone mobile computing device where all services are implemented on the mobile computing device where all services are implemented on the mobile computing device because various components and functions implemented on the mobile computing device 102 can instead be ported to other computing device coupled to the network 110. Instead of using its own resources to perform the functions, the mobile computing device 102 may communicate with other computing devices over the network 110 to perform functions related to searches and/or commands on the other computing devices. In this way, the mobile computing device 102 may be made light and compact because less software and hardware components may be loaded and executed on the mobile computing device 102.

The local services 120 or external services 118 are accessed via applications executed on the mobile computing device 102 to perform functions requested by the user as described with reference to FIG. 3. The local services 120 such as a GPS service, an calendar service, and so forth rely on data and functionality stored on the mobile computing device to provide services. The operating system of the mobile computing device 102 may provide an API to access the local services 120 desire by the user and/or requested by an application. In contrast, remote services 118 such as a web mapping service, require access to a network (e.g. the Internet) and external computing devices to provide its services.

The intelligent services engine 150 provides functionality relating to interpreting the desired intent of the user from user inputs (e.g. voice commands) to mobile computing device 102, identifying appropriate services to accomplish the desired intent of the user, and managing service requests with internal and external services 120,118. The intelligent services engine 150 may be viewed as a particular type of remote service 118 that provides functionality to receive user input, interpret user intent from the user input, and, among other functionality, to accomplish what the user wants by interfacing with appropriate services 118, 120. In some embodiments, intelligent services engine 150 is not entirely a remote service but may also reside partly or entirely on mobile computing device 102. Alternatively, the data and/or results provided by intelligent services engine 150 may be cached on the mobile computing device 102 to improve speed and so that the mobile computing device 102 can perform operations when network access is unavailable.

Architecture of Example Mobile Computing Device

Figure 2:
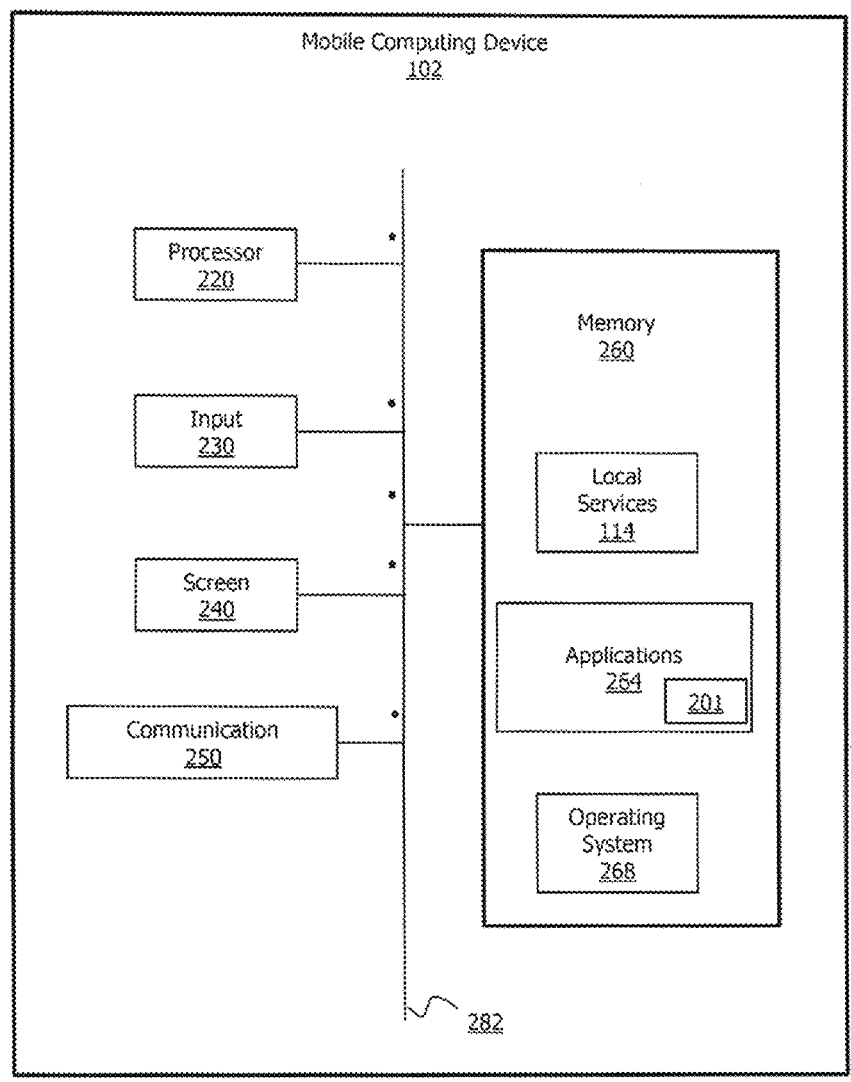
FIG. 2 is a block diagram illustrating a mobile computing device according to one embodiment.

FIG. 2 illustrates one embodiment of the mobile computing device 102 with network functionality that may be used with the conversational system 300. The mobile computing device 102 may access the network 110 to place or receive telephone calls, to send and receive text messages, as well as exchange other types of data. For ease of understanding and explanation, the following embodiments are described below using a mobile computing device 102 with telephone functionality as an example. The principles disclosed herein, however, may be applied in other types of mobile computing devices.

The mobile computing device 102 includes, among others, a processor 220, input devices 230, a screen 240, a communication module 250, and a memory 260. The components of the mobile computing device 102 communicate via a bus 282. The processor 220 executes instructions stored in the memory 260 to perform various types of s on the mobile computing device 102. Although FIG. 2 illustrates only one processor 220, multiple processors may be used in the mobile computing device 102.

The input devices 230 receive various user inputs and detect user actions on the mobile computing device 102. The input devices 230 may include, among others, one or more switches, sliders, motion sensors, a touch screen 240, a microphone and so forth.

The screen 240 of the mobile computing device 102 may be implemented using various display technology such as liquid crystal display (LCD), organic light-emitting diode (OLED), light-emitting diode display (LED), electroluminescent displays (ELDs), bistable liquid crystal displays, cholestric displays, and filed emission displays (FEDs). The screen 240 displays various screen views associated with applications or services as well as windows associated with search operation.

The communication module 250 communicates with the network 110 via conventional wired or wireless protocols including, among others, Bluetooth, Wireless Fidelity (WiFi), General Packet Radio Service (GPRS), third-generation (3G) mobile, High Speed Download Packet Access (HSDPA), High Speed Uplink Packet Access (HSUPA), Worldwide Interoperability for Microwave Access (WiMAX) and other technologies currently available or under development. In one embodiment, two or more distinct communication modules may be provided to communicate with the same or different network via multiple protocols. For example, the mobile computing device 102 may include a Bluetooth communication module for short range-communication and a 3G communication module for long-range communication.

The memory 260 may be implemented as any conventional data memory including, among others, various types of volatile or non-volatile memory. Two or more types of memory may also be used in conjunction. Further, removable memory such as memory stick may also be used.

The memory 260 includes software components including among others, local services 114, applications 264, and an operating system 268. The local services 114 are accessed by one or more applications 264 to provide various services to the user. In one embodiment, one or more local services 114 include or are associated with a database for storing data entries. The interoperation between the local services 114 and the applications 264 is described below in detail with reference to FIG. 3. The operating system 268 manages and coordinates resources accessed by the applications 264. In practice, a user of the mobile device 102 accesses intelligent services engine 150 via a user interface provided by one of the applications 264 (in particular application 201). FIGS. 10-43 illustrate example user interface screens that may be displayed by one or more of the applications 264 to receive user input and to present and organize search results.

Example Search Operation Mechanism

Figure 4:
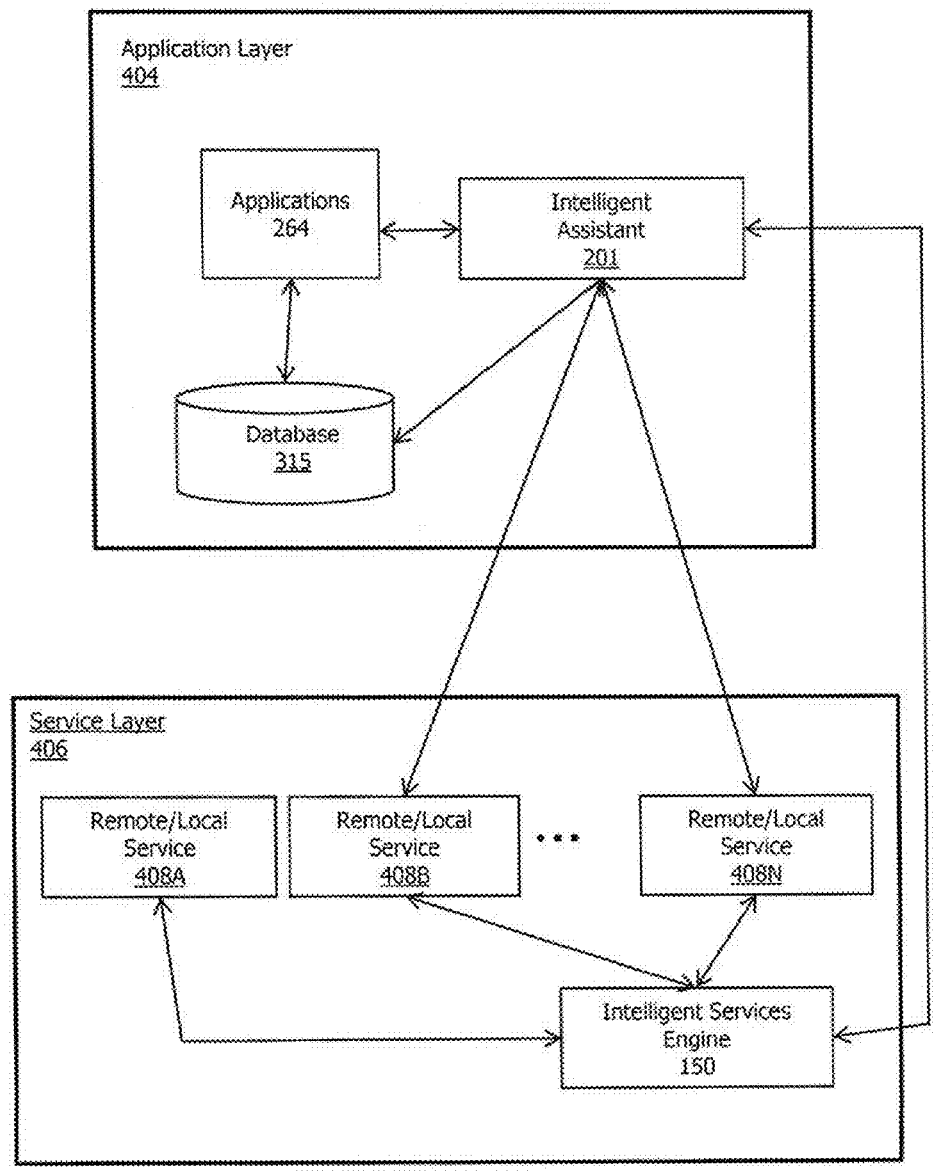
FIG. 4 is a conceptual diagram illustrating interoperation between an application layer and a service layer, according to one embodiment.
Figure 5:
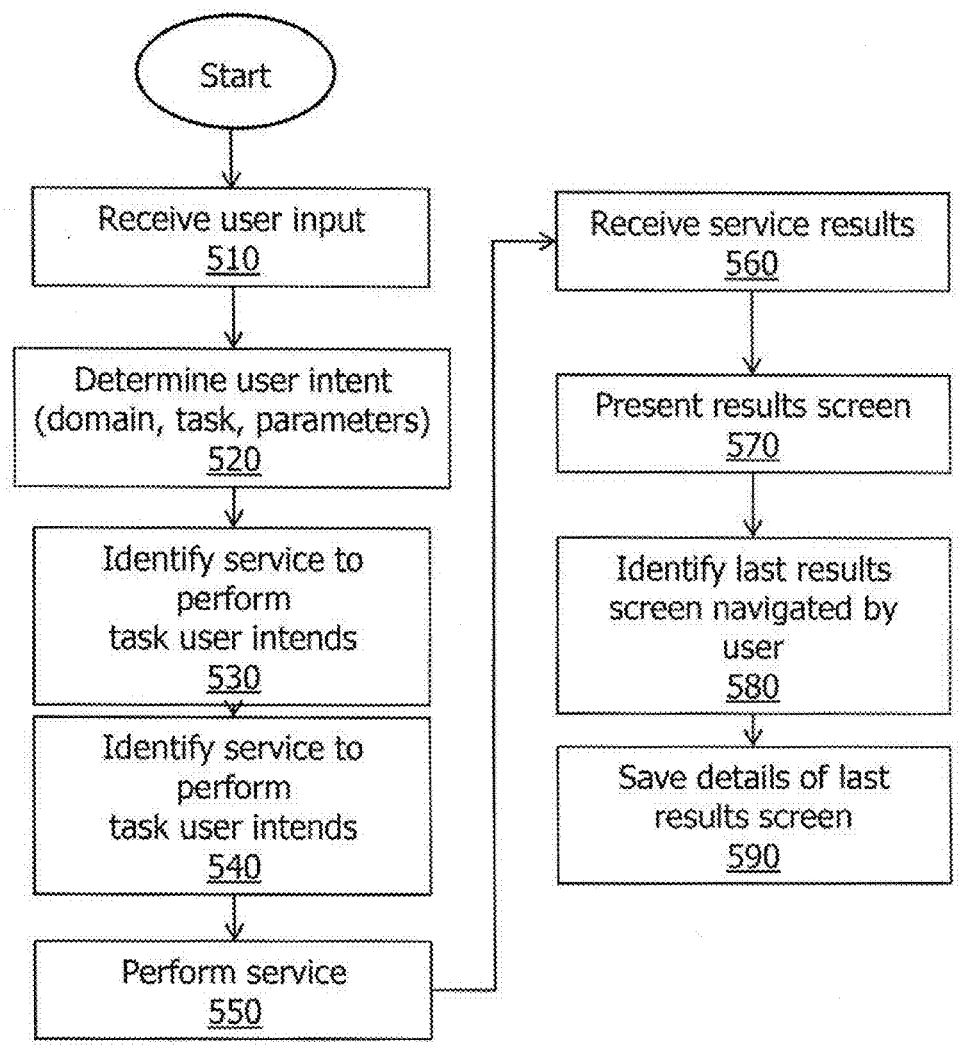
FIG. 5 is a flow chart illustrating operations (methods) for performing commands and saving results for display on an exemplary user interface.

FIG. 4 is a conceptual diagram illustrating interoperation between applications and services, according to one embodiment. An application layer 404 includes applications 264, in particular, intelligent assistant 201 allows users to access and receive data from various remote/local services 408A through 408N (hereinafter referred to as "remote/local services 408") in service layer 406.

In various embodiments, application 201 (also referred to herein as intelligent assistant 201) may act as an interface to allow users to access remote/local services via an intelligent services engine 150 by providing input (such as voice queries) to intelligent assistant 201. The intelligent service engine 150 is a special type of application dedicated to deriving user intent from the user input and performing searches on data associated with the remote/local services 408 according to the derived user intent.

The intelligent assistant 201 (i.e. a particular type of application on mobile computing device 102) operates in conjunction with the intelligent services engine 150 to organize and select the search result for presentation to the user. The search results from the remote/local services 408A may include a very large number of hits matching the derived intent of the user.

General System Architecture

Figure 3:
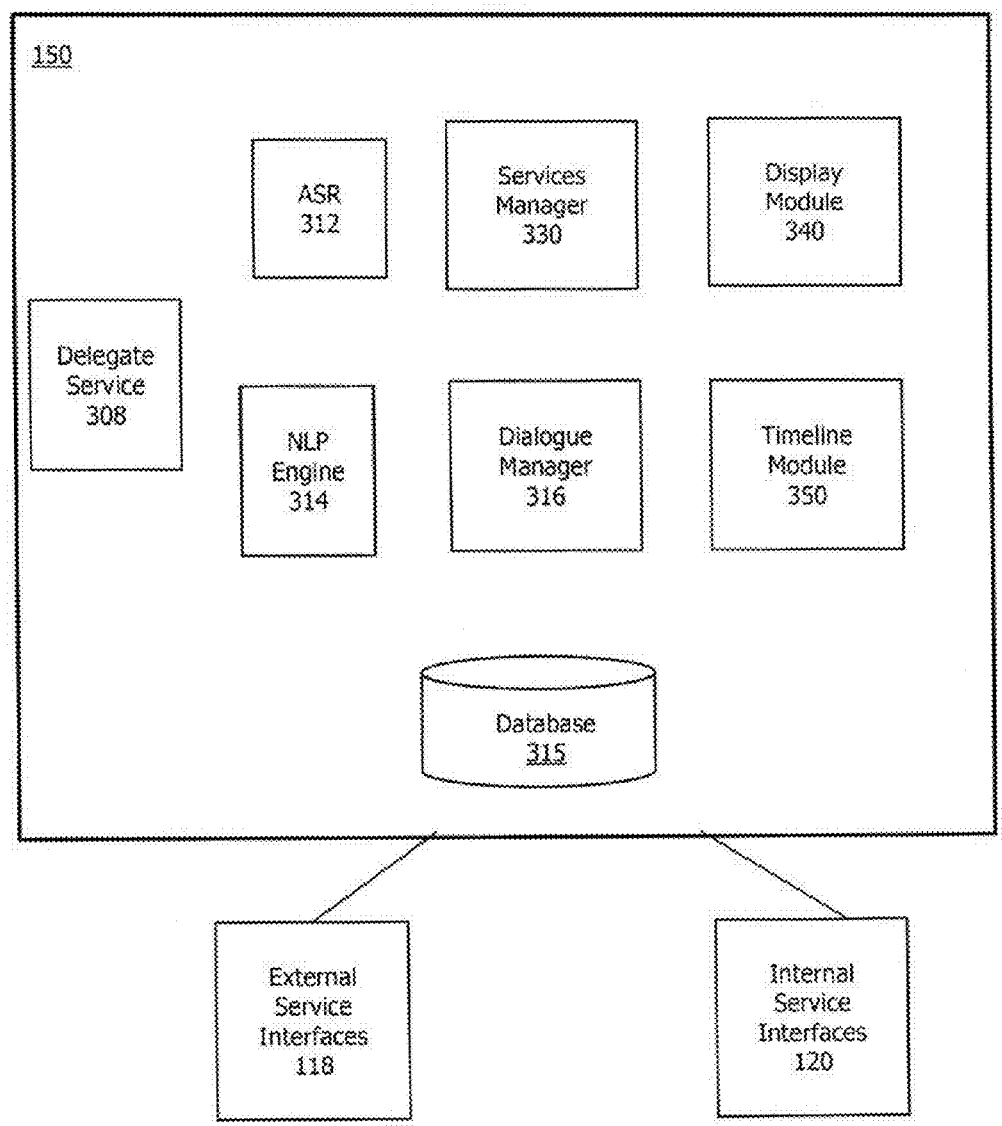
FIG. 3 illustrates an exemplary intelligent services engine.

Reference is now made to FIG. 3 to describe the intelligent services engine 150 according to one embodiment of the invention. Intelligent services engine 150 may be cloud-base infrastructure with distributed remote service components configured to receive user commands, identify the intent of the user including the domain, tasks, and parameters embodied or implied by the user command, identify and select services to perform the derived user intent, present results to the user on the mobile computing device 102, and so forth.

Delegate Service 308 may be chiefly responsible for receiving requests from mobile computing devices 102, coordinating the processing of components and directing data between components (e.g. 312, 330, 340, 314, 316, 350, etc.) as well as providing results to mobile computing devices 102 that made requests to delegate service 308. It will be appreciated that each of the components shown in FIG. 3 may also have a load balancer that allocates, instantiates and destroys its respective services dynamically depending on the demand for a particular service from a plurality of mobile computing devices 102. Load balancing of any component/service of the intelligent services engine 150 may be accomplished though a server administration account, and may incorporate performance metrics such as queries per second, number of user accessing the intelligent services engine 150 and/or a particular module (312, 330, 340, 314, 316, 350, etc.), processing resources being consumed, etc.

In some embodiments, intelligent services engine 150 may include an automated speech recognition (ASR) module 312 for converting voice-based input commands into a text string representation of the voiced input. A natural language processing (NLP) engine 314 may be provided to receive the text string representation of the voice command from ASR module 312 and derive the user's intention form the voiced (or otherwise inputted) command, NLP engine 314 may be further configured to recognize the domain (and perhaps one Or more subdomains) to which the user command relates, the specific task the user wants to have performed, as well as perform entity extraction on the user command to identify relevant parameters embodied in the user command. Services manager 330 receives data from NLP engine 314 and identifies one or more remote and/or local services 118, 120 configured to accomplish the task according to the derived user intent.

Some or all of the components of intelligent services engine 150 may be cloud-based (in that the components are stored and executed on remote servers), and in other embodiments, some or all of the components are of intelligent services engine 150 are stored and executed on the mobile computing device 102. Although the components of intelligent services engine 150 are sometimes referred to herein in the singular (i.e. delegate service 308), it will be appreciated that some or all of the components may be instantiated as several web services, the number of which may be determined by the load balancer, number of requests from other components and/or mobile computing devices 102, and so forth. Dialogue manager 316 may be for interacting with the user in a conversational manner to elicit additional information (such as parameters), confirm commands about to be performed, confirm results, and so forth. Timeline module 350 is for generating timeline views that allow a user to view task results, organize tasks, connect with relationships in a social network setting, etc. Display module 340 is for formatting the results from the other modules (egs. 312, 314, 316, etc.) before the results are communicated to the mobile computing device 102 making the request. Formatting the results may involve protocol-specific formatting, phone-specific formatting, operating-system specific formatting, and so forth. Database 315 is for storing long-term and short-term data that is relevant to the operations of intelligent services engine 150 and may include user history, user preferences, cached results form services manager 330, list of appropriate services 118, 120 and their associated functionality and API calls, etc.

Figure 44:
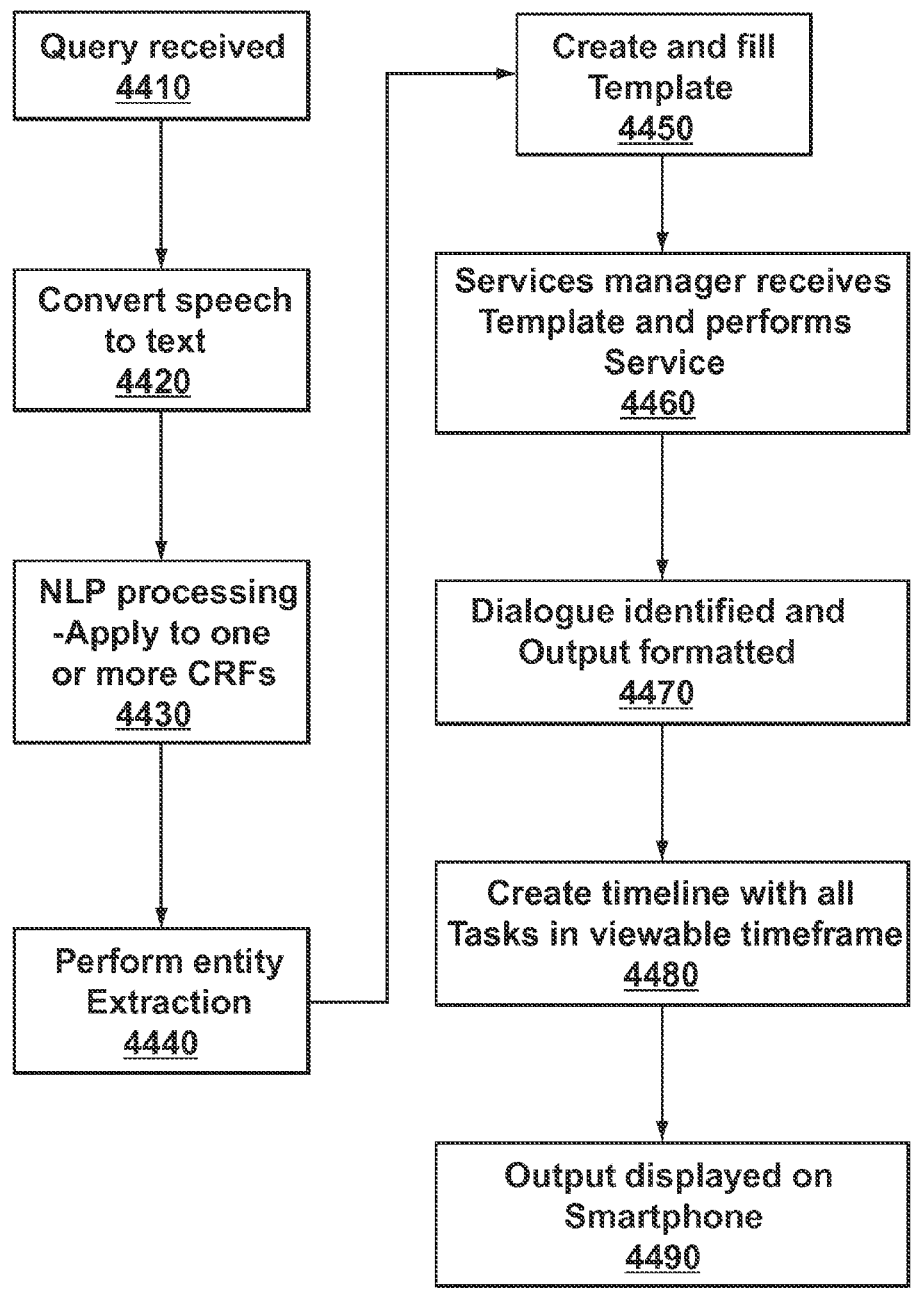
FIG. 44 shows exemplary operations (methods) that may be employed by the invention to process voice commands according to one embodiment.

Reference is next made to FIG. 44 to describe some operations (methods) that may be performed to receive user input to the conversational system 201. A user of the conversational system 300 on a mobile device 102 may be presented with a user interface by application 201 that is configured to accept voice inputs as well as inputs provided by other input devices (eg. Touchscreen 240). At step 4410, the voice query (i.e. command) is uttered by the user and is received by the application 201. The ASR engine 312 converts the voice command to a text representation of the voice command at step 4420. ASR engine 312 directs the text representation to NLP engine 314 which processes the command. In some embodiment, NLP engine 314 applies the text representation (which may be in feature vector format) to one or more conditional random fields at step 4430. Entity extraction is performed by the NLP engine 314 at step 4440 to identify entities (i.e. parameters) embodied within or implied by the text representation. Once NLP engine 314 has identified the domain that the voice command relates to and has extracted the relevant parameters, the NLP engine 314 creates and fills a template representing the domain, task and parameters extracted from the command. The services manager 330 receives the template (from NLP engine 314 or a central routing component such as delegate service 308) and performs a service 118,120 that is appropriate for the identified task and extracted parameters. At 4470 dialogue may be identified (from database 315) which is configured to elicit additional parameter information from the user if necessary. The resulting output received from the service 118,120 is also formatted for communication to mobile device 102. A timeline module 350 (which may be cloud-based or part of application 201) creates an interactive timeline for presentation to the user. The timeline may incorporate all events that have occurred or are scheduled to occur within the viewable time-range on the device 102 or for previous days or future days. Finally, at step 4490 the output (i.e. results from service calls and/or timeline events) is displayed on the screen 240 of the mobile computing device 102.

Reference is next made to FIGS. 10-43 to describe the operations (methods), user interfaces, interactions, presentation, and so forth involved with a user performing commands and searching for the results of commands on a mobile computing device 102. Application 201 provides a user interface 1002 that allows a user to interface with and use the functionality provided by application 201. As shown, user interface 1002 (FIG. 10) may include one or more data items that provide information desired by the user. For example, the exemplary user interface 1002 shown in FIG. 10 includes a cover photo 1004, the date 1006, the current time 1008, a synopsis of the local weather 1010, a timeline/history toggle switch 1012, a speak button 1014, and so forth. A scrollable timeline 1050 may also be presented on the user interface 1002 that lists alarms, calendar items (such as meetings, events), to-do items (such as tasks with a specific deadline), communications (such as text messages, phone calls, emails, social media communications, etc.). The timeline 1050 may also include a time display 1008 that shows the current time so that a user can quickly glance where each timeline item is relative to the current time.

The timeline 1050 may include one or more timeline items 1060 that indicate items that have occurred, are occurring, are scheduled to occur, as well as grouped items that are related in some way. Each timeline item 1060 may include one or more details about the item such as the time 1062 corresponding to the item, a graphical representation 1066 indicating the category of the item (such as an icon), a brief description 1064 of the item, and so forth. A category (also referred to herein as a domain) in the context of this specification is a field of action, thought, or influence in which individual items that belong to a category are logically related. For example, text messages, phone calls, emails and social media communications may all be grouped together under the category of communications. Other examples of categories that may be implemented with the conversational system 300 include alarms and reminders, restaurant events, to-do items, searches (via the Internet or affiliates), and so forth. It should be appreciated that the user interfaces 1002, timelines 1050, timeline items 1060 and the categories thereof referred to in this specification are merely exemplary, and that the invention contemplates many other embodiments that are within the scope of the invention.

The description 1064 of the item may include such information as the title of the item (for example, "Wake up"), the address of the item in the case of events, names of people attending an event (for example, "Mary Smith"), the address where the event is scheduled to make place (for example, "53 Fairview Ave.", the number of items grouped in a particular category (for example, "4 new messages"), and so forth.

Figure 10:
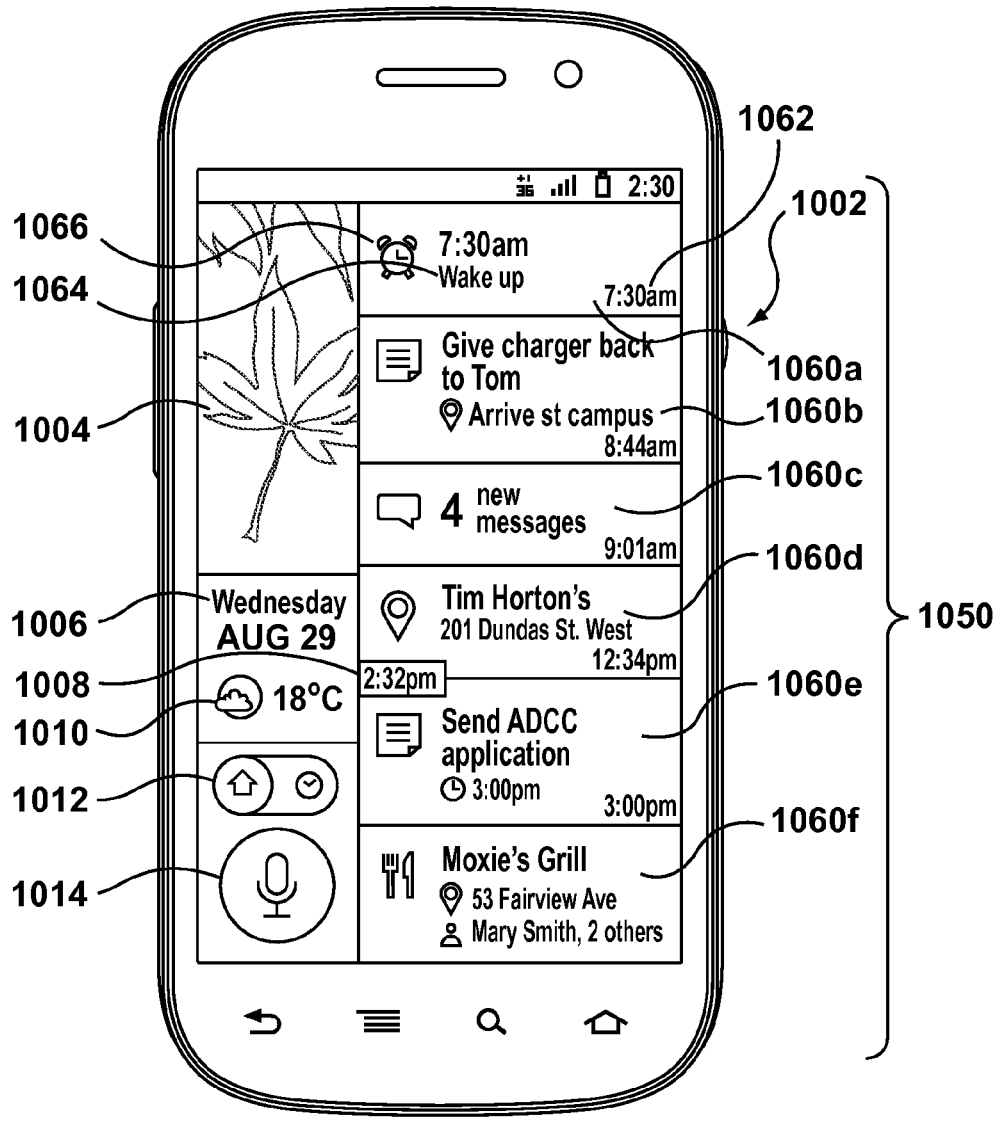
FIG. 10 is an exemplary user interface with labels describing several components of the user interface.
Figure 11:
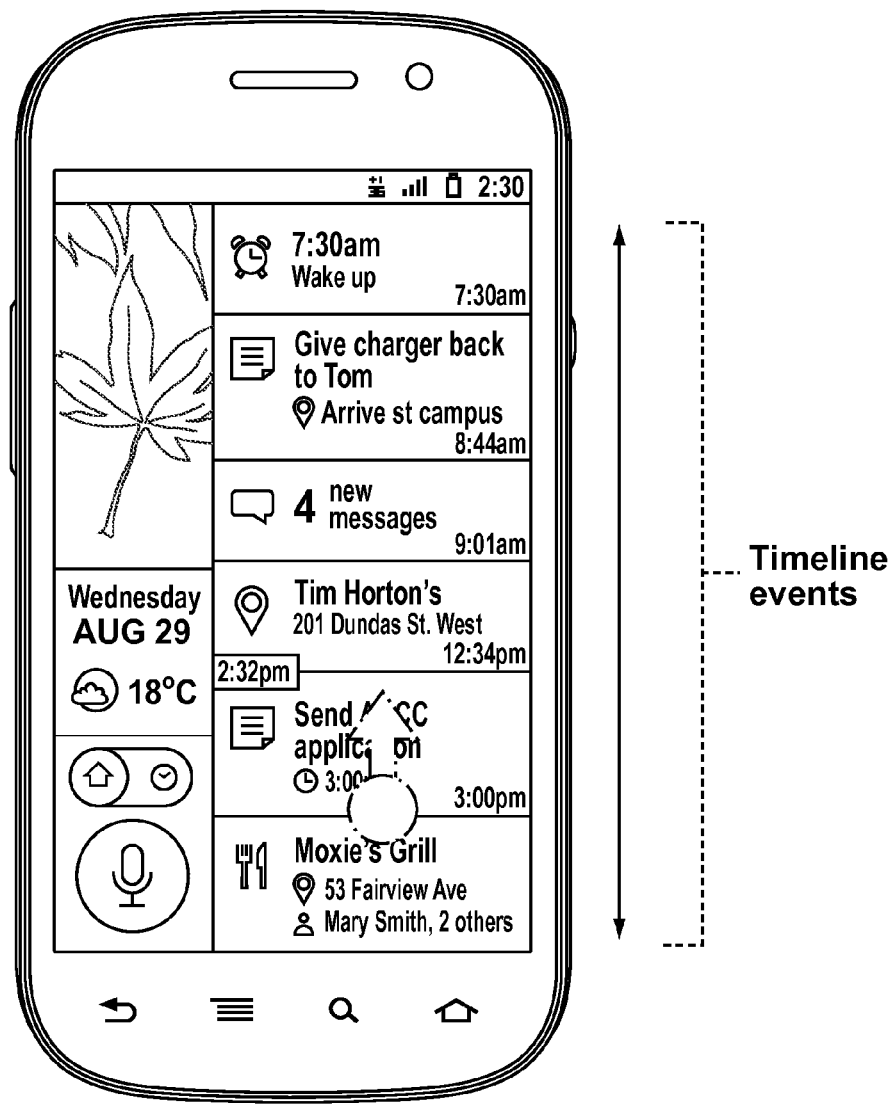
FIG. 11 is an exemplary user interface showing a scrollable timeline.
Figure 12:
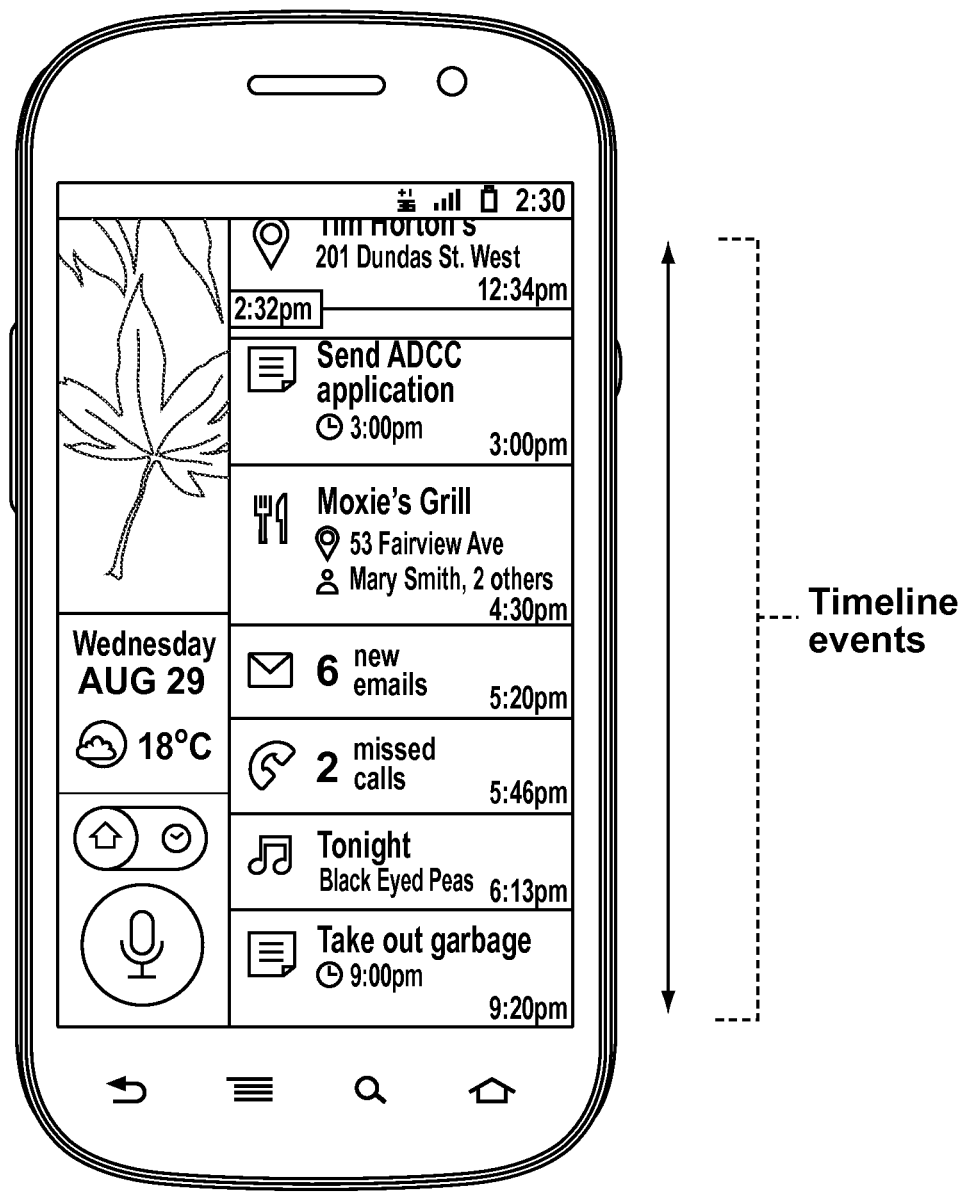
FIG. 12 is an exemplary user interface showing various timeline events according to one embodiment.
Figure 13:
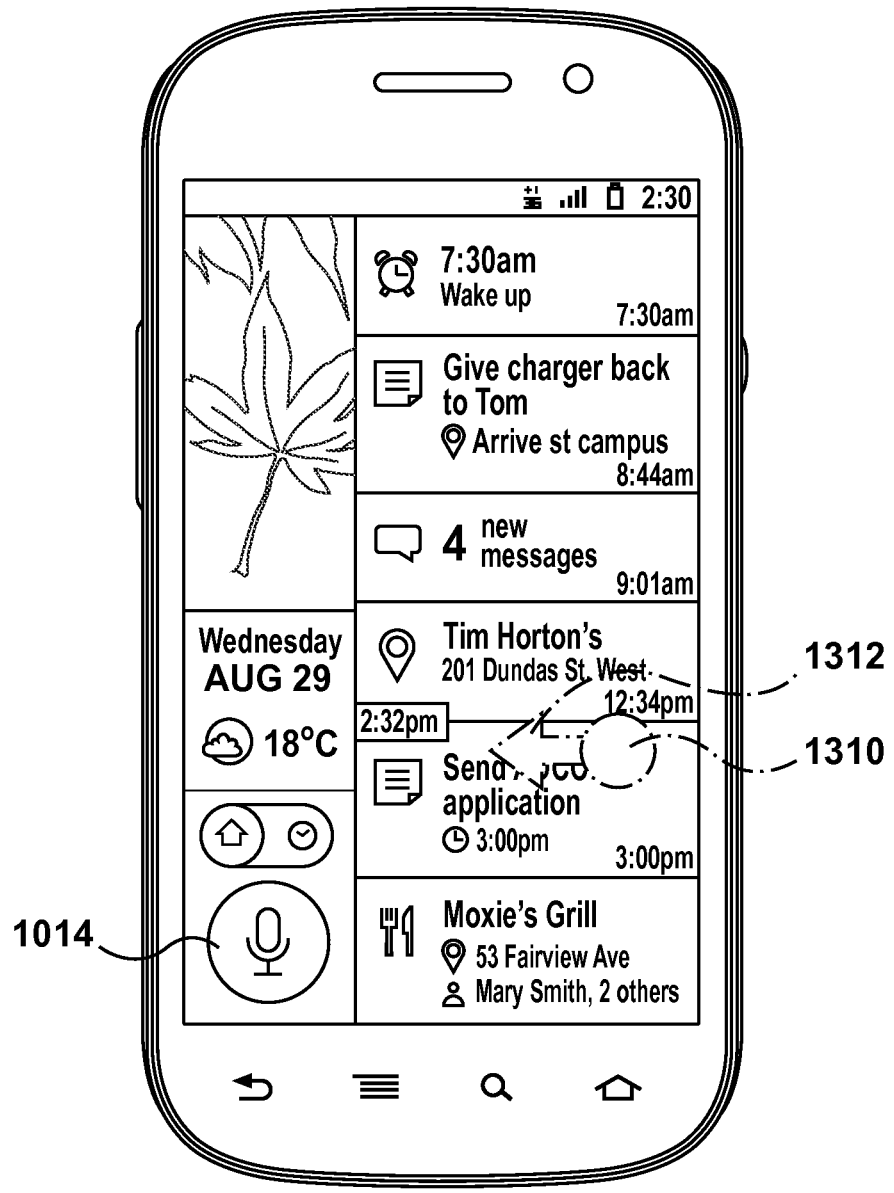
FIG. 13 shows an exemplary screen gesture for displaying the mini-app user interface according to one embodiment.
Figure 14:
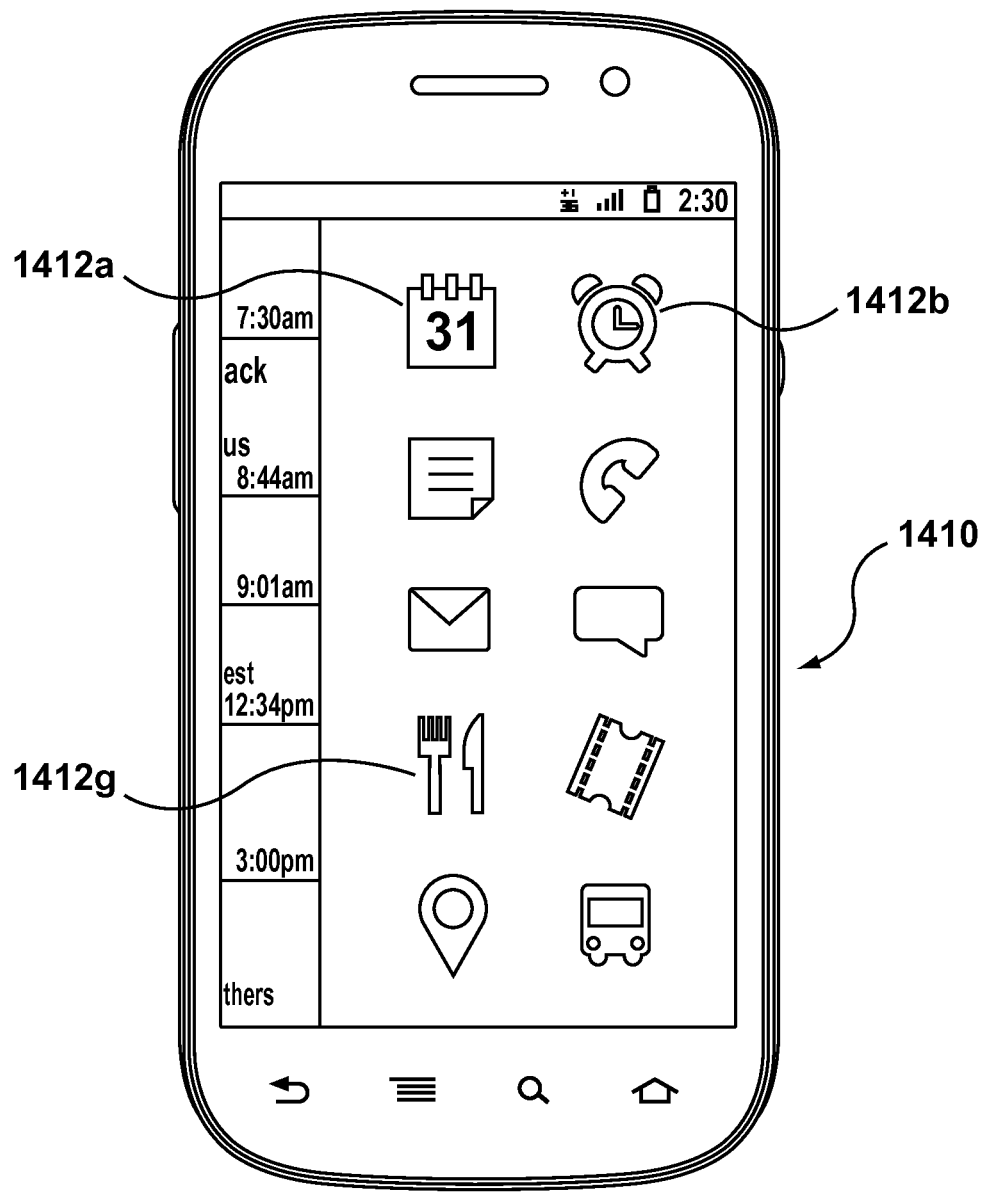
FIG. 14 shows an exemplary user interface showing several clickable mini-app icons each of which are associated with a unique category of tasks.

The timeline 1050 shown in FIG. 10 includes several timeline items that belong to different categories and are presented accordingly with unique graphical icons as well as timeline details. For example, timeline event 1060*a* belongs to the alarm/reminder category and is indicated by a graphical icon 1066 that represents this category. Timeline event 1060*a* also includes information such as the time the alarm was set for (i.e. 7:30 am) as well as a descriptive element (i.e. "Wake up"). Timeline 1050 also includes timeline events 1060*b* to 1060*f* that relate to the to-do category, communications category, search category and restaurant event category, each of which is indicated by a descriptive tag and a graphical icon that represents the category associated with a particular timeline event.

Continuing with the elements of user interface 1002, a cover photo 1004 is included that corresponds to a particular date, in this case, Wednesday August 29th. Cover photo 1004 may be selected to provide a visually pleasing environment for the user, and in some embodiments, the colors found in color photo 1004 may correspond to the elements of the user interface 1002 (such as timeline toggle 1012, date display 1006, the lines between timeline items 1060, etc. to give the user interface 1002 a pleasing color-coordinated appearance. Although not shown in the drawings, in some embodiments, a user may view past and/or future cover photos 1004 that do not correspond with the current date 1006 by clicking on visual icons such as arrows. Cover photos 1004 may also include a clickable caption that is meant to provide more information about the photo and to prompt the user to explore the cover photo 1004 in more detail. For example, a cover photo for a particular day may show the national animal of a country that also includes a caption such as "Do you know what country this animal represents". In some cases the caption may be clickable so that a user can learn more about the animal, the country, or a related topic. It will be appreciated that any given cover photo 1004 may include more than one caption whereby clicking on a particular caption take the user to a particular destination such as a webpage.

User interface 1002 also includes a local weather display 1010 which may include useful weather information such as the temperature, an icon representing the weather conditions (egs. Sunny, cloudy, rainy, etc.), probability of precipitation, wind conditions and so forth. The application 201 may periodically access the global positioning system (GPS) coordinates of the device 102 by calling an internal GPS service 120 to retrieve the location of the device. Once the application 201 retrieves the current GPS location of the device 120, the application may call an appropriate weather service 118 (from a list of services stored by the conversational system 300) and display the weather information on the user interface 1002.

Inputting Speech Commands

Figure 25:
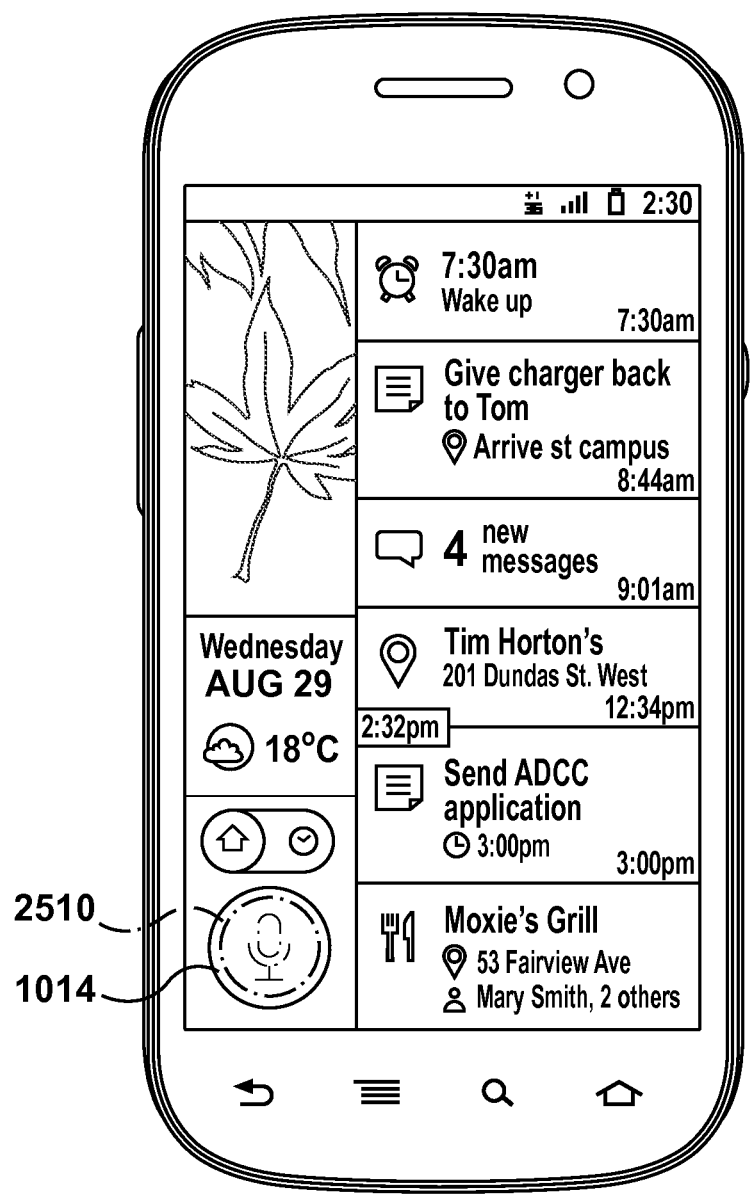
FIGS. 25-27 shows exemplary user gestures for displaying a speech entry form.
Figure 26:
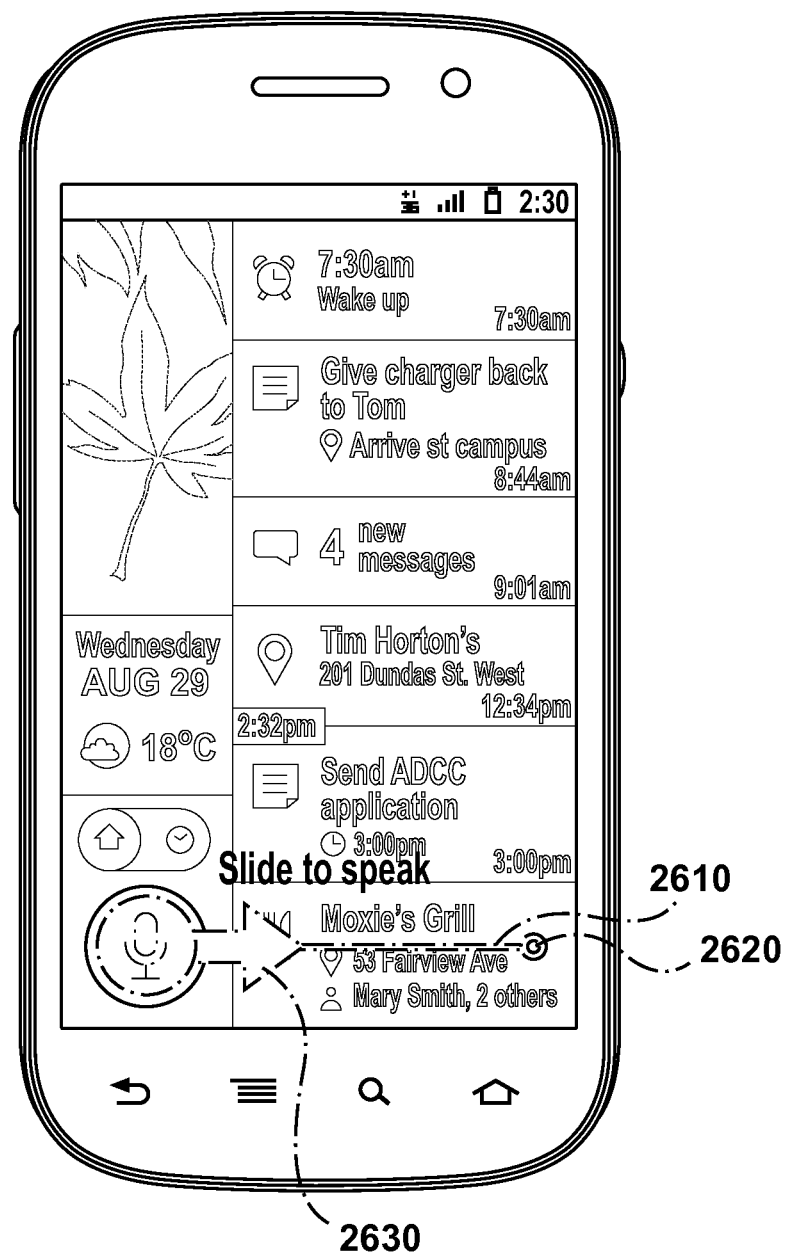
Figure 27:
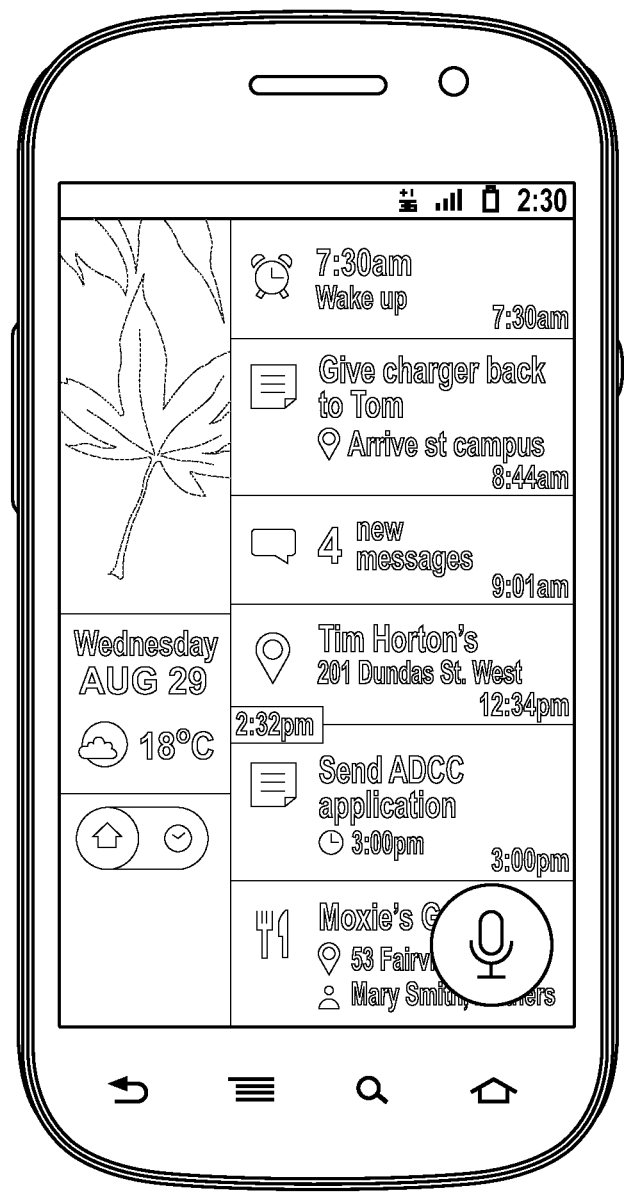

As shown in FIG. 10, the user interface 1002 includes a speak button 1014 for allowing a user to interact with the application 201 by uttering voice commands. The voice interaction of the user with the application 201 and conversational system 300 is illustrated in more detail with reference to FIGS. 25-39. In some exemplary user interfaces 1002, a user may begin the speech input process by pressing a speech button 1014 on the touchscreen 240 of their mobile device 102. The act of pressing the speech button 1014 is indicated in FIG. 25 by circle 2510. As shown in FIG. 26, when a user presses the speech button 1014 and keeps contact with the button 1014 on the touchscreen, many elements of the user interface 1002 (such as timeline 1050, weather display 1010, etc. may be shaded out, frosted (or visually modified in another way) to emphasize that the user is engaging in a speech input operation. While the user continues to make contact with speech button 1014 a speech line 2610 and a target 2620 are presented on the user interface 1002 to give the user a visual guide of the approximate gesture required to show the speech entry form.

In one embodiment, in order to display the speech entry form 2810, a user must press and hold the speech button 1014 on the touchscreen 240, and drag the speech button 1014 generally along the speech line 2610 until the speech button 1014 makes contact with the target 2620. If the user loses contact with the speech button (for example, by removing their finger from the touchscreen 240) before the button is dragged to the target 2620, then the speech button 1014 will snap back to its resting position as shown in FIG. 10.

Figure 28:
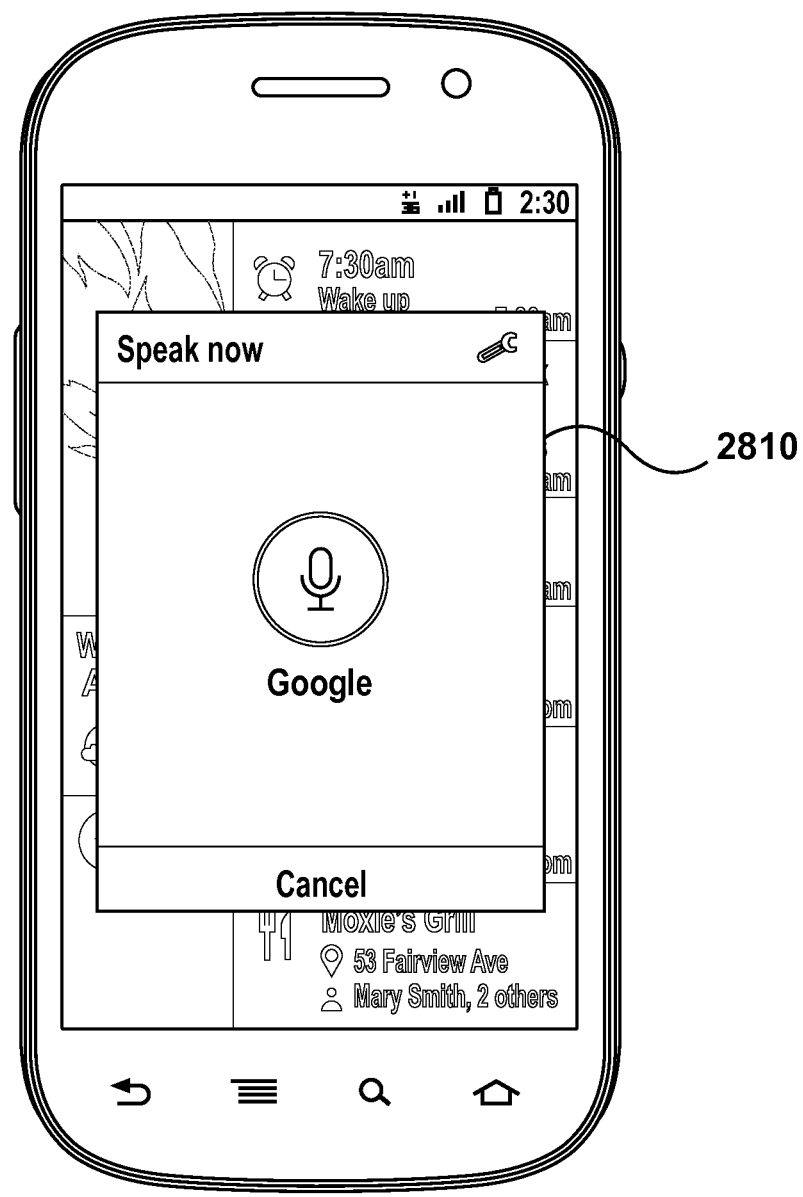
FIG. 28 is an exemplary speech entry form according to one embodiment.

When the user successfully drags the speech button 1014 to the target 2620, the application 201 will display a speech entry form 2810, an example of which is shown in FIG. 28. The speech entry form 2810 may include a caption such as "Speak now" to notify the user that the microphone(s) of the mobile computing device 102 is in a state to accept speech input. At any time while the speech entry form 2810 is displayed a user may utter a speech command to accomplish one or more tasks with their mobile device 102. Some example speech command are "Find me the weather for the next few weeks?" or "Schedule a meeting with Bob for 3 p.m. today at Headquarters" or "What's the weather like in Toronto today?"

In various embodiments, the speech command uttered by the user is converted by ASR engine 312 into a text representation of the uttered speech command. The ASR engine 312 may direct the text representation to NLP engine 314 which is configured to identify the domain that the command relates to, at least one task that the user desired to have performed, and at least one parameter relevant to the task. In this specification, the voice input may be referred to as the "voice command" and the text representation of the voice command that is generated by the ASR engine 312 may be referred to as the "text command".

As will be appreciated, ASR engine 312 will not always produce a text command that exactly matches the voice command uttered by the user. The conversational system 300 may include functionality that allows a user to correct a misinterpretation by the ASR engine 312 or if the user changed their mind about the details of the task they desire to have accomplished. For example, let's say that the user utters the voice command "What's the weather like in Toronto today?" while the speech but that the ASR engine 312 produces a text command of "What's the weather like in Torino today?" Once ASR engine 312 has produced a text command representing the voice command, the application 201 displays a speech correction screen 2910, an example of which is shown in FIG. 29.

Speech correction screen 2910 is displayed to the user for a predetermined time period which may be indicated by progress bar 2920. A user may edit the text command or resay a voice command at any time while the speech correction form 2910 is displayed. A caption 2916 of the text command is displayed on the speech correction form 2910 so that the user can view the text command produced by ASR engine 312 and make any corrections if desired. Speech correction form includes an edit button 2914 and a resay button 2912 that allow a user to manually change the text command (by using the touchscreen 240 for example) or to utter another voice command respectively.

Figure 29:
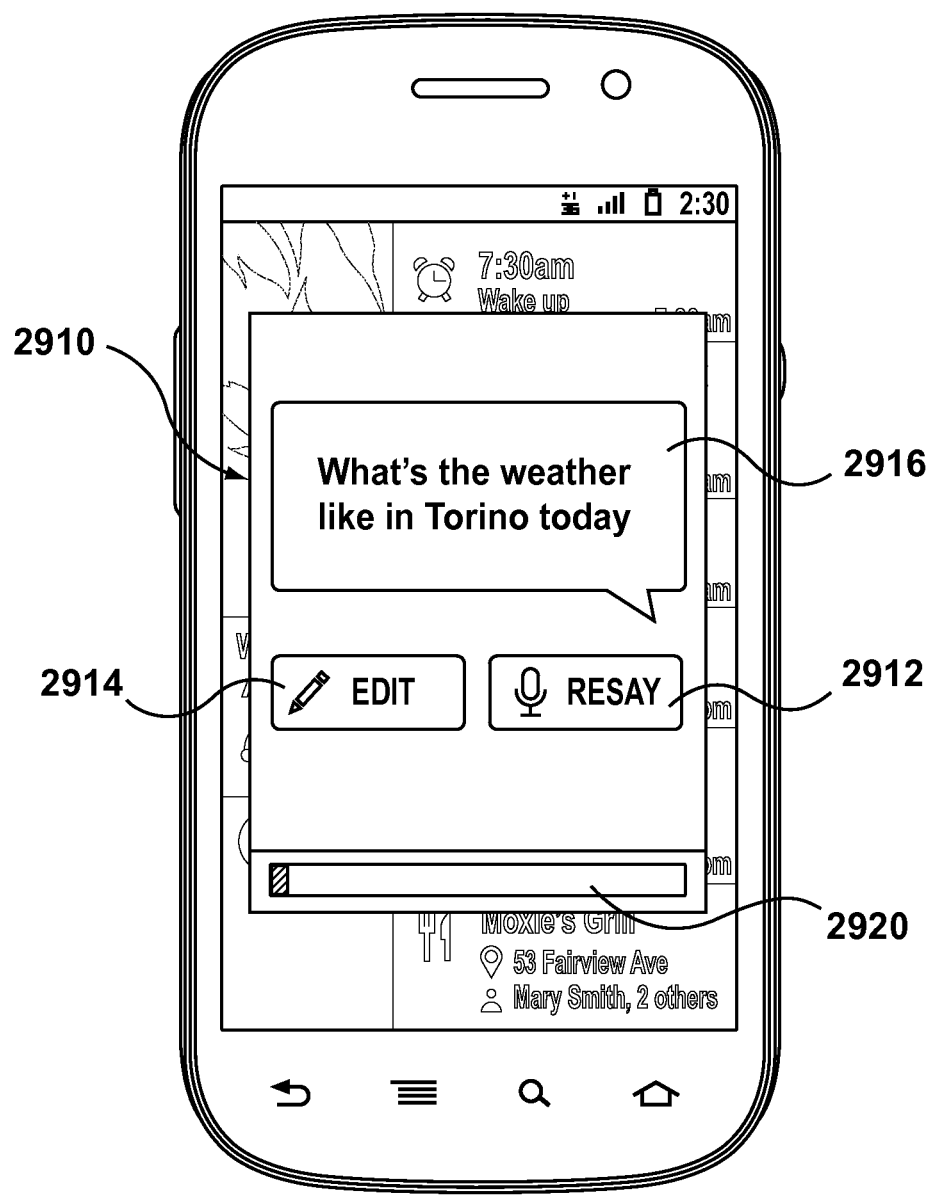
FIG. 29-31 show the progress of an exemplary speech correction form according to one embodiment.
Figure 30:
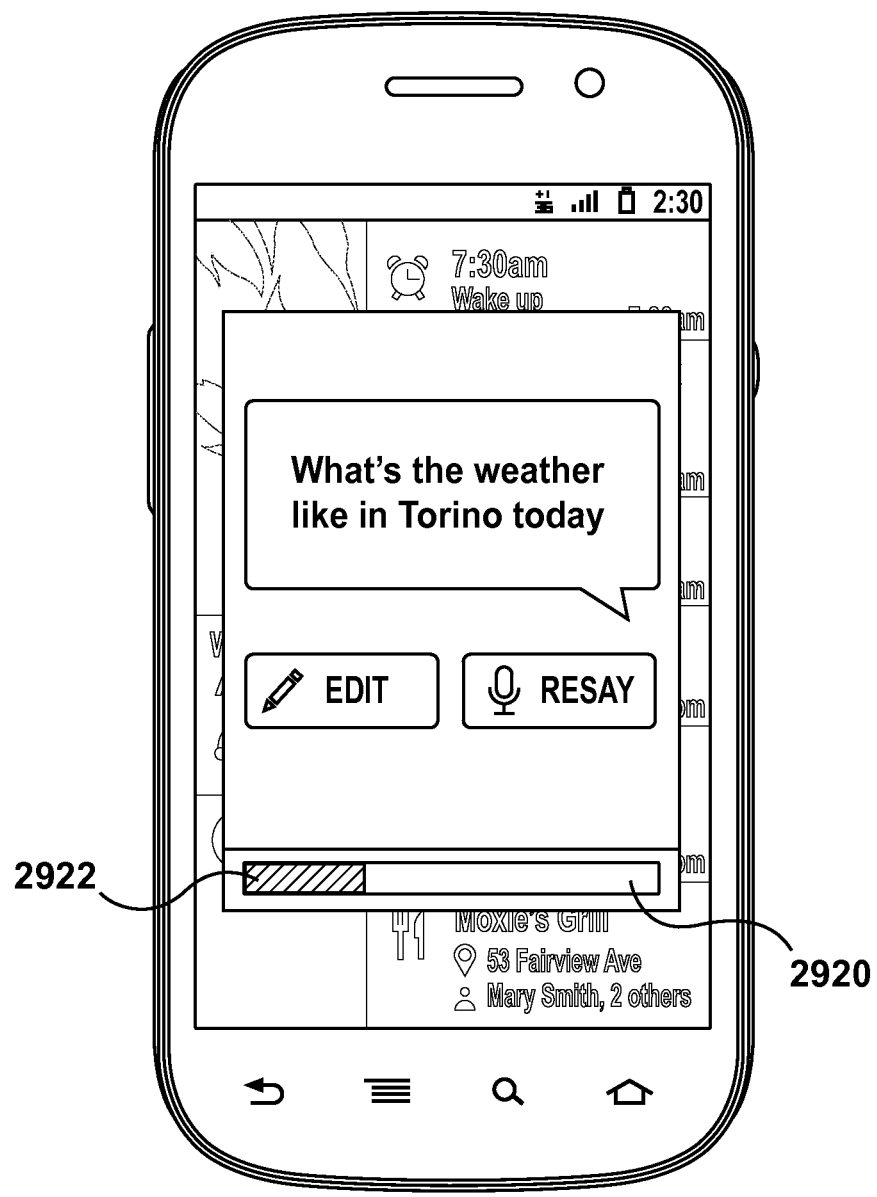
Figure 31:
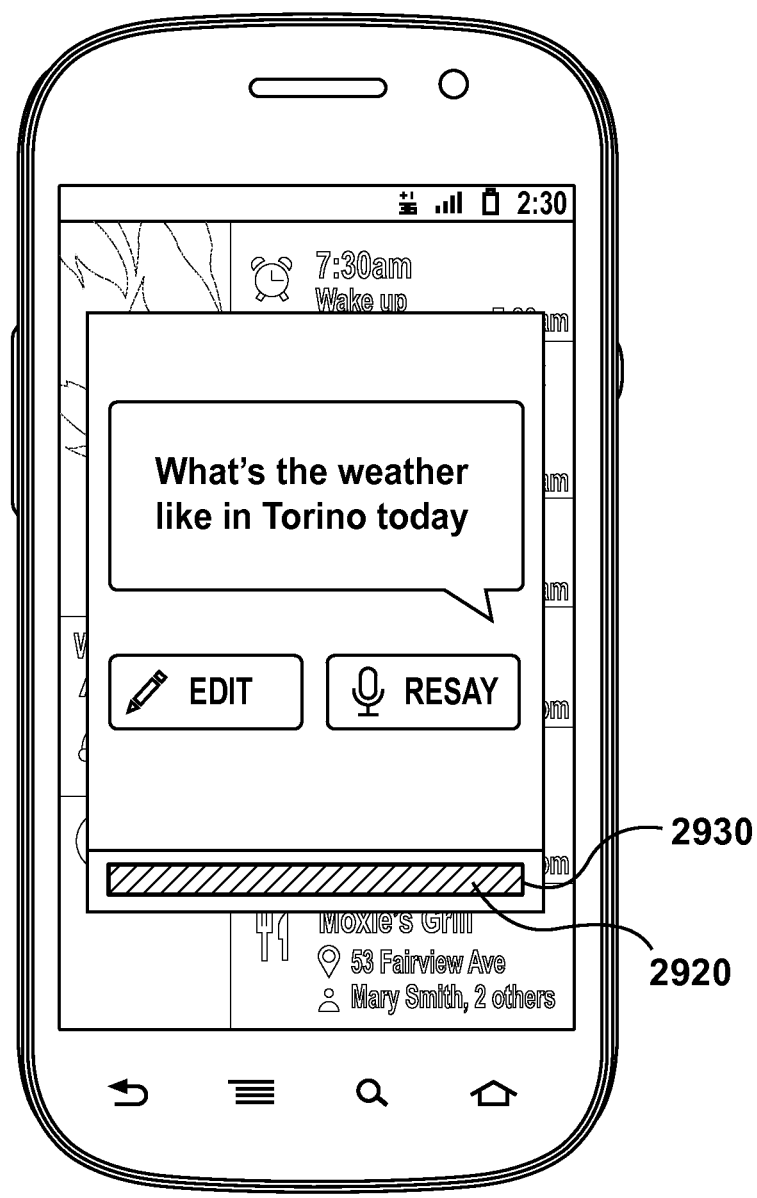
Figure 32:
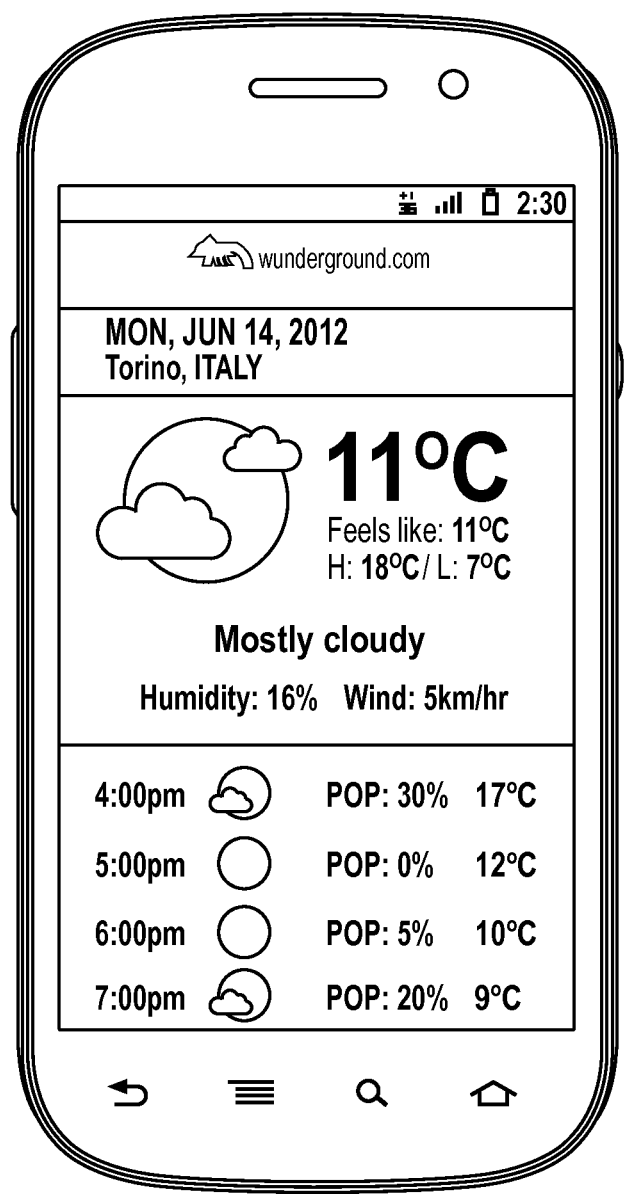
FIG. 32 shows an exemplary results screen according to one embodiment.
Figure 33:
FIG. 33 shows an exemplary user gesture for correcting the text representation generated by the automatic speech recognition module according to one embodiment.

As shown in FIGS. 29-31, the exemplary progress bar 2920 will continue to progress (e.g. visually by filling up with a darker color) until the visual indicator 2922 reaches the progress bar target 2930 (shown in FIG. 31). While the progress bar is progressing, the text command displayed at caption 2916 may be processed by NLP engine 314 (and other components of conversational system 300) as described below so that a result may be displayed very shortly after the progress bar 2920 is finished. FIG. 32 shows an exemplary results screen according to the voice command uttered by the user, specifically "What's the weather like in Torino today?"

Figure 34:
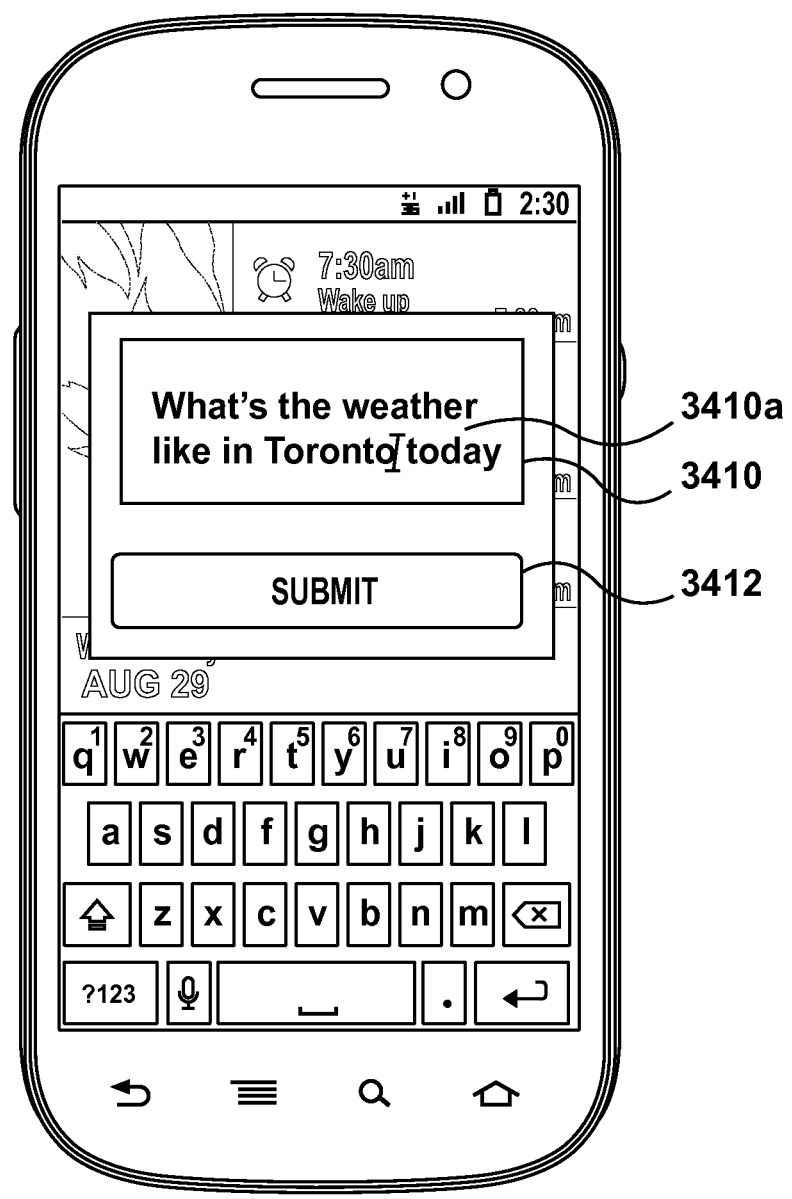
FIG. 34 shows a user interaction in which the user corrects the text representation generated by the automatic speech recognition module according to one embodiment.
Figure 35:
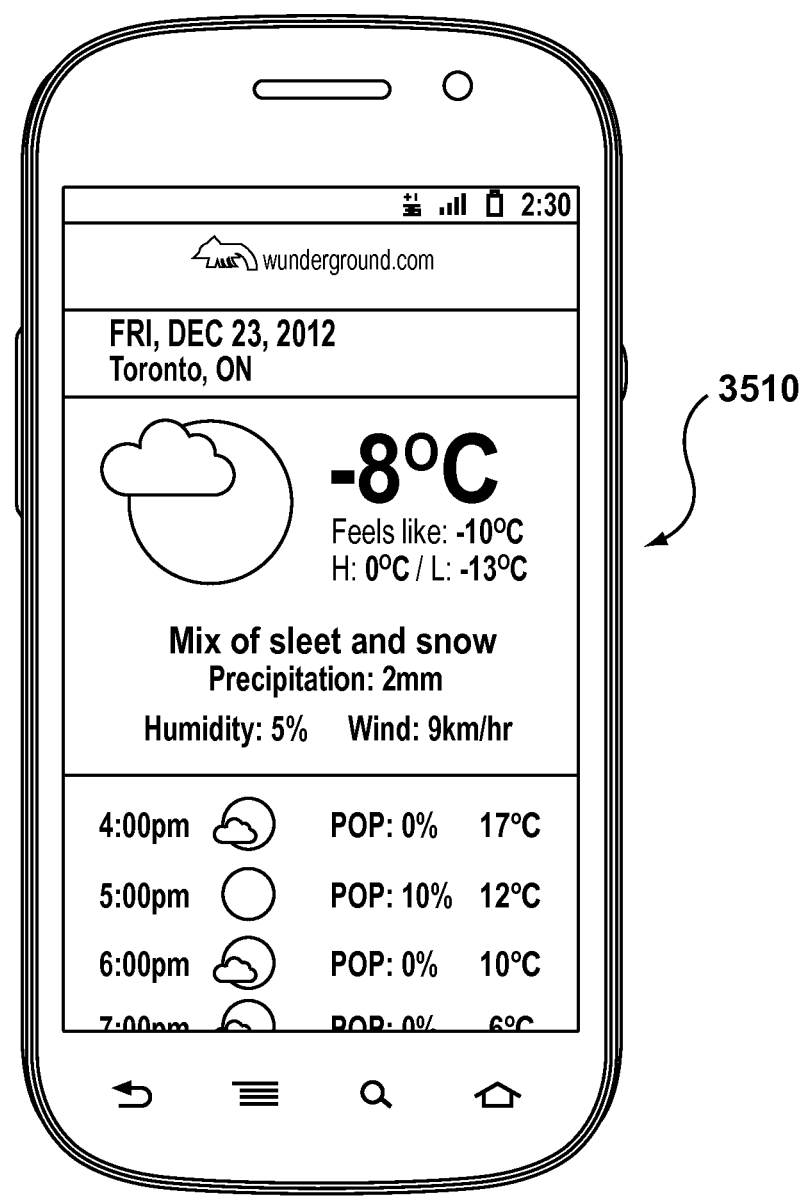
FIG. 35 shows an exemplary results screen generated with the corrected text input of FIG. 34.

FIGS. 34 and 35 illustrate an exemplary interaction continuing from FIG. 29 in which the user presses the edit button 2914 on the touchscreen 240 while the progress bar is progressing. Once the user presses the edit button 2914 a text editor 3410 appears with the text command that was provided by ASR engine 312. The text editor 3410 is an interactive screen in which text command may be edited by the user interacting with an input device such as the touchscreen 240 of the mobile device 102. In FIG. 34, the user has modified the original text command to say "What's the weather like in Toronto today?" using the touchscreen instead of the original text command "What's the weather like in Torino today?". To submit the modified text command 3410a the user may press the submit button 3412 which will direct the modified text command to the NLP engine 314 to identify the intent of the user and to accomplish the task desired by the user. The results of the modified voice command 3410a after being processed by the NLP engine 314 and the services manager 330 (as well as other components of the conversational agent 300) are shown on the exemplary results screen 3510 on FIG. 35.

In various embodiments, the conversational system 300 is configured to prompt a user for additional information (i.e. parameters) where a particular task has been identified by NLP engine 314 but not enough information is derived from the voice command. For example, in the case of voice commands related to booking flights, it will be appreciated that some parameters are required in order perform a useful search. Specifically, in some embodiments the services manager 330 may require at least the following parameters (also referred to herein as entities): departure city, departure date and arrival city. In other embodiments, the services manager 330 may require additional information such as number of tickets, class, airline, and so forth.

Figure 36:
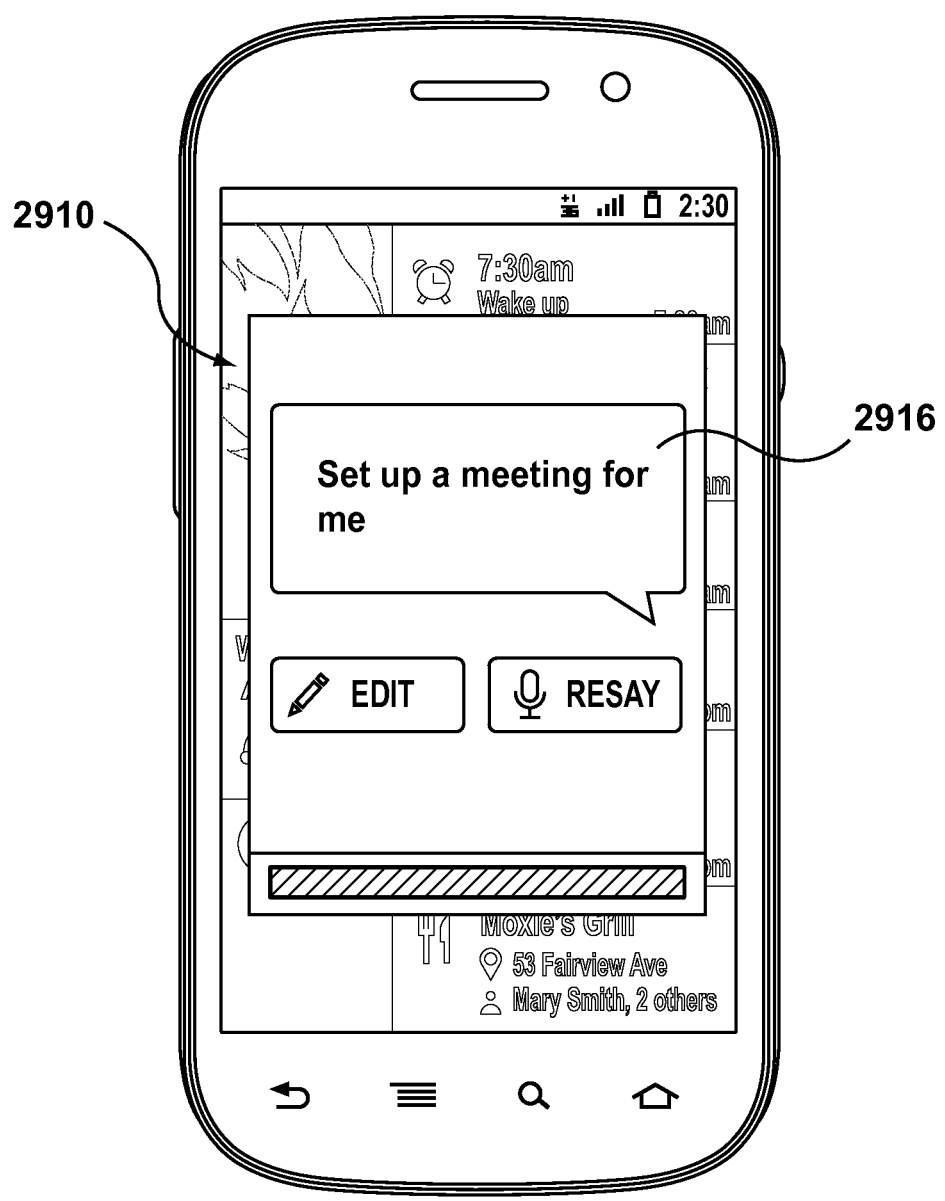
FIG. 36 shows an exemplary text command as it is being processed according to one embodiment.
Figure 37:
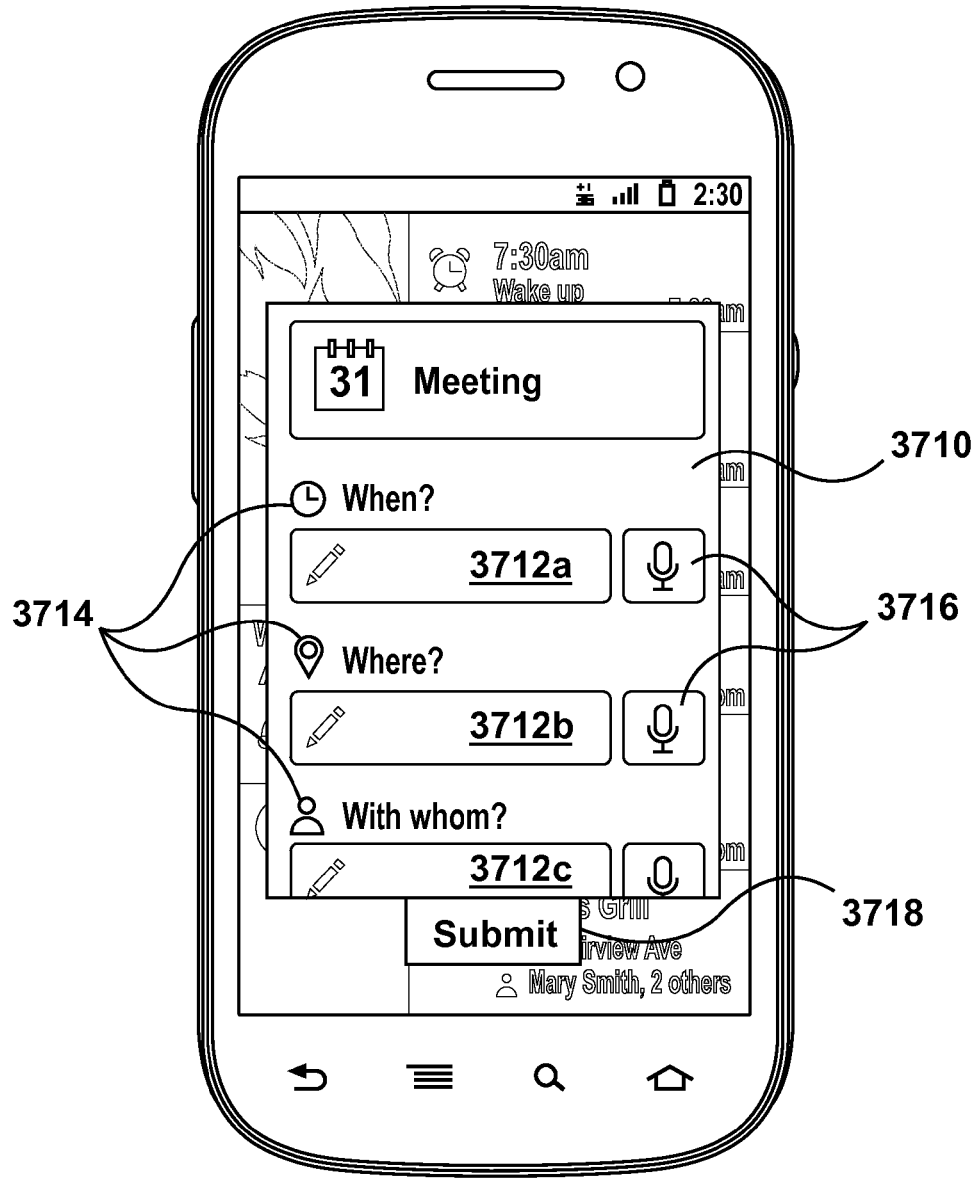
FIG. 37 shows an exemplary user interface screen for entering entity information by uttering voice commands according to one embodiment.
Figure 38:
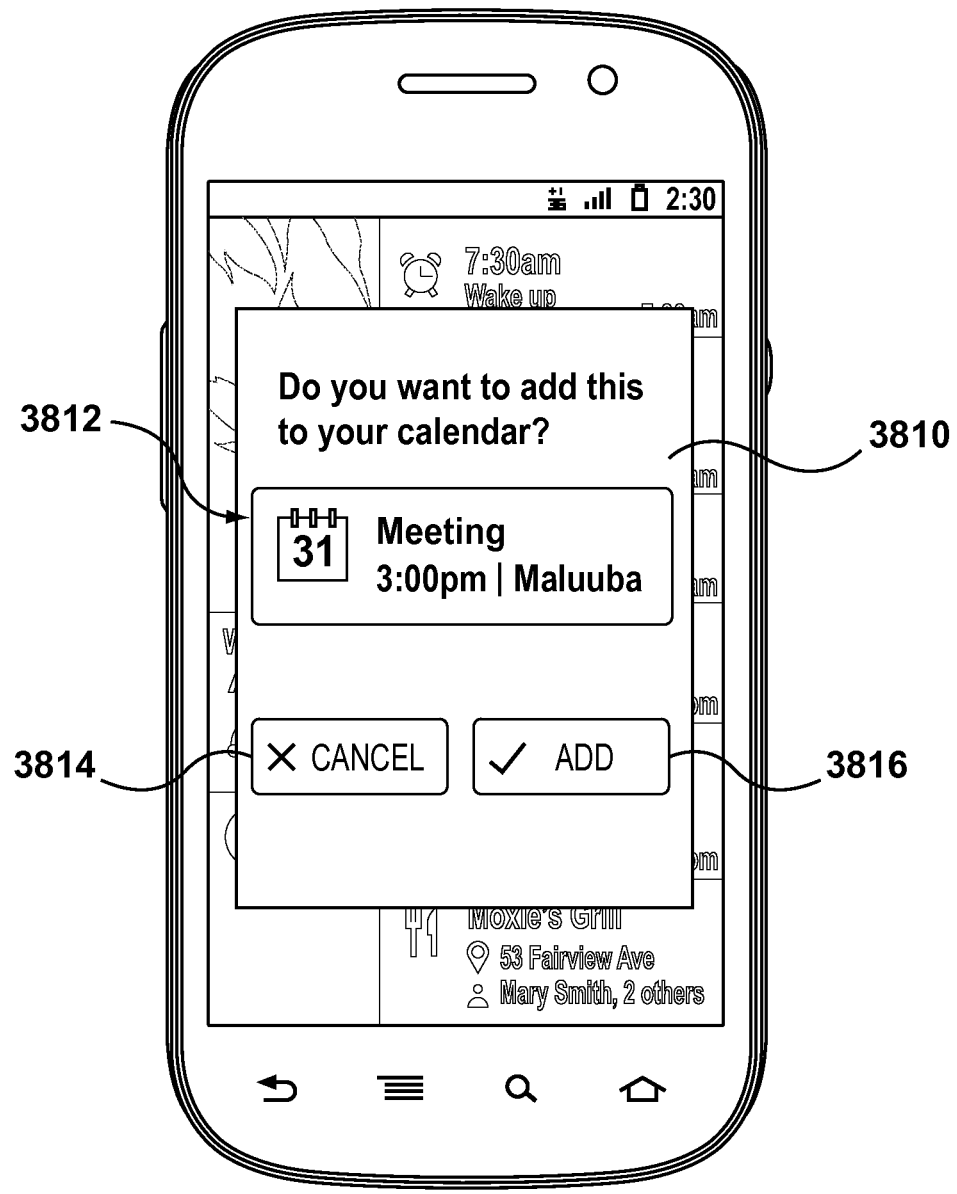
FIG. 38 shows an exemplary task confirmation screen.

Referring to FIG. 36, an example interaction is shown in which a user utters the voice command "Set up a meeting for me", ASR engine 312 correctly produces the text command "Set up a meeting for me" which exactly matches the voice command and the application 201 presents the speech correction form 2910 with the text caption 3916. The user is given a predetermined amount of time in which to edit or resay the voice command by pressing the edit button 2914 or the resay button 2912 respectively; the progression of the predetermined amount of time being represented visually by the progress bar 2920. While the speech correction form 2910 is displayed and the user does not press the edit button 2914 or the resay button 2912, the NLP engine is processing the text command using one or more statistical and/or rule-based approaches in order to derive the intention of the user (i.e. the domain, one or more tasks and at least one parameter which are embodied in the text command).

Figure 6:
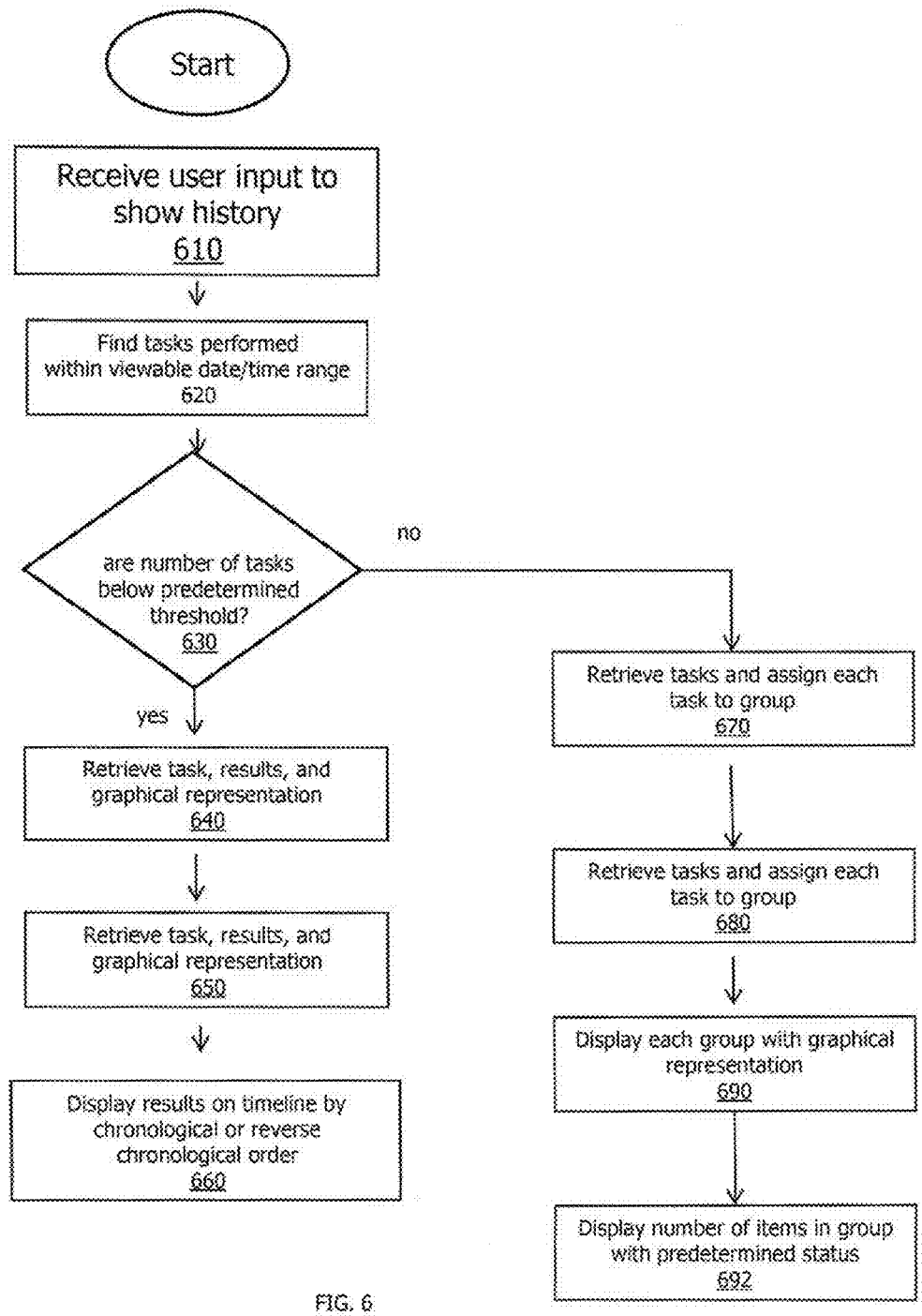
FIG. 6 is a flow chart illustrating operations (methods) for presenting search results on a search history timeline according to one embodiment.
Figure 7:
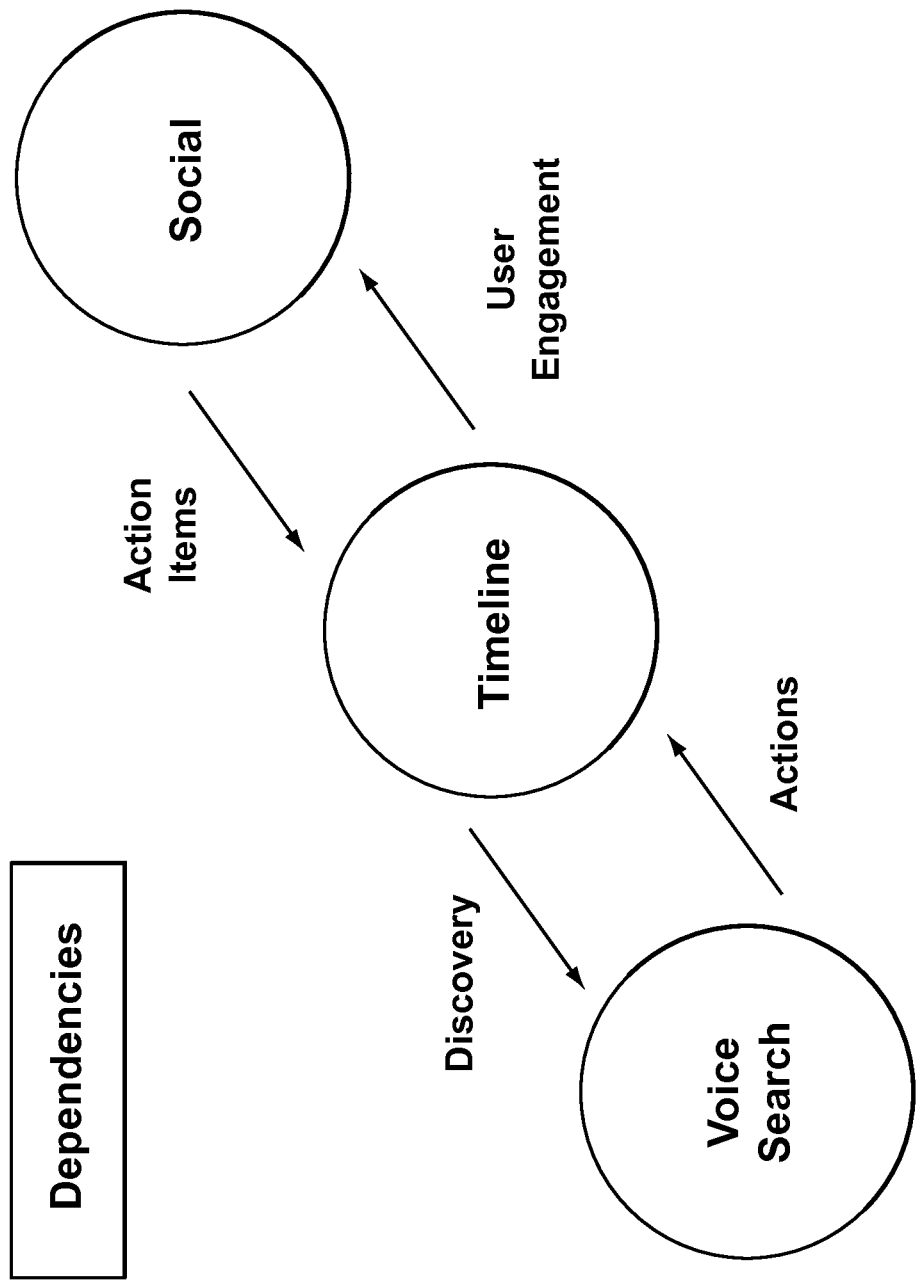
FIG. 7 shows the interaction and flow of data between voice search, timeline and social modules according to one embodiment.
Figure 8:
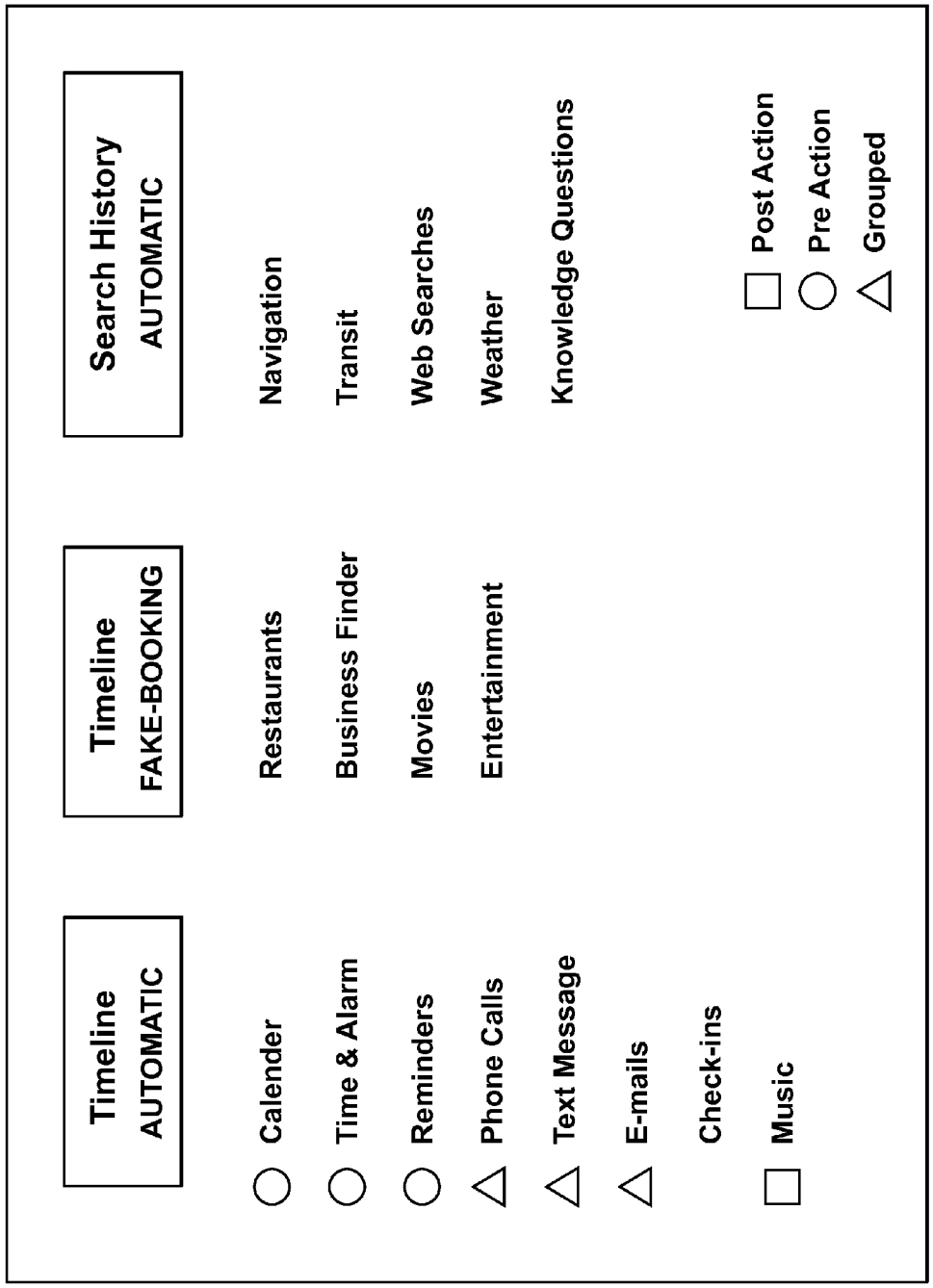
FIG. 8 is a diagram showing groups of actions and how they may be presented on an exemplary timeline.

As shown in FIG. 6, the progress bar 2920 has entirely filled up with visual indicator 2922 meaning that the predetermined time has elapsed for the user to either edit the text command or resay a voice command. This is indicated visually by the indicator 2922 completely filling up the progress bar 2920. NLP engine 314 processes the text command and determines that the intention of the user relates to the calendar domain, and the user wishes to have a meeting scheduled (i.e. the task identified is to schedule a meeting). NLP engine 314 also performs entity recognition on the text command to determine which (if any) parameters are embodied in the text command that relate to the identified task. Once the NLP engine 314 has finished processing the text command, NLP engine may create a template object (i.e. a data structure encapsulating the information derived from the text command) which is directed to the services manager 330 for processing. The services manager 330 (and/or NLP engine 314) may determine that additional entity information is required from the user in order to perform the task intended by the user.

If services manager 330 and/or NLP engine 314 determines that additional entity information is required, application 201 displays a parameter prompt form 3710 that includes fields associated with each parameter (entity) that is required by the services manager 330. For example, in the case of the exemplary text command shown in FIG. 36, application 201 displays parameter prompt form 3710 that includes fields for entering the time of the meeting (i.e. "When?"), the location of the meeting (i.e. "Where?"), and the invitees to the meeting (i.e. "With whom?"). Each field 3712a,b,c for receiving parameter information may be represented by a graphical icon 3714a,b,c that visually indicates the information required (i.e. time, location, invitees) to perform the task derived from the text command.

In some embodiments, a speech button 3716 is placed adjacent to each field 3712 so that a user may enter additional parameter information by pressing the speech button 3716 and uttering the parameter information. For example, a user may enter the date and time of the meeting by pressing the speech button 3716a and voicing the date and time (for example, by saying "3 pm"). The speech button 3716a may be animated once the user presses the speech button 3716a so that the user is aware the application 201 is receiving voice utterances via the one or more microphones of the mobile device 102. After the user is finishing voicing the parameter information the application processes the voice utterance (by converting the voice utterance to a text representation with ASR engine 312) and fills in the field with the text representation. The user may also have the option to directly input the entity information into fields 3712 using the touchscreen or another input device.

After the parameter information has been received and processed for each required field by ASR engine 312, a user may press a submit button 3718 to direct the parameters to the services manager 330. If the required fields are not filled then the user will get a message the more information is required before the user is able to press the submit button 3718. At any time the user may cancel the process and will be returned to a home screen (for example, such as the user interface 1002 shown in FIG. 10). Services manager 330 is configured to receive the parameter information entered in form 3710 and combine this information with the template previously created by NLP engine 314.

Once the parameter information has been entered into each field 3712,a,b,c and the user presses the submit button 3718, services manager 330 may verify that all the parameters have been provided for the particular task identified as relating to the user's intent. If services manager 330 (or another component of conversational system 300) determines that all the parameter information has been received, then application 201 may display a task confirmation screen 3810 on the mobile device 102. The task confirmation screen 3810 may include a confirmation message such as "do you want to add this to the calendar?" and may also include a graphical icon 3812 as well as details about the task such as the time, location, etc. in the case of a meeting. A user may have the task performed (i.e. create the event and add the event to the user's calendar) by pressing the add button 3814, or may cancel the operation by clicking on the cancel button 3816. Once the user presses the add button 3814, the services manager 330 identifies the appropriate service to call from a services list and instructs the service to perform the identified task.

Figure 9:
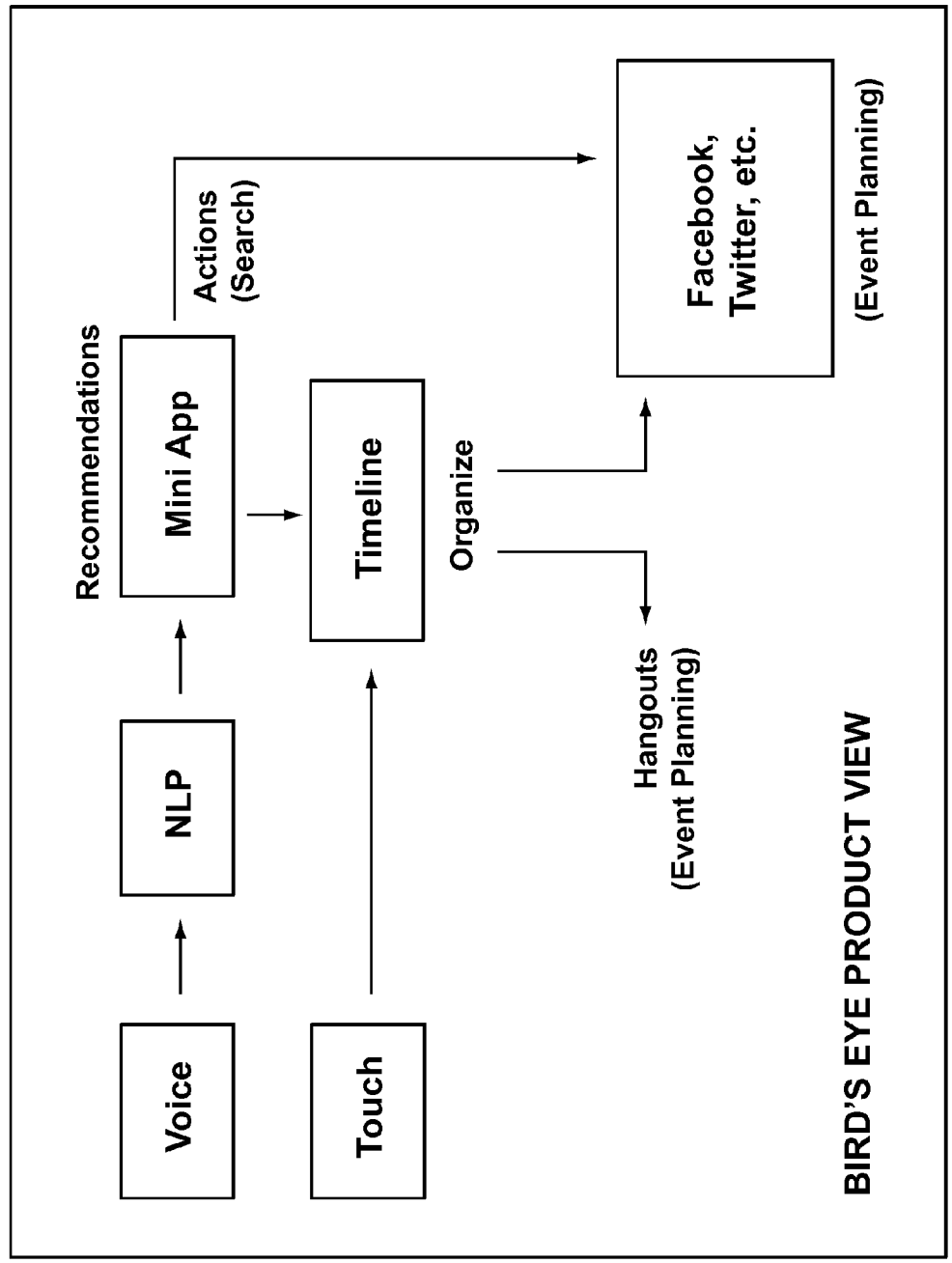
FIG. 9 is a block diagram showing the interaction between components in a conversational system of the invention according to one embodiment.
Figure 39:
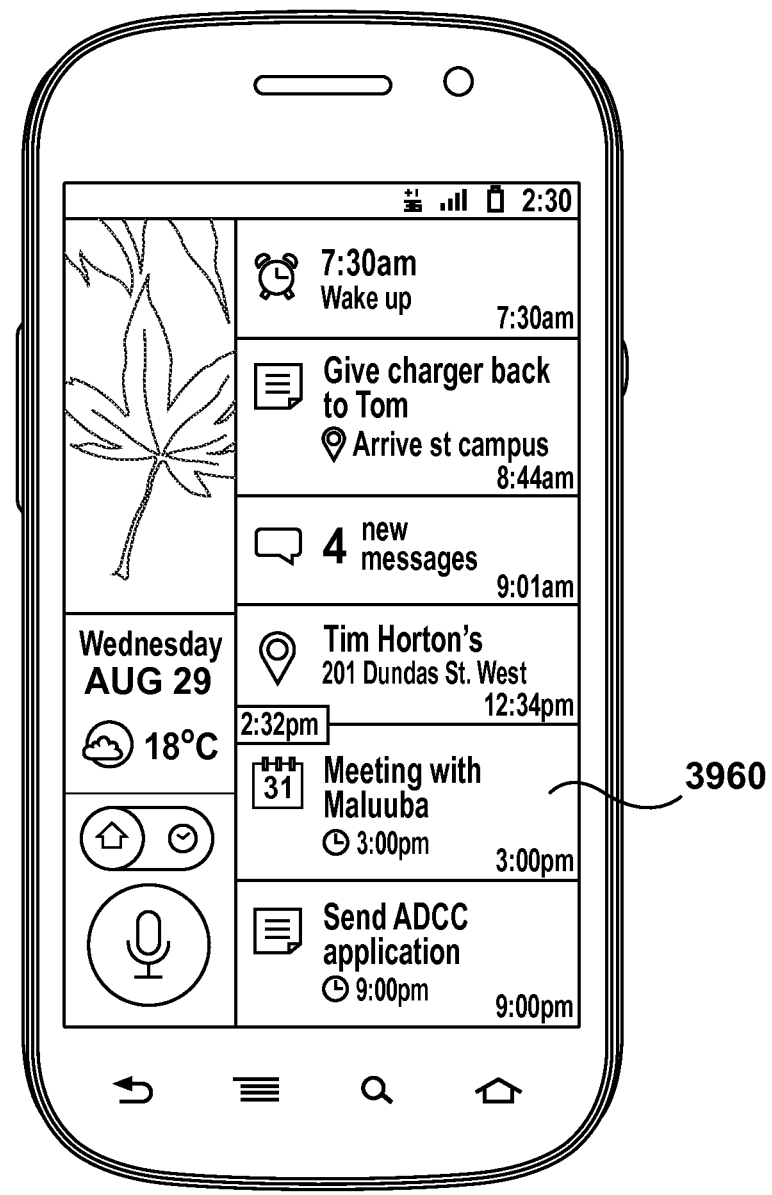
FIG. 39 shows an exemplary timeline after the task shown in FIG. 38 is performed according to one embodiment.
Figure 40:
FIG. 40 shows an exemplary user interaction for recommending restaurants according to one embodiment.
Figure 41:
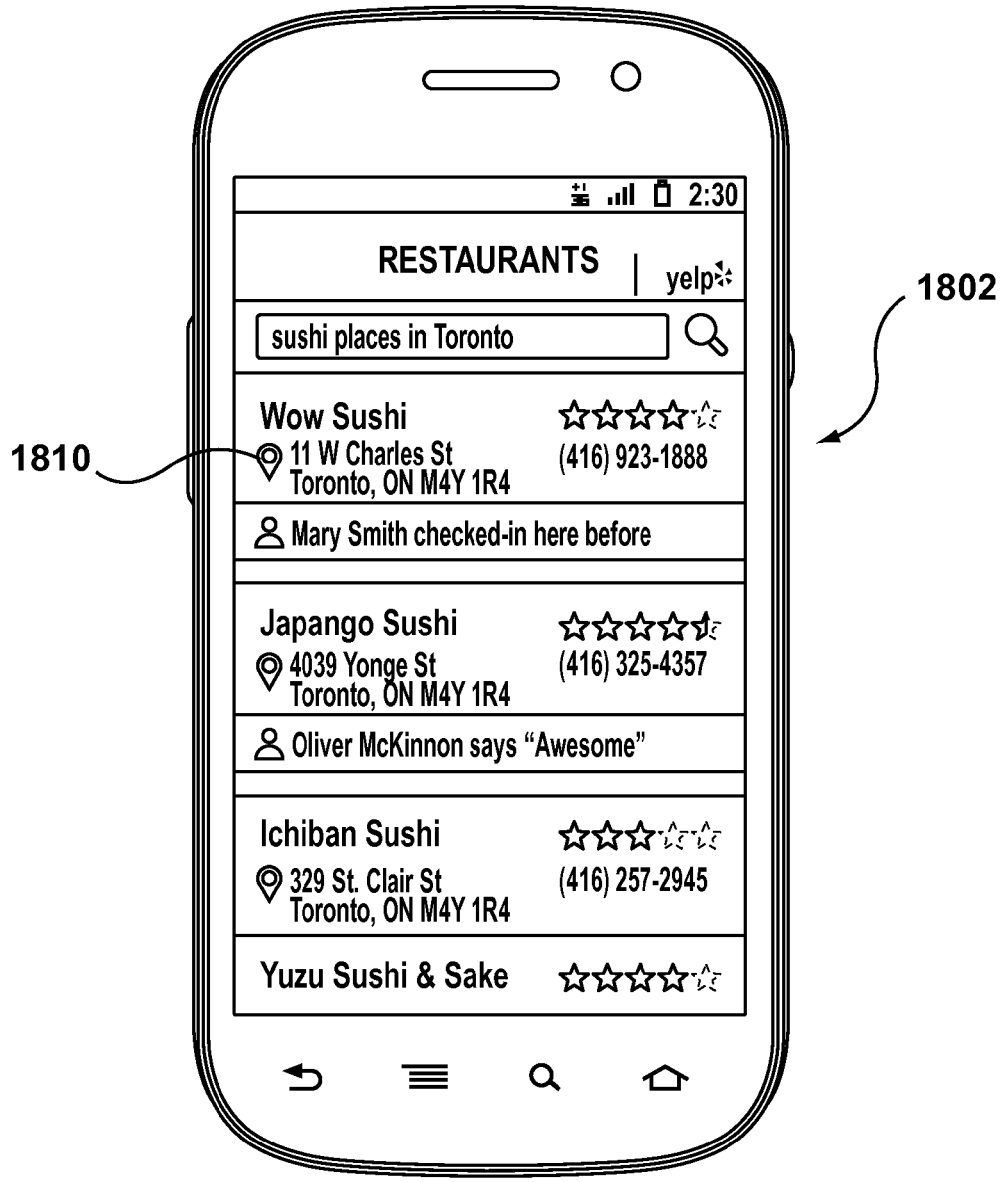
FIG. 41 shows an exemplary user interface in which a user's contacts have recommended restaurants according to one embodiment.

It will be appreciated that calling the appropriate service may involve calling one or more methods via an API associated with the service and providing parameter information to the one or more methods. The one or more methods may return results in the form of XML, JSON, or other formats which may be processed by the conversational system 300 and presented on the mobile device 102 by the application 201. As shown in FIG. 39, timeline item 3960 corresponds to the meeting task performed in FIGS. 36-38. The timeline item 3950 includes the details of the task performed so that a user can view their schedule and daily activities at a glance on user interface 1002. The current time 1008 in the exemplary user interface 1002 shown in FIG. 9 is "2:32 pm". Timeline items that have occurred or were scheduled for a time before the current time are shown above the current time 1008, and timeline items that haven't occurred or are scheduled for time after the current time are shown below the current time 1008 on timeline 1050. It will be appreciated that in some embodiments the order may be reversed in that past tasks are shown below the current time and future tasks/events are shown above the current time. The current time icon 1008 may also be shown at the top of the timeline 1050 with only future timeline items 1060 being shown on the timeline 1050.

Interaction with the Timeline 1050

Figure 21:
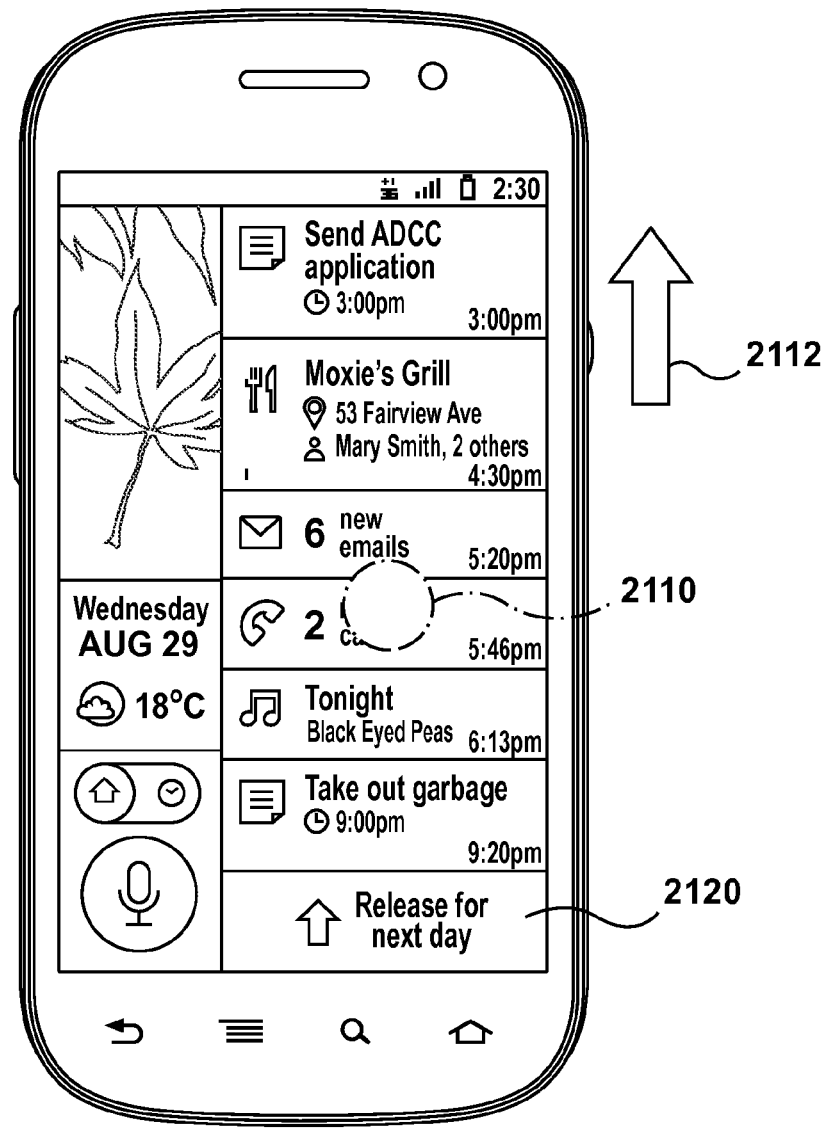
FIG. 21 shows an exemplary user interaction for displaying the next day timeline according to one embodiment.
Figure 22:
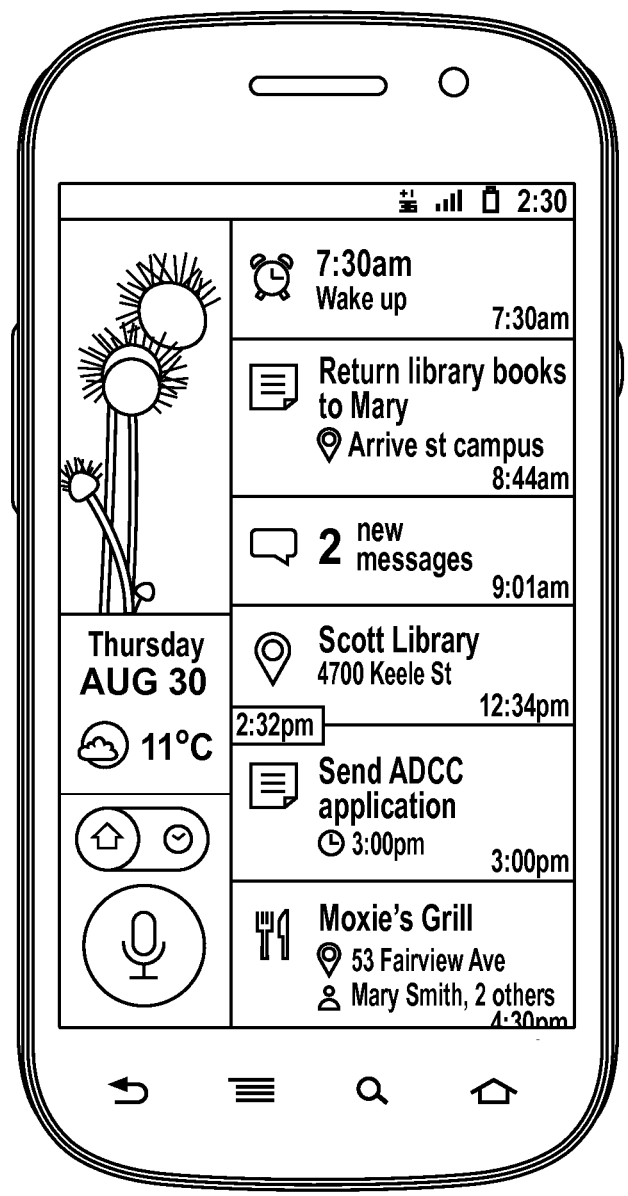
FIG. 22 is an exemplary user interface showing the user's timeline for the following day.

Reference is next made to FIGS. 21-24 to describe example interactions that a user may have with timeline 1050 according to various embodiments. The timeline 1050 shown on FIG. 21 relates to events scheduled or that occurred on August 29. As can be seen the current weather on August 29 is 18 degrees Celsius and it is partly cloudy at the user's current geographic location. The user may press the touchscreen 240, hold down, and drag the screen in the direction of arrow 2112 (or in the opposite direction). Once the user drags the screen a certain predetermined distance, a next day indicator 2120 is displayed that informs the user "Release for next day". If the user releases the screen while the next day indicator 2120 is displayed then the user interface 1002 will display the timeline 1050 associated with the next day August 30 (shown in FIG. 22). The timeline events 1060 shown in FIG. 22 are different than those shown in FIG. 21 because the events shown in FIG. 22 are for August 30 and the events shown in FIG. 21 are for August 29. Once the user has released their contact with the touchscreen 240 while the next day indicator 2120 is shown, the application 201 will access database 315 to retrieve timeline events 1060 that are scheduled for or pertain to August 30. Application 201 may also instruct the services manager 330 to retrieve the weather forecast for August 30 and present it accordingly as shown with graphical representation 1010.

Figure 23:
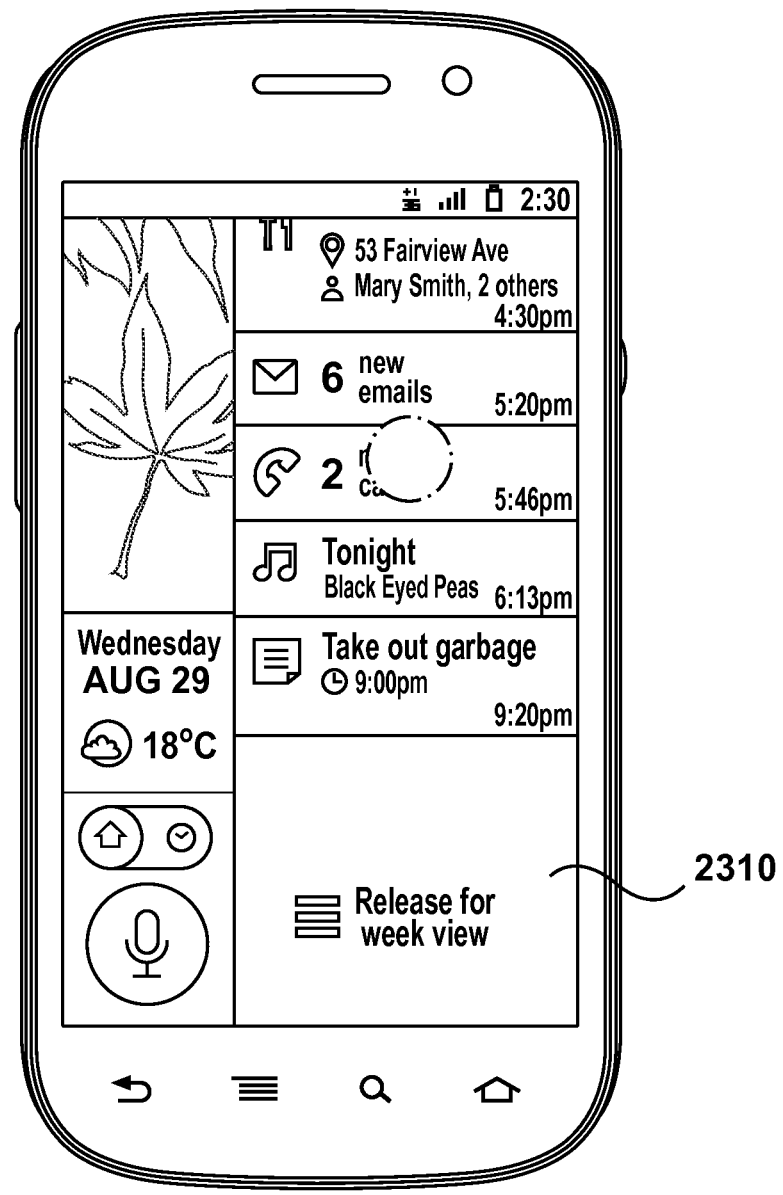
FIG. 23 shows an exemplary user interaction for displaying a week view according to one embodiment.
Figure 24:
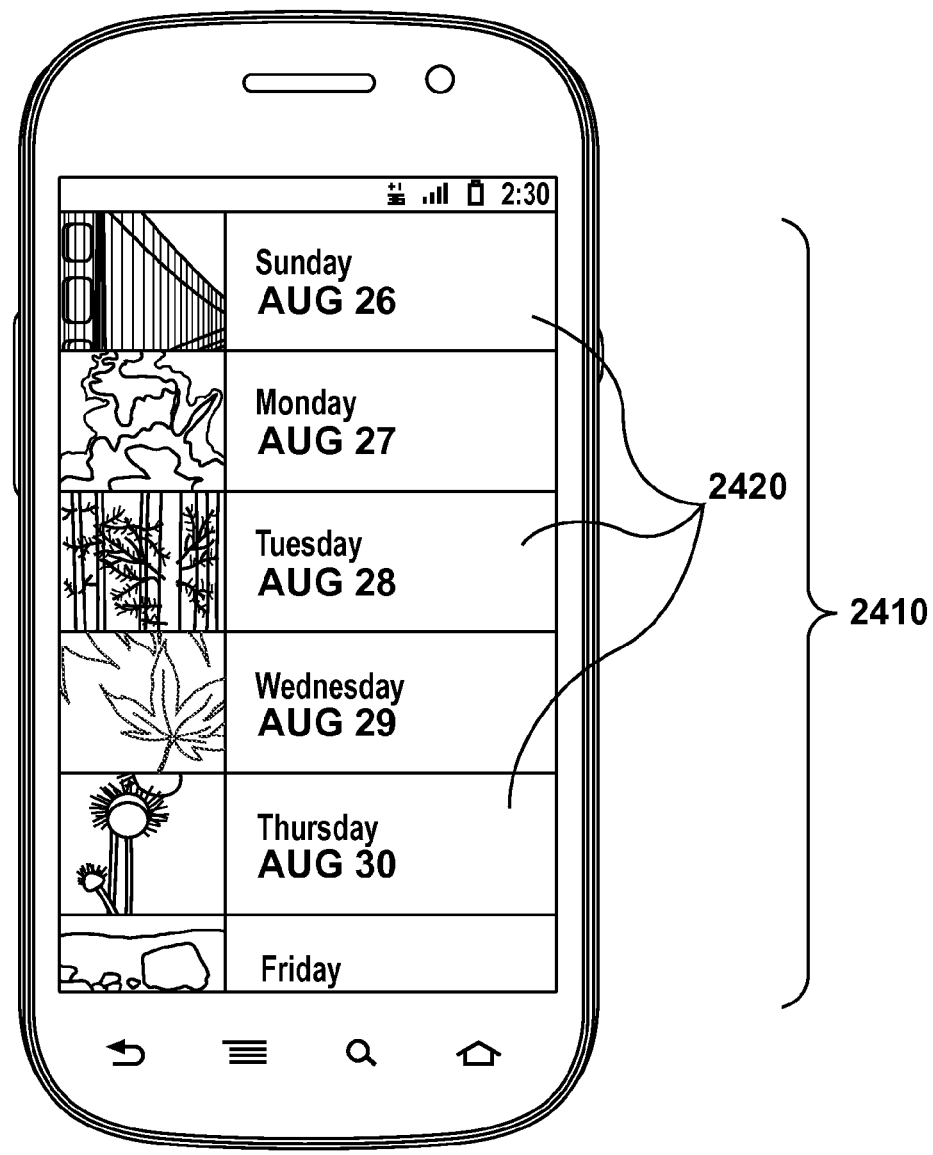
FIG. 24 is shows an exemplary week view user interface according to one embodiment.

As shown in FIG. 23, user interface 2002 may be configured to display a next week indicator 2310 if a user presses the touchscreen 240, maintains contact and drags the screen a predetermined distance that is greater than the predetermined distance required to display next day indicator 2120. It will be appreciated that the predetermined distances required to display the next day indicator 2120 and the next week indicator 2310 may be selected to provide a consistent and natural experience to the user of the application 201. For example, on some mobile devices 102, a user may press the touchscreen as shown at 2110 and drag the screen 1 centimeter to show the next day indicator 2120. If the user releases their contact on the screen while the next day indicator 2120 is shown then the application 201 will modify the user interface 1002 and show the timeline for the next day (i.e. August 30). If the user holds down the screen while the next day indicator is first shown and drags the screen a further 1 centimeter, the week indicator 2310 may be displayed on the user interface 1002. If the user releases the screen while the week indicator 2310 is being displayed then the application will update the user interface 1002 to show a weekly view 2410 as shown in FIG. 24. The weekly view 2410 may be a calendar week as shown or may be the next 7 days. If the user taps on any of the days 2420 shown in the weekly view 2410 then the timeline 1050 will be generated and shown for the day that was selected (e.g. if the user selected day 2420 of August 30 then the timeline 1050 shown on FIG. 22 will be displayed on screen 240).

Performing Tasks by Category

Reference is next made to FIGS. 13-19 to describe various interactions that a user may engage in with the user interface 1002. The application 201 is configured to allow a user to access and use services that are associated with a particular category/domain. As described herein, a user may press and drag the speak button 1014 to utter a voice command such as "Fine me sushi places in Toronto." The application 201 also provides a bundle of applications (referred to herein as mini-apps) that are configured to allow a user to perform task related to specific domains. For example, a user may access a restaurant mini-app to search for restaurants, a movie mini-app to search for and buy tickets to movies, a stock mini-app to track stocks in a portfolio and to buy and sell stocks, and so forth. In some embodiments, accessing functionality via one or more mini-apps lessens the need for voice instructions (and NLP engine processing) because the application 201 is already aware of the domain that the user is interested in exploring.

In some embodiments, a user may access the mini-apps by touching the screen as shown by contact point 1310 and dragging the screen in the direction of arrow 1312. If the user drags the screen a predetermined distance the application 201 will display the mini-app user interface 1410 shown in FIG. 14. Mini-app user interface 1410 may include one or more mini-app icons 1412 that can be clicked (i.e. pressed) by the user to show the corresponding user interface relating to the mini-app icon that was clicked. For example, icon 1412a relates to the calendar domain, icon 1412b relates to the alarm domain, icon 1412g relates to the restaurant domain, and so forth.

Figure 15:
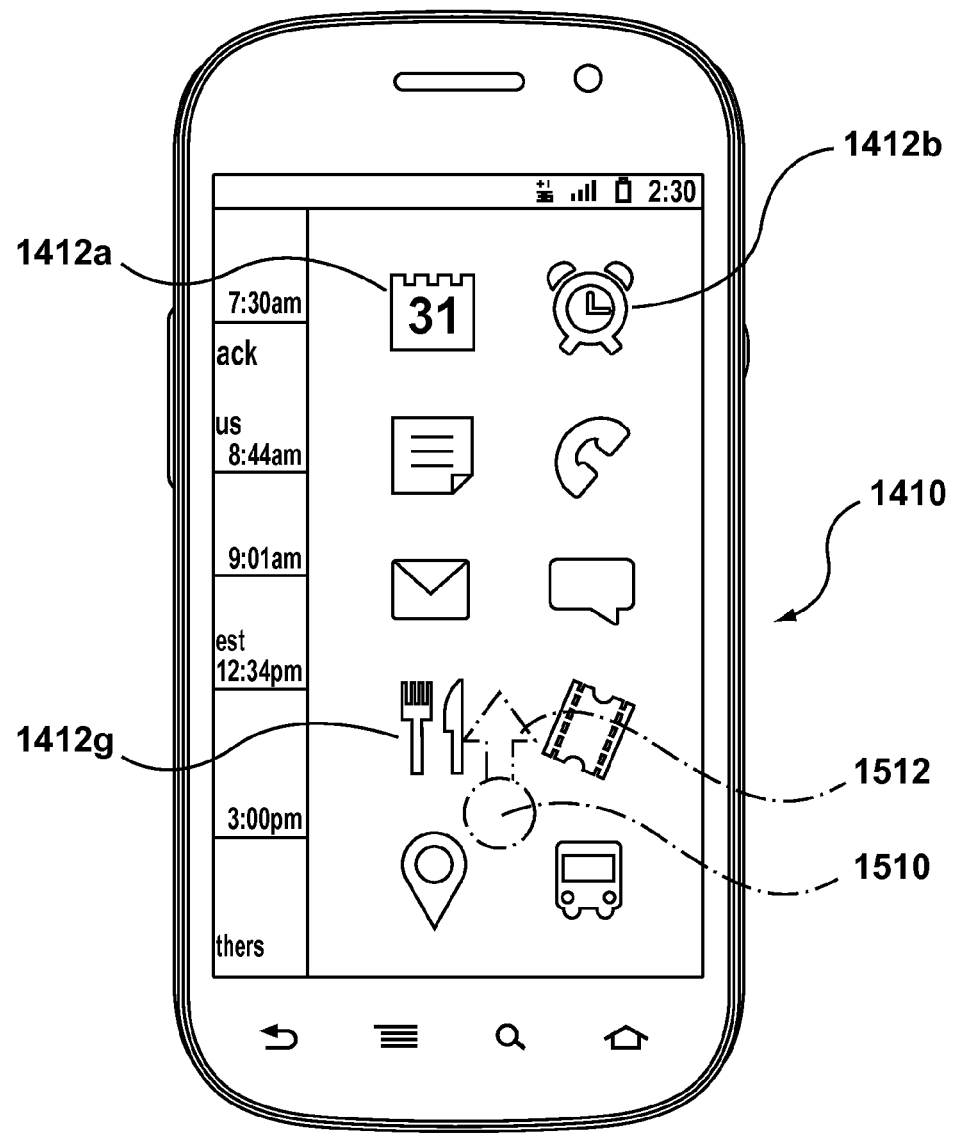
FIG. 15 is an exemplary user interface showing clickable mini-app icons and a scrolling action inputted by a user.
Figure 16:
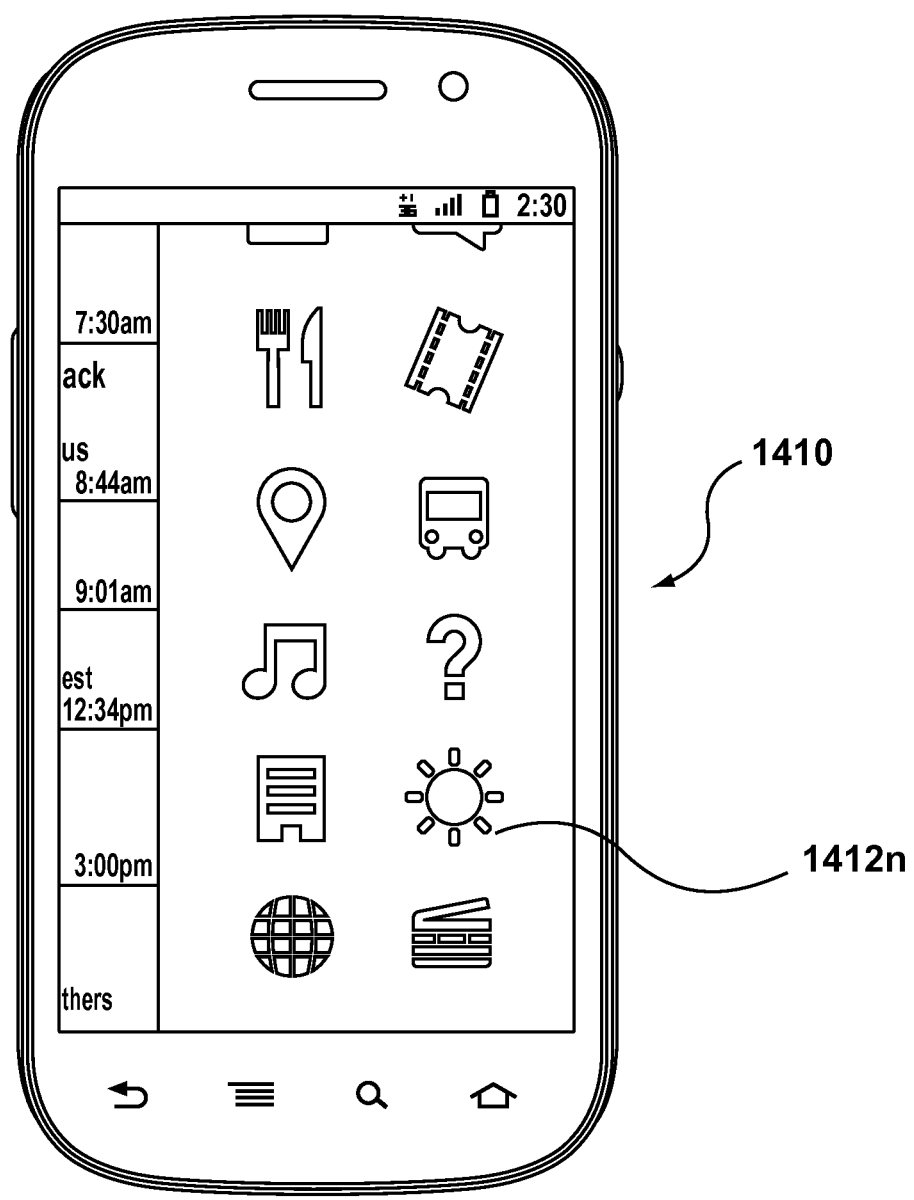
FIG. 16 is an exemplary user interface showing a different set of a mini-app icons visible after the scrolling action from FIG. 15 is performed.
Figure 17:
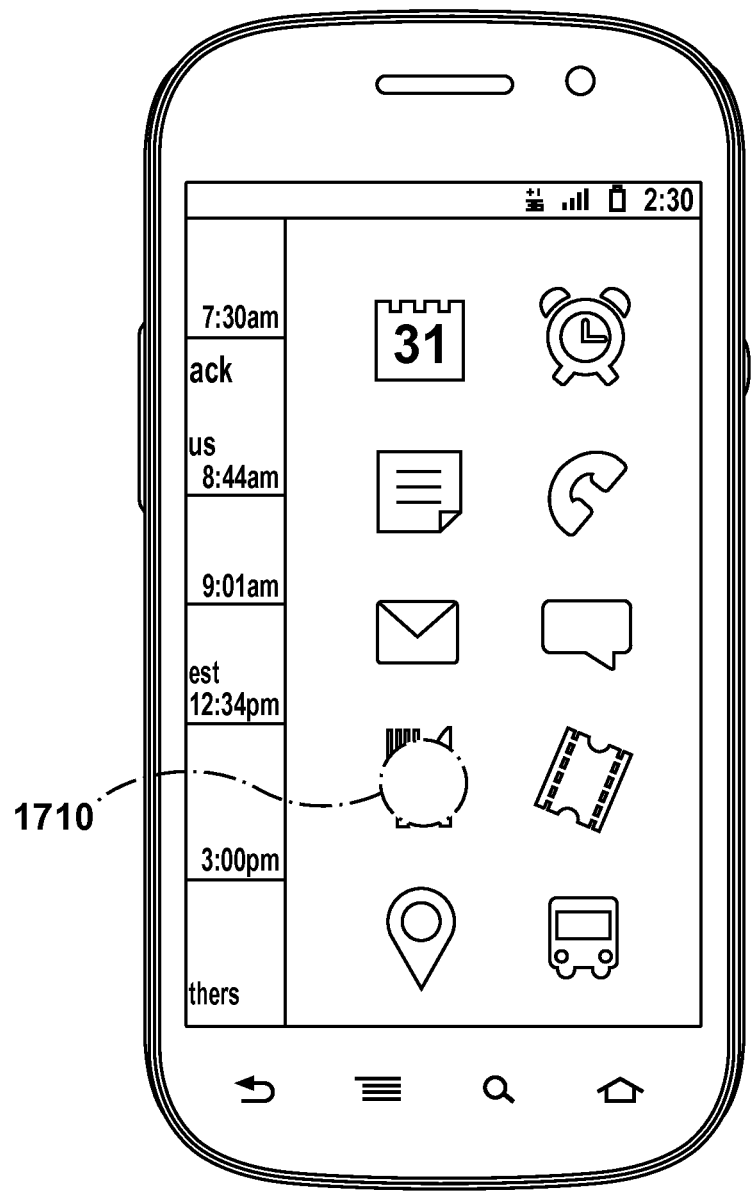
FIG. 17 is an example interaction showing a user selecting a particular mini-app icon.
Figure 18:
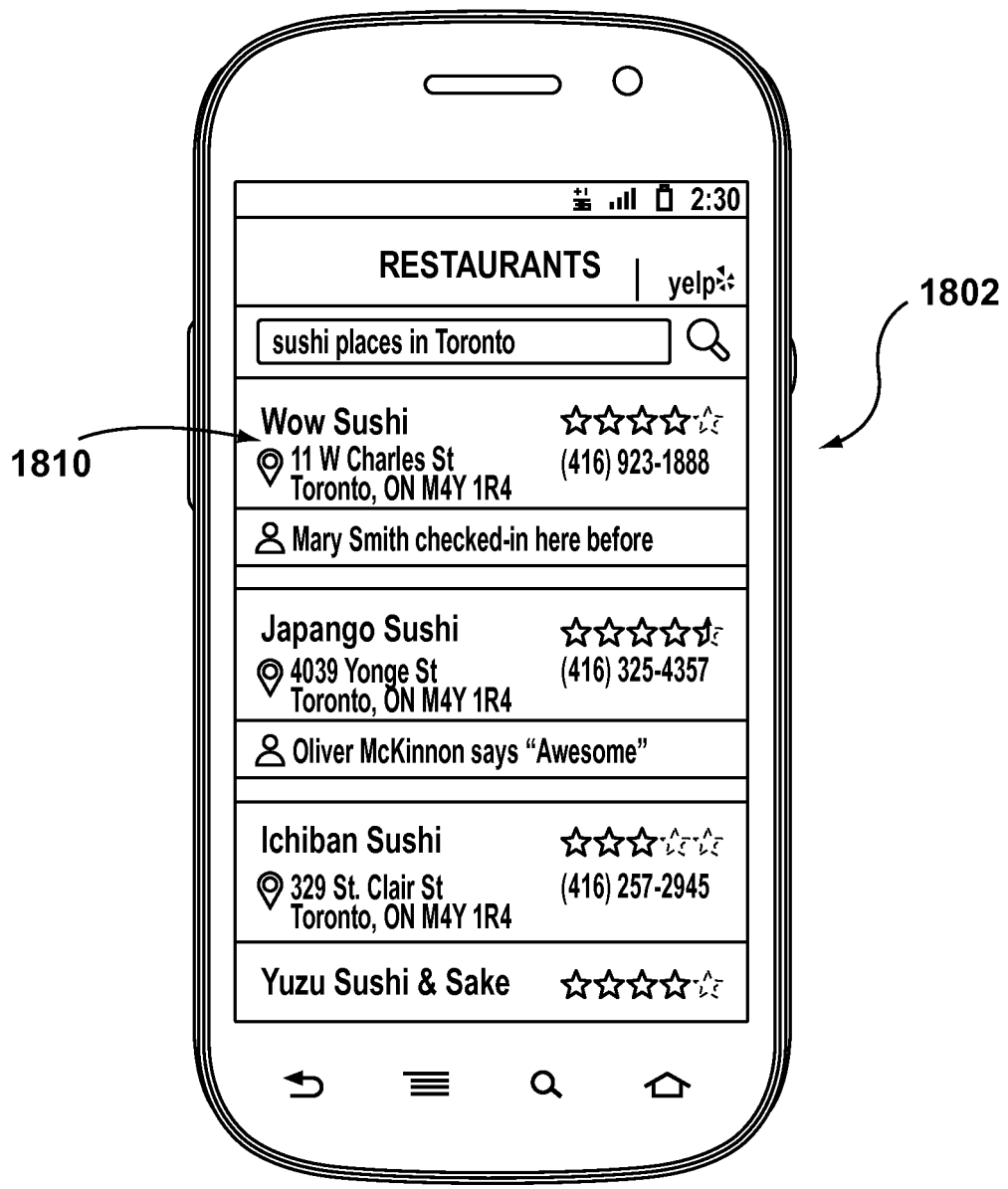
FIG. 18 is an exemplary results page showing restaurants close to the user's location and by cuisine according to one embodiment.
Figure 19:
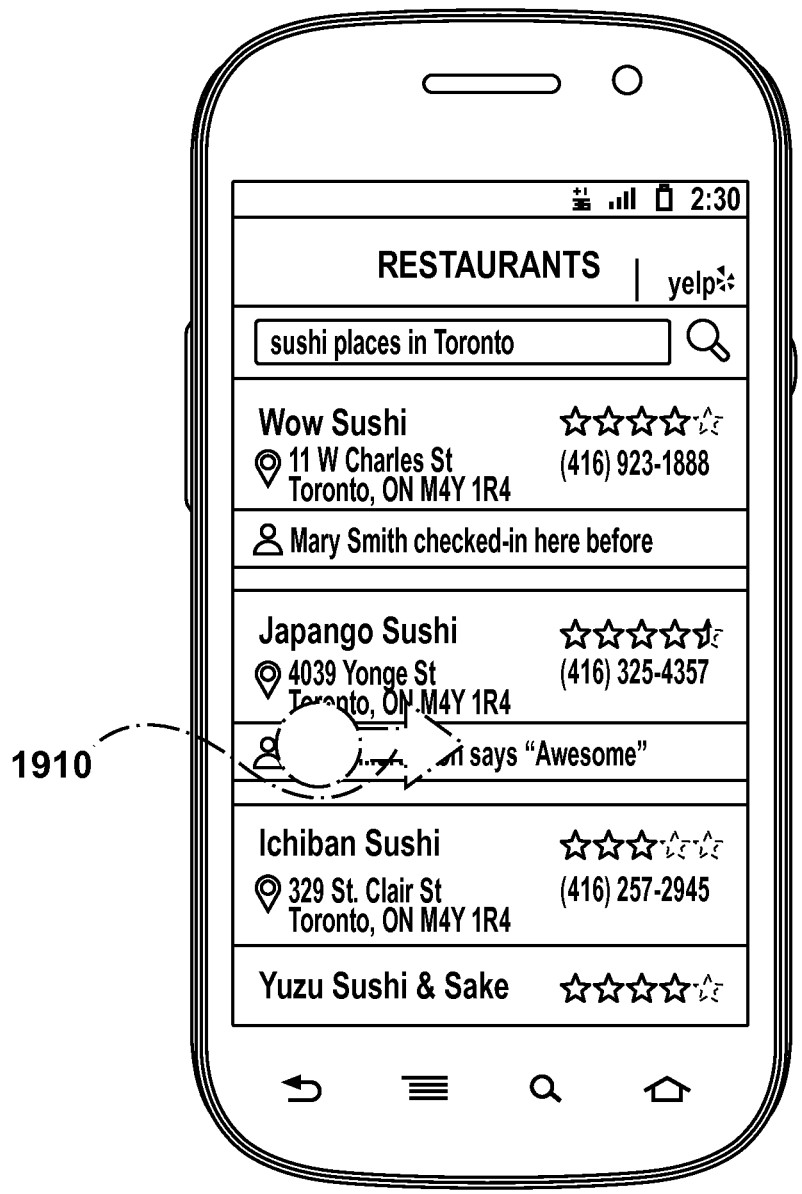
FIG. 19 shows an exemplary gesture for returning to the timeline screen according to one embodiment.

In some embodiments, not all of the mini-app icons will be shown on the user interface at the same time. For such occasions, the interface 1410 is scrollable up and down as shown in FIG. 15. The user can view additional mini-app icons by pressing the screen as shown by contact point 1510, and dragging the screen in the direction of arrow 1512. By scrolling the screen the user will be able to access additional mini-app icons as shown in FIG. 16 (for example, mini-app icon 1412n which allows a user to access weather functionality.

Pressing on a mini-app icon 1412 will bring up various screens depending on the embodiment of the conversational system 300 implemented as well as the settings of the application 201. For example, in one embodiment, clicking on the 1412g will bring up restaurants within a predetermined radius of the user, and may also be catered to the user's preferences based on explicit settings and/or previous searches. In the exemplary user interface 1002 shown in FIG. 18, the application 201 displays sushi restaurants that are within a predetermined distance of the user's current location. The user interface 1802 includes various restaurant entries 1810, each of which is clickable to bring up more details about the restaurant 1810 that was pressed. The user interface 1802 is scrollable up and down in the vertical direction so that a user may see additional restaurant entries 1810. A user may swipe the screen horizontally as shown by arrow 1910 (FIG. 19) to return to the timeline 1050 shown in FIG. 13.

In another embodiment, clicking on a mini-app icon (for example calendar icon 1412a) causes the application 201 to display the form 3710 which allows a user to enter voice command related to particular entities (i.e. fields) of the form 3710.

Figure 42:
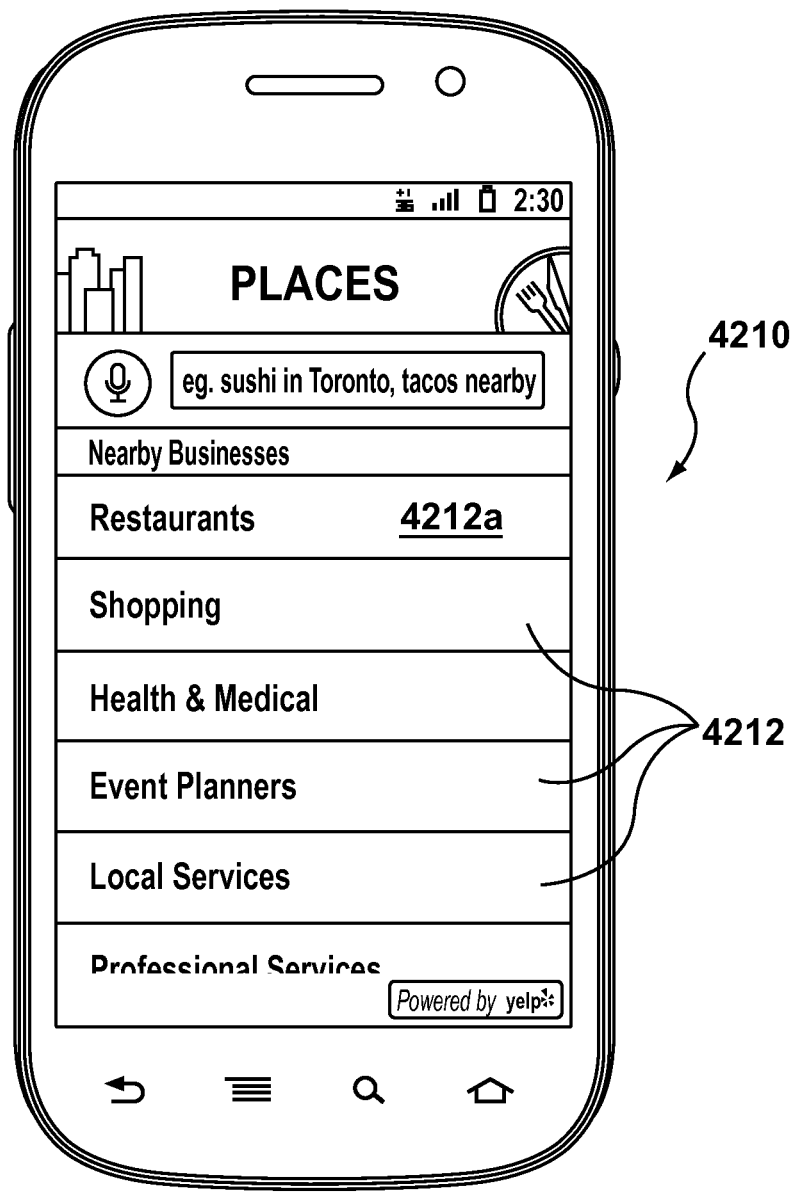
FIG. 42 is an exemplary screen directory for the business finder domain according to one embodiment.

In other embodiments, pressing mini-app icon (for example 1412g pertaining to restaurants) may cause the application 201 to display a business finder user interface 4202 (FIG. 42). A user may press one of the business categories 4212 (such as restaurant category 4212a) to display a restaurant finder screen such as that shown in FIG. 43. Restaurant finder screen 4302 may include a speech button 4314 that a user may press to utter a voice command (such as "Sushi, Toronto") as well as a text field 4316 that displays the text command generated by ASR engine 312 that represents the voice command uttered by the user.

Figure 43:
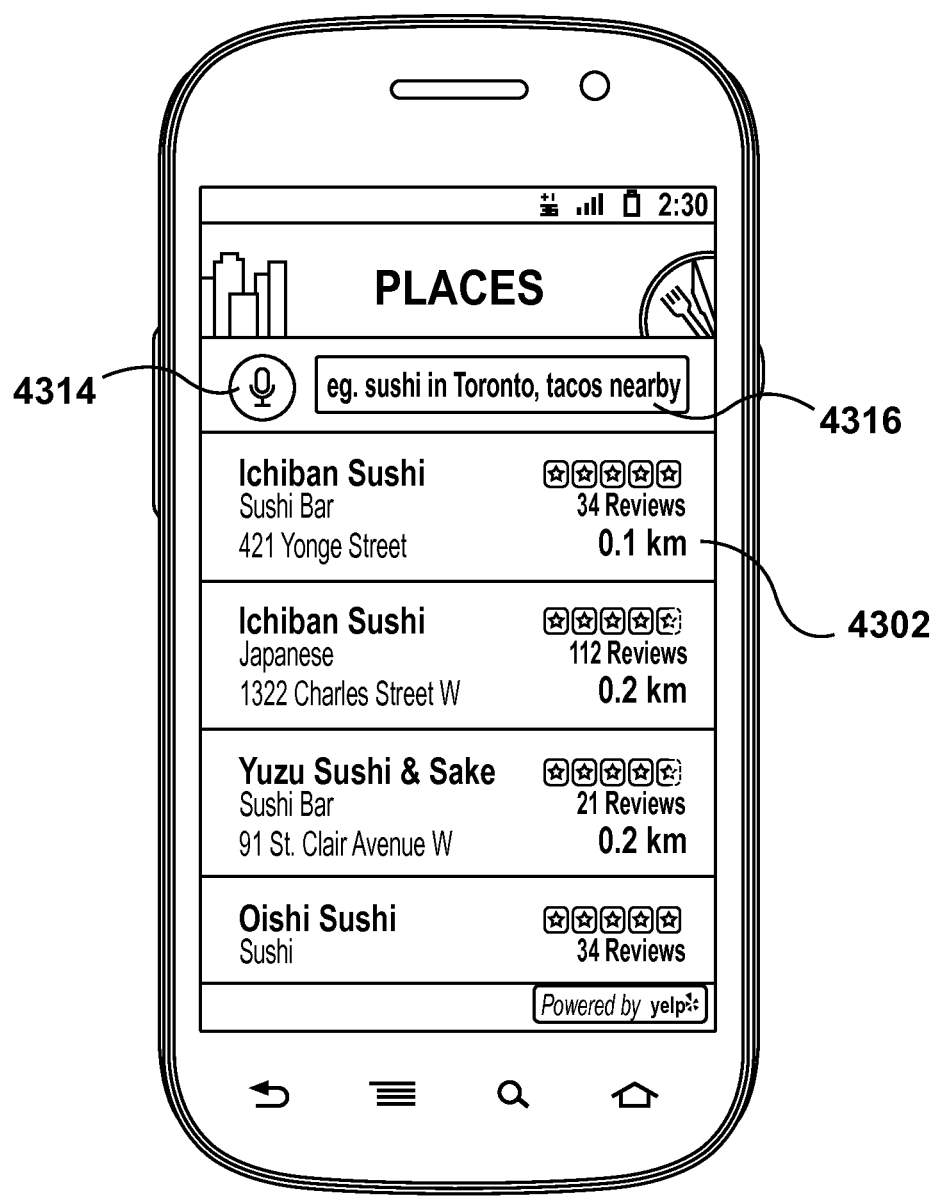
FIG. 43 shows an exemplary results screen for the restaurants domain according to one embodiment.

If a user utters a voice command then the application 201 directs voice command (which may be in any one of several audio formats such as raw audio (pcm) or various lossy or lossless audio formats which supported by the exemplary ASR engine 312. The ASR engine 312 generates a text command representing the voice command and passes this text command to NLP engine 314 which performs entity extraction. The NLP engine extracts the relevant entities (in this example, "Sushi" and "Toronto") and creates a template representing the derived intent of the user and provides the template to services manager 330 for processing. The services manager 330 is configured to select one or more services 118,120 from a list of available services and calls an appropriate service 118,120 to accomplish the derived intent of the user. In the exemplary interaction shown in FIG. 43, services manager 330 may identify and call an external service 118 that is configured to provide restaurant listings. The results from the service 118 are provided to display manager which formats the result for presentation by the application 201 as shown in FIG. 43.

Processing Voice Commands

The processing of voice commands by the conversational system 300 will now be described in detail. Given an example voice command of "Schedule a meeting with Bob for 3 p.m. today at Headquarters", NLP engine 314 may classify the command as relating to the calendar domain and further identify the desired task as scheduling a meeting. NLP engine 314 may further derive one or parameters from the text command such as the meeting attendees (i.e. Bob), the time of the meeting (i.e. 3 p.m.) and the location of the meeting (i.e. Headquarters). The location "Headquarters" may be stored as a user learned preference that is stored in database 315 and may be associated with an actual address. Once NLP engine has derived the relevant information from the text command, NLP engine (or another module of intelligent service engine 150) may create a software object, template, data structure and/or the like (referred to herein as template) to represent the intention of the user as embodied in the text command. The template may be stored in database 315 for further access, to learn from past user behavior, for analytical purposes, etc.

Once NLP engine 314 has finished processing the text command, a template that represents processed command may be provided to services manager 330 to process the task desired by the user. Services manager 330 uses the domain and the task the user wants to perform to determine an appropriate service from a services list. Continuing with the meeting example, the service manager 330 may determine that an appropriate service for accomplishing the desired task is an internal service 120 that is provided by the operating system. In other example interactions, services manager may identify one or more external services 118 for accomplishing the desired task. The internal and external services 120,118 may be accessible by an application programming interface (API) as will be understood by a skilled person in the art. The internal/external services 120,118 may provide results in any of several known formats such as an Extensible Markup Language (XML) or JavaScript Object Notation (JSON) format. The response provided by the API called by services manager 330 may then be directed to the display module 340 for formatting of the result and communication of the result to the mobile device 102. The application 201 receives the formatted result from display module 340, and may further format the result depending on the specific capabilities and/or setting on the device 102. Application 201 displays the result to the user in the form of an exemplary user interface 1002 where the result may be interacted with by the user.

Viewing Search History

Figure 20:
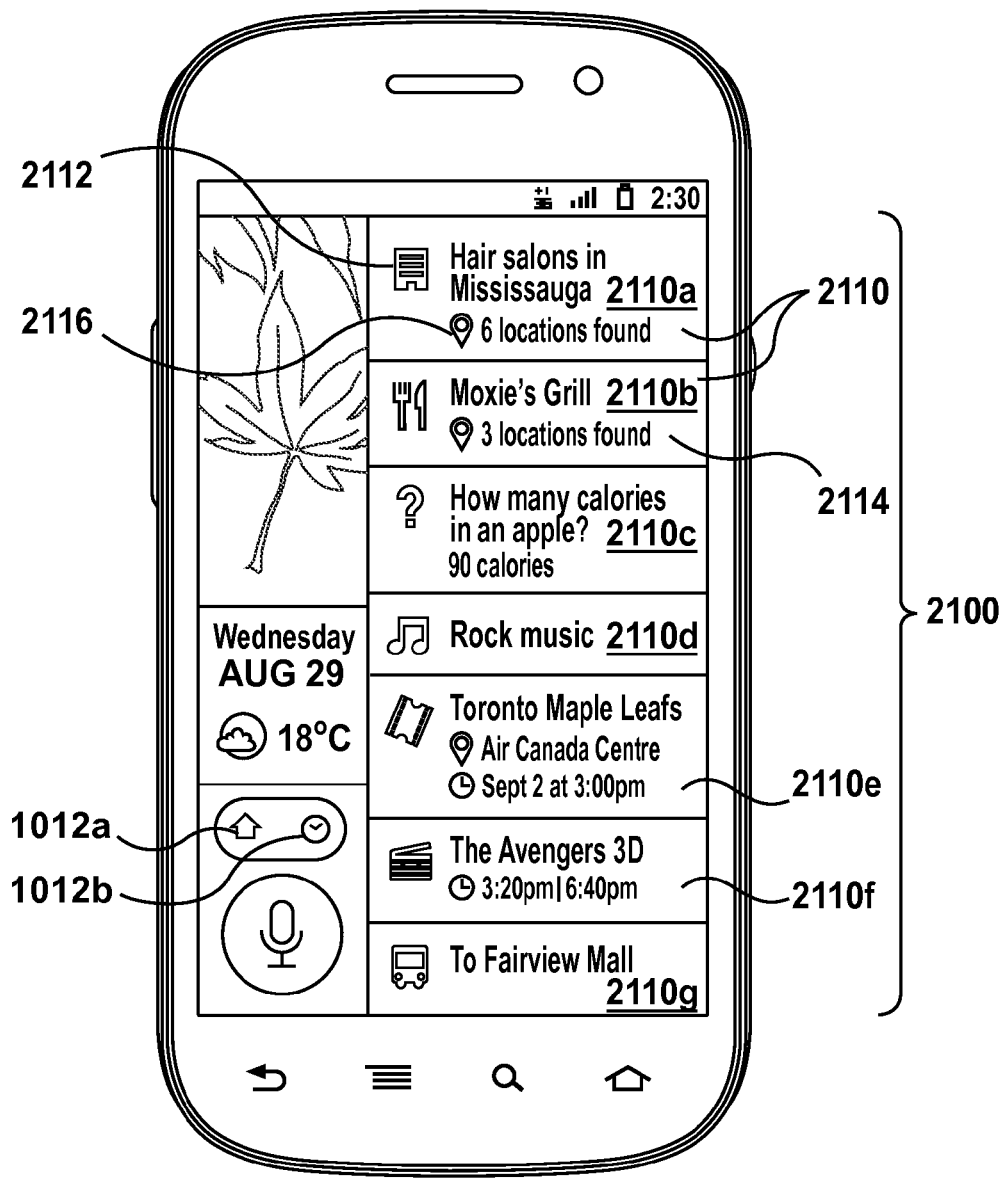
FIG. 20 shows an exemplary search history user interface.

Reference is next made to FIG. 20 which displays an exemplary search history timeline 2100 configured to display the results of searches and/or task performed by the user using application 201. The search history timeline 2100 may be accessed from the timeline 1050 screen by pressing the toggle button 1012b.

Search history timeline 2100 includes one or more search entries 2110, each of which correspond to a previous search and/or task that was conducted by the user. Each search entry 2110 includes information that allows a user to quickly glance at the search history timeline 2100 to grasp what was accomplished in the past and to further look into an entry 2110 if desired.

For example, the first search entry 2110 includes a title caption "Hair Salons in Mississauga", an icon 2112 that represents the business finder domain, a search detail caption 2114 that gives more information about the search results, and may also include other captions and/or icons such as navigation icon 2116 that may be pressed to find directions to various businesses that match the search performed.

As can be seen in FIG. 20, the history timeline 2100 may include many different entries 2110, each of which provide different information about the search/task as well as a different graphical representation. For example, entry 2110b represents a search for a restaurant by name (i.e. "Moxie's Grill) and the entry 2110b includes a icon 2216 that may be pressed to view the "3 locations found" and their associated address, phone numbers, directions, etc, Entry 2110b represents a knowledge search that the user performed and includes the text of the search ("How many calories in an apple") as well as the result of the search ("90 calories"). Entry 2110d indicates that the user played some rock music on their device recently. Pressing on the entry 2110d may bring up details about the song (i.e. artist, album, song title, etc.) as well as playing the song if the user desires, Entry 2110d represents an entertainment search on a Toronto Maple Leafs game and includes icons 2116, 2118 for finding directions to the event location (i.e. the Air Canada Centre) as well as providing information about the game. Event 2110f represents a search in the movies category and includes the name of the movie searched (i.e. "The Avengers 3D") as well as show times. Finally, entry 2110g represents a transit related search performed by the user to Fairview Mall. A user may click on the icon 2112 to find the directions to Fairview Mall from the user's current location and/or the departure location that the user may have previously searched.

At any time, a user may press the goggle button 1012a to return to the timeline 1050, an example of which is shown in FIG. 10.

Timeline Synchronizer 4502

Figure 45:
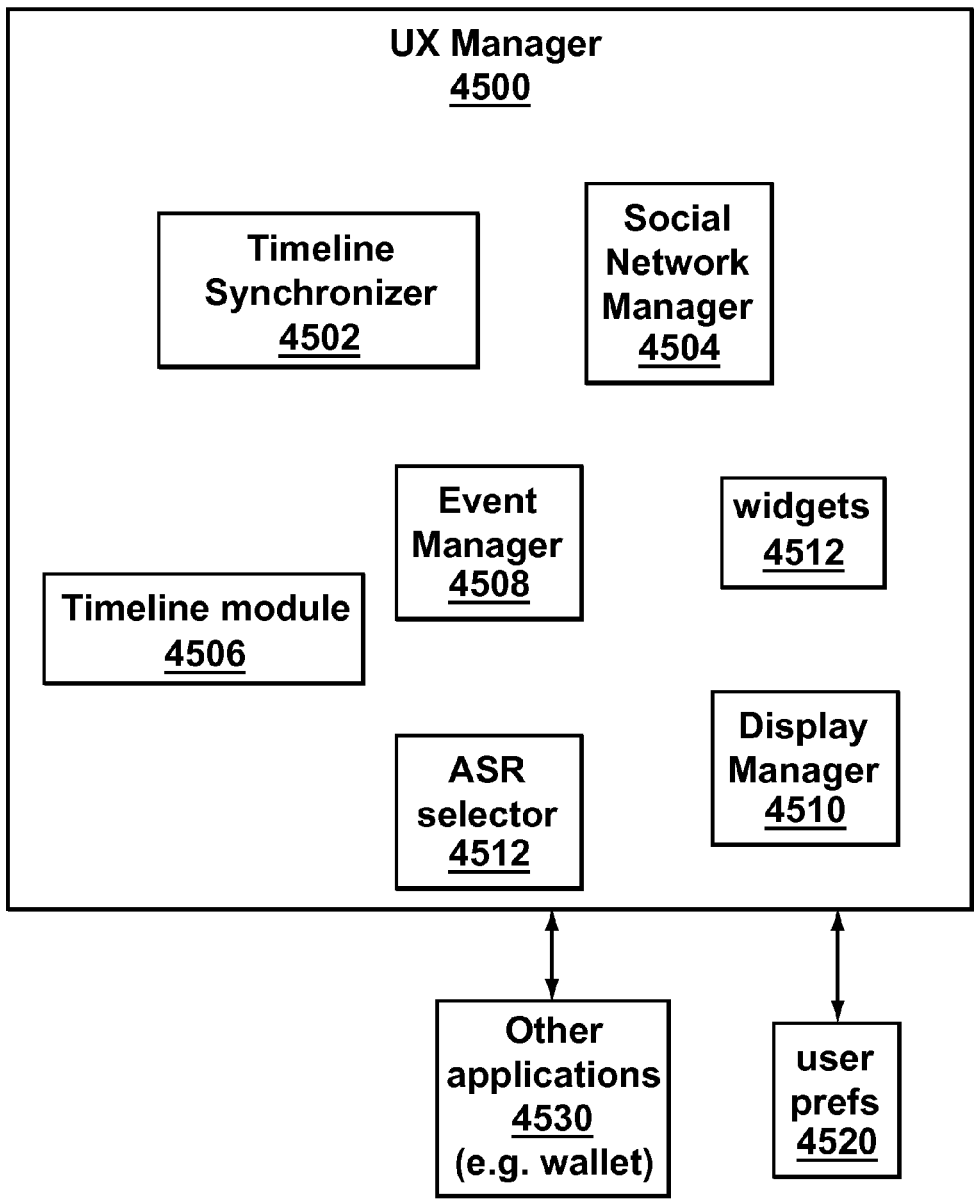
FIGS. 45-54 illustrate exemplary user interfaces provided by a UX manager of the invention according to one embodiment.

Reference is next made to FIG. 45 which shows some components of a user experience manager 4500 that may be included with application 201 on smartphone 102. User experience manager 4500 may be configured in one embodiment to display a user interface to a user of the application 201 and to accept input and provide output from the user as desired. The Ux manager 4500 may include a timeline synchronizer 4502 for synchronizing the user's timeline across devices and applications. In one embodiment, timeline synchronizer monitors a user's electronic calendar applications to ensure that the timeline shown by the application 201 accurately reflects a user's interaction with other calendar applications. For example, a user may sign onto application using an identifier such as an email address. If the email provider (e.g. gmail) provides calendar functionality, the application 201 adds email calendar to an electronic database containing digital calendar information) and periodically pulls information from the external calendar(s) and populates events, reminders, alarms, birthdays, etc. from the external calendar into the timeline displayed herein.

In another embodiment, when certain tasks are performed by the user (such as the user changing their status on a social network such as Facebook™) the UX manager may prompt the user to enter their authentication information for the social network sites which is stored electronically in a database containing information about social media sties accessed by the user. The syncrhronizer updates the relevant social media sites (associated with the user) when events are added using application 201. The events that may be added to the social media sites may be type-specific, for example, birthday events may be synchronized and added to the relevant social media sites, but regular meetings may not. Which event-types are synchronized may be selectable by the user via a settings page presented by the Ux manager. As well, the synchronizer 4502 periodically (or upon the happening of certain events) accesses the social media site via an API using the authentication information provided by the user. For example, in one embodiment the synchronizer 4502 updates the social media sites every minute, when a user adds events to their timeline on the application 201, and so forth.

Figure 54:
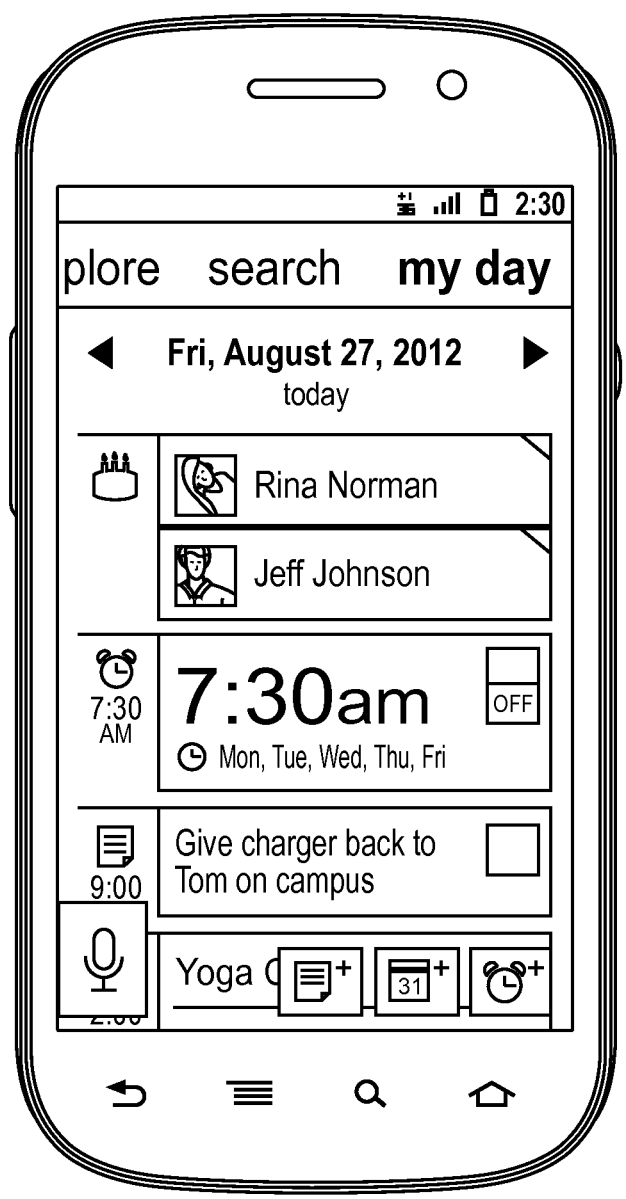

Reference is made to an exemplary user interface screen shown in FIG. 54. As shown, the user has added several events to their timeline, including two birthdays (for Rina Normal and Jeff Johnson), an alarm, a reminder, and a yoga event. As shown, the events are color-coded to illustrate the type of the event with birthdays being in blue, reminders in green, alarms in aqua and the yoga event in orange. The color-coding is merely exemplary and may change for different implementations. The birthday events include a picture for each contact, which may be retrieved from a social network event by timeline synchronizer 4502. Although the birthday events show up in the timeline 1050 of application 201, the events may have been added to a social media network that the user accesses. Synchronizer 4502 is configured to access one or more social network sites via an API, retrieve items that may be shown on a calendar, and to create the calendar event with the color coding being determined by the UX manager 4500.

Intelligent Booking of Events

Figure 46:
Figure 47:
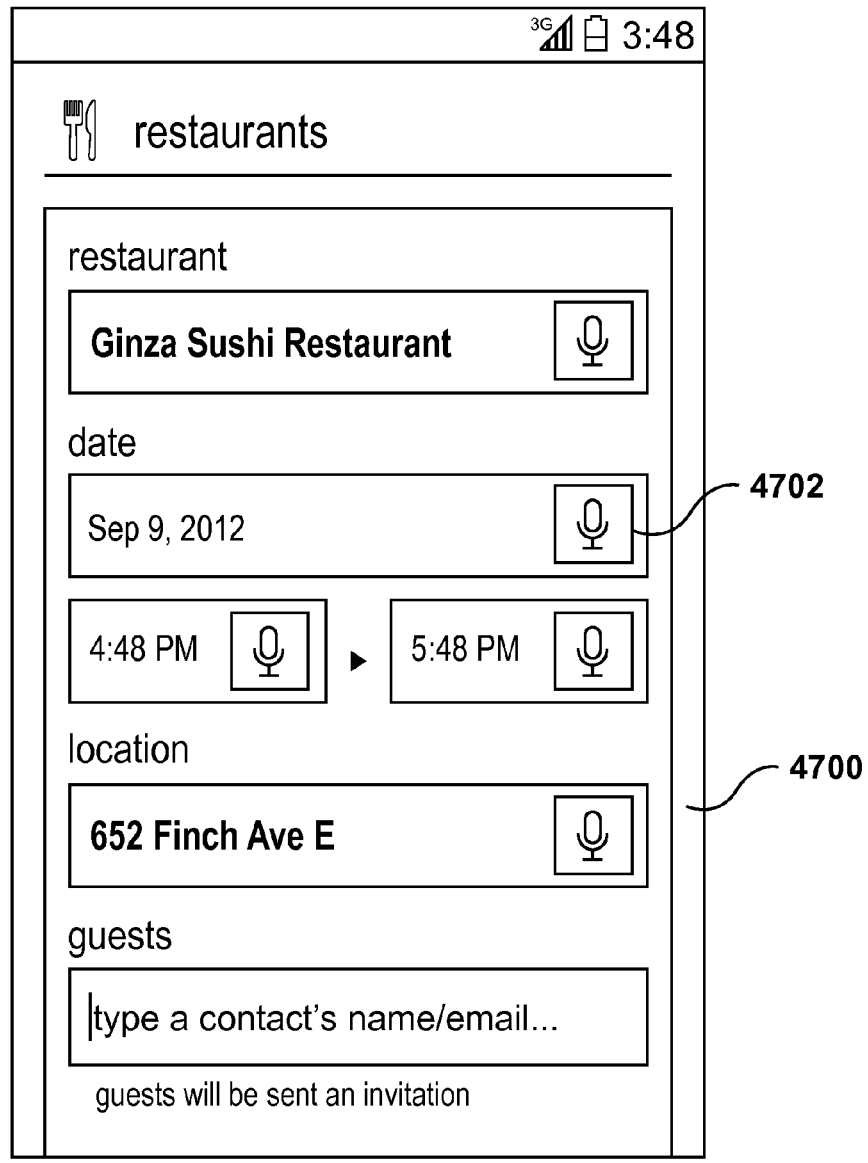

Referring next to FIGS. 46-50 exemplary interactions are shown with the user interface. FIG. 46 shows the result of a user asking a query such as "Find me a Sushi restaurant near Finch Avenue". The UX manager 4500 may have presented a variety of Sushi restaurants matching the user's query and the particular restaurant shown (Ginza Sushi) is the result of user selecting the restaurant from the results screen (not shown). The screen 4600 shows details for the restaurant including address, phone number, rating, and provides a link to a content provider such as Yelp™. The Ux manager 4500 may also provide a variety of sharing icons such as Facebook, Twitter, email and text message.

The screen 4600 includes a button "Add to calendar" that the user may press using the touchscreen. The Ux manager receives a touch input, determines where on the screen the user pressed, and if the touch was in predetermined vicinity of the "add to calendar" button, displays the screen 4700.

Ux manager 4500 may populate fields on screen 4700 with information extracted from the query, implicitly based on rules, and the restaurant information. For example, the application 201 may apply rules such as "assume the current date if no date provided", "book restaurant events one hour from the current time for a duration of one hour", and the like. These rules may be modified by the user by accessing a settings page (not shown) that is obtainable through the user interface. Certain fields have a speech icon 4702 adjacent to the field for uttering voice commands for populating the field. The ability to provided commands directly to a field provides several benefits, including allowing the user to utter specific commands such as "at 7 p.m." to set a time. Such a command may not have to be classified using an NLP engine because the application 201 is aware of the type of command being uttered as the command is made in relation to a particular field.

Figure 48:
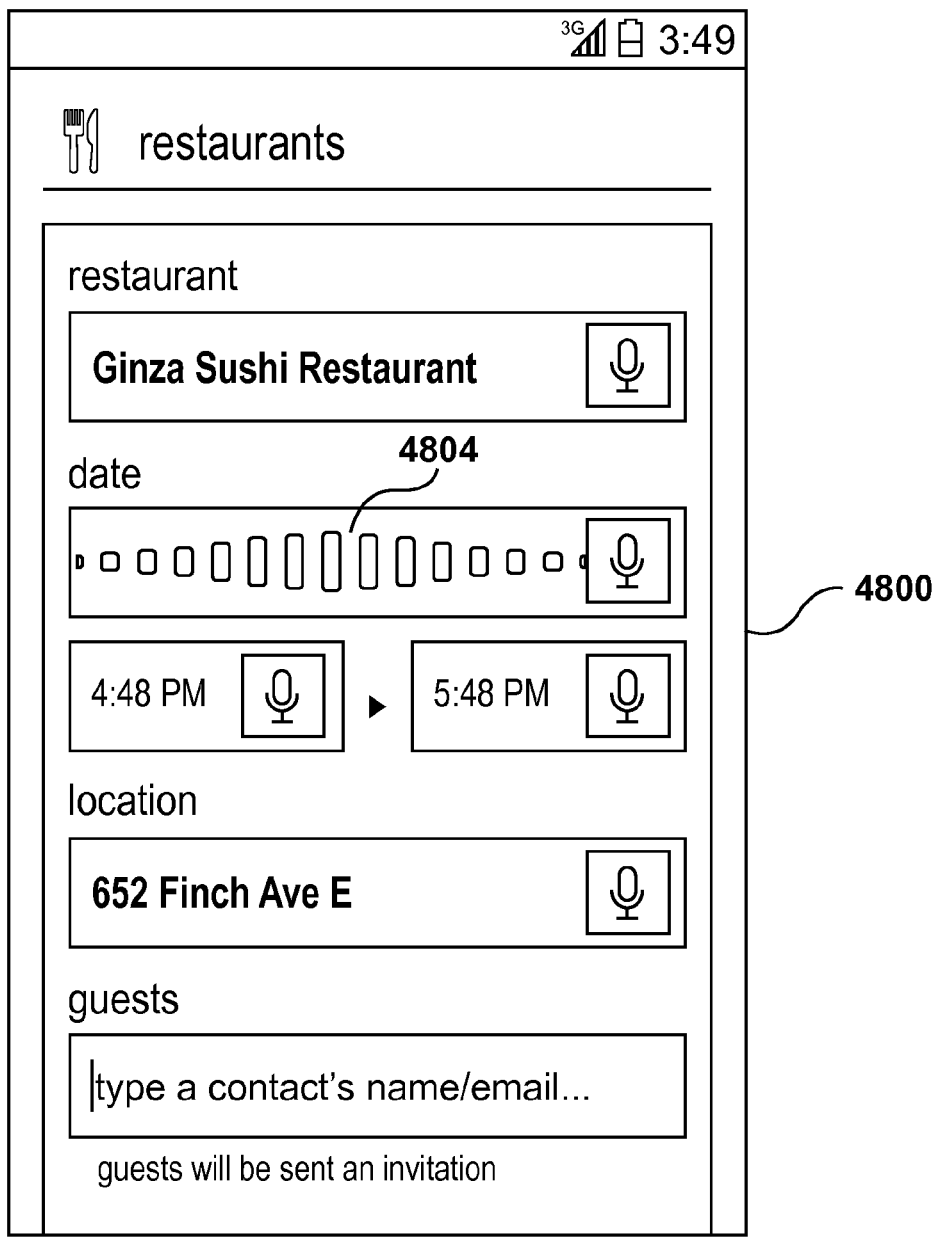
Figure 49:
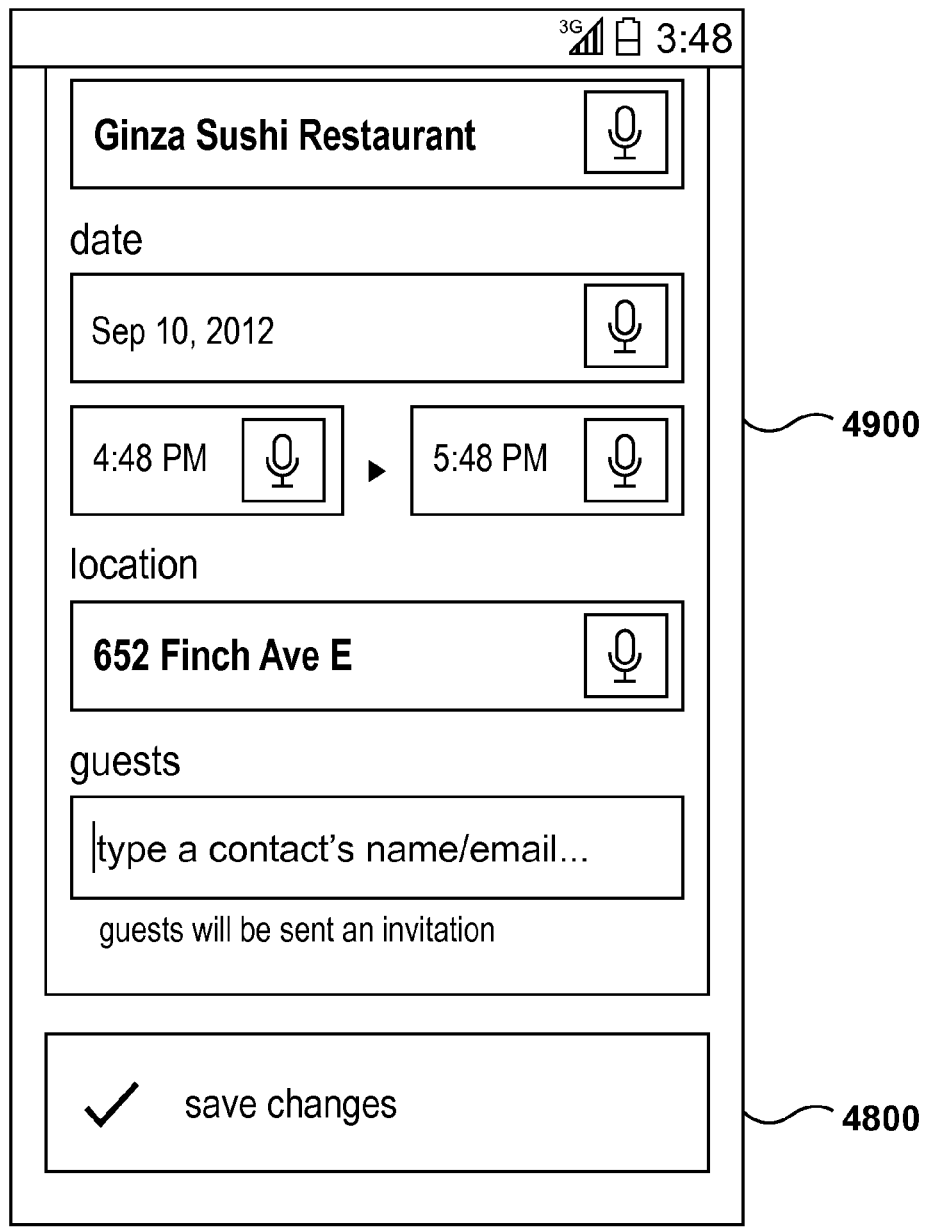

An exemplary interaction with the icon 4702 is shown in FIG. 48 in which the user has pressed the icon 4702 adjacent to the date field. A dynamic waveform may be displayed in one embodiment that changes as sounds is received by the microphone. In one embodiment, the waveform 4804 is modified by the Ux manager 4500 in real-time to provide a visual representation of the sounds uttered by the user. The visual feedback provided by waveform 4804 allows the user to know that the application 201 is accepting the words substantially as spoken and that the hardware of the smartphone is working properly. As shown in FIG. 49, the date field on screen 4900 has been changed to "Sep. 10" where previously the date was set to "Sep. 9". The user made this change by pressing on icon 4702, and uttering a date in one of a variety of formats that may be supported, for example: "September 10$^{th}$", "three days from now", "on Monday", and so forth. The UX manager 4500 continually samples microphone and dynamically generates the waveform 4804 which may visually represent the spoken sounds. If no sounds above a certain amplitude is received for a certain time, UX manager terminates receiving sound and sends the raw audio to an ASR module for performing speech to text conversion.

Figure 50:
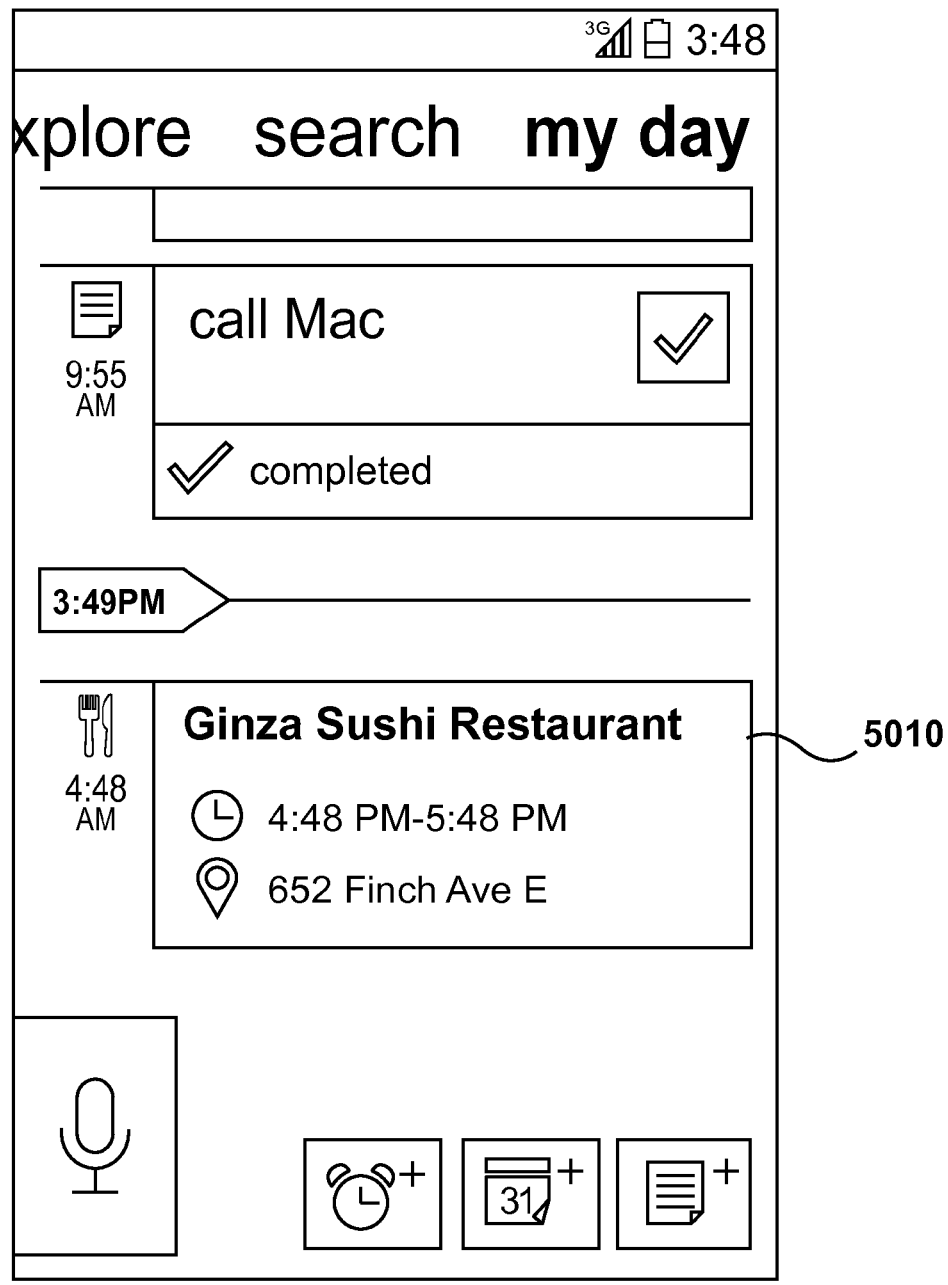

To create the event, the user may press the "Save Changes" button at which point the Ux manager instructs the timeline module to create an event with the information provided by the user. Because the application has assigned the dark orange color to restaurant events, the timeline module 4506 creates an event 5010 and the screen shown in FIG. 50 is displayed by the UX manager to the user.

In one embodiment, the application 201 includes an Event Manager 4508 for intelligently creating, managing and updating events. The events created (such as restaurant 5010) may be dynamic, in that periodically the event manager 4508 retrieves information for scheduled events from a content service via an API to see if any event information has changed. The event manager 4508 may periodically access information from the content service for "Ginza Sushi" and may notify the user upon the happening of certain events. For example, event manager 4508 may notify the user that new reviews have been added, that the rating (i.e. number of stars in this example) has changed, that the restaurant is closed, that the restaurant or others nearby are offering deals, weather information as the event approaches, transit information, directions, and so forth. As mentioned above, this information may be updated dynamically by the event manager 4508 so that the user does not have to go looking for certain information on their own. The application 201 may also provide additional information and/or hints to the user as the event approaches. For example, if on the day of the event the weather forecast calls for rain, the application 201 may notify the user with a message on the interface such as "It looks like rain, perhaps you should bring an umbrella, or You may want to leave 30 minutes early because of the weather", and the like.

In one embodiment, the event manager 4508 access social media sites via the social network manager 4504 to coordinate the event. For example, if a user cancels or modifies the event, the event manager 4504 may notify the other attendees which may include friends on a social network. The event manager 4504 may also provide functionality to buy tickets for certain events like concerts and movies, book restaurants, and the like. The event information may tailor the functionality provided with depending on user preferences, other applications, the friends that the user wants to invite, and so forth. For example, say that a user creates a movie event for a particular movie and adds a friends named "Joe" who is social media friend, Event manager may review Joe's wall or other information on social media site to determine if Joe has already seen that movie or if Joe is not a fan of the movie genre (eg. Drama). Event manager may also access Joe's calendar to see if Joe is available on the particular date and time for which the event is scheduled. If any of the conditions are true then the event manager 4508 may notify the user with a message tailored for the situation, such as "Joe has already seen that movie", or "Joe is not a fan of drama, maybe you can try another movie", or "Joe is not available at that time", etc.

In one embodiment, the event manager 4508 may provide certain widgets 4530 such as a voting system to certain events. Each invitee of the event may be able to access the widget in certain platforms, such as via application 201, a social media site, through their calendar, through email, and so forth. For example, a user may schedule a restaurant event, invite contacts and acid a widget allowing the attendees to vote on particular cuisine. Each user may receive a message such as "Would you like Chinese, Italian, or Pizza" and can vote electronically using the platform that provided the message. The results of the vote may be viewed in real-time and may close after all the attendees have voted or after a certain time. Once the voting is finished, event manager 4508 may notify each user with a message, such as "Chinese food it is!". In one embodiment, the event manager 4508 then creates a list of suitable restaurants by accessing a content provider via an API and provides the results to the attendees. In one embodiment, event manager 4508 may create another vote for the specific restaurant.

In one embodiment, event manager 4508 intelligently manages and resolves conflicts and provides conflict notification. The event manager may assign a priority to events and allow certain events to override others. The priority assigned may be type specific, for example, meetings may have a higher priority than movies so that a meeting event scheduled will always override a movie event. In another embodiment, the event manager notifies the user of a conflict and suggests another time for one of the events based on the user's and/or the attendees schedules. For example, if a user invites Joe out for dinner, event manager may access Joe's calendar to check Joe's availability. If Joe is already busy that date and time, the event manager may create a notification such as "Joe is busy that day, but he is available on Saturday for dinner".

In one embodiment, the event manager 4508 provides additional functionality if the user has certain applications available on the smartphone. For example, the event manager may search the operating system for a wallet application (i.e. a payment app) and if one is installed, offer payment functionality for certain events such as movies.

Speech Selector

Figure 51:
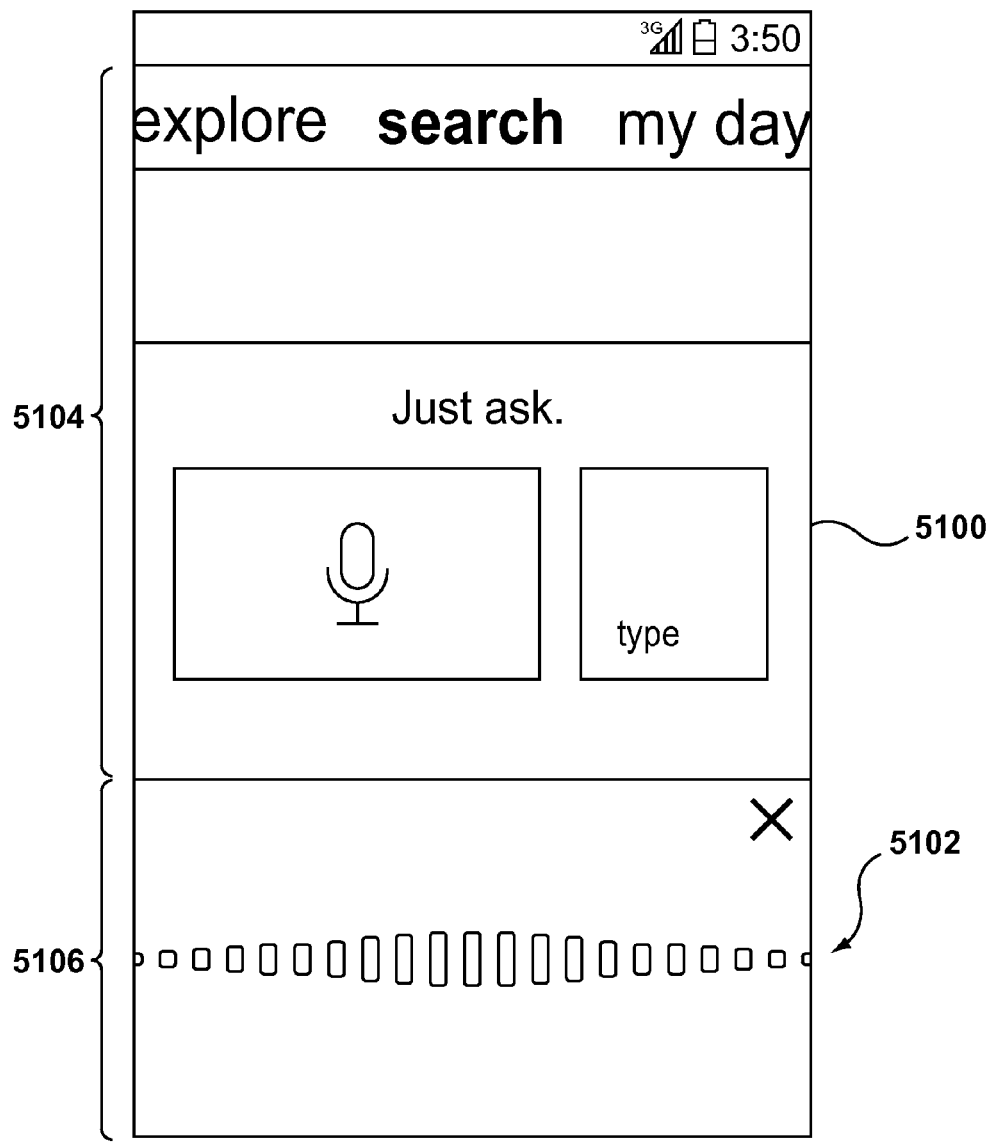
Figure 52:
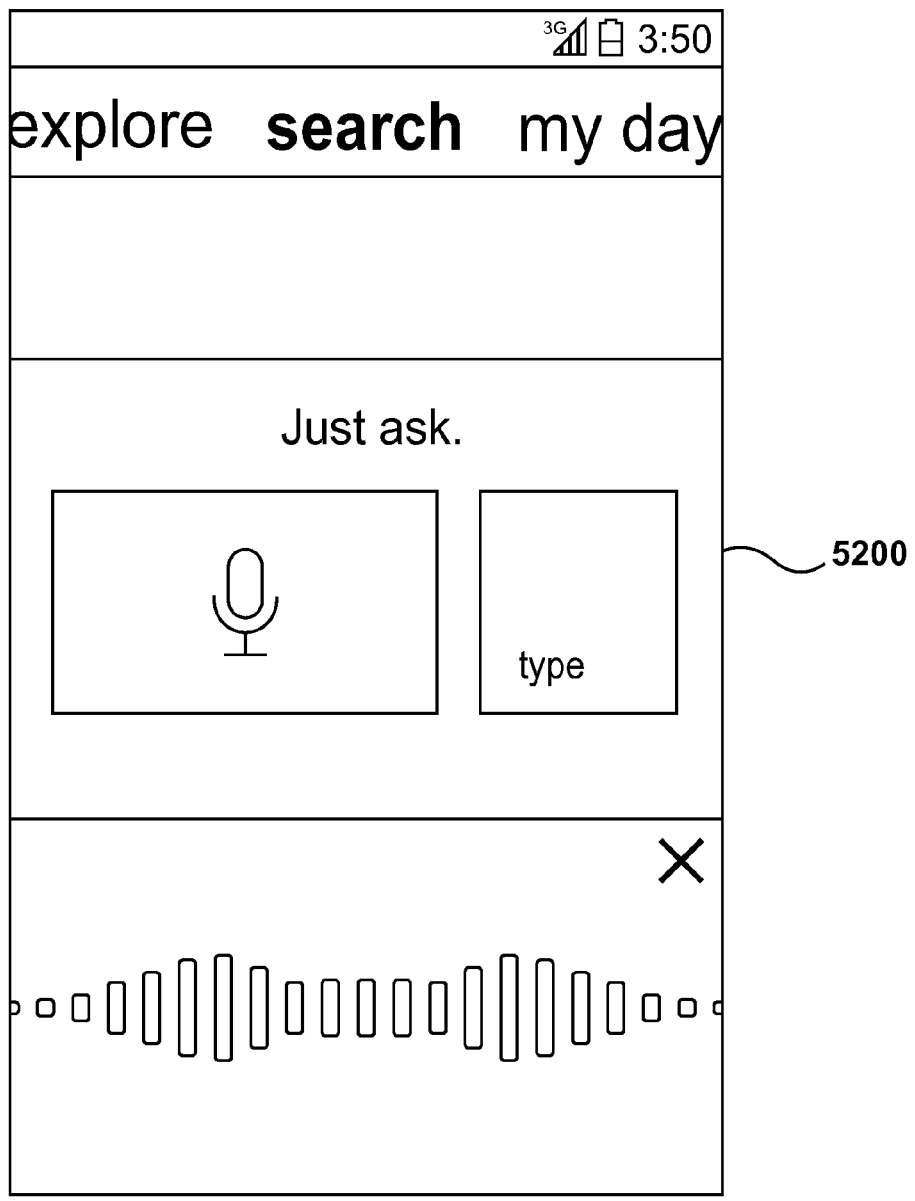

Reference is next made to FIGS. 51 and 52 to illustrate the speech selector of the invention, according to one embodiment. As shown, user interface 5100 includes a waveform 5102 representing the user's voiced sounds, an upper area 5104 showing the background screen slightly shaded out (or otherwise modified), and a lower area 5106 showing the active area and the waveform. The lower area includes an icon (in this case an "X") that a user may press to cancel the microphone processing without having the query processed by NLP engine. A user may hit the "X" button if for example they utter a query by mistake, if someone shouts in the background, or for other reasons. A predetermined area of the lower area 5106 may be pressed to terminate the microphone and have the query processed by NLP engine. A user may wish to terminate the microphone and have their query processed as soon as the user is finished uttering their query. This may be useful when background noise is causing the microphone to continue sampling sound even though the user is finished uttering the query. In one embodiment, the pressable area to terminate the microphone and have the query processed by NLP engine is the waveform 5102 itself or area within a predetermined area of the waveform. Cancelling speech processing may also be accomplished in one embodiment by pressing any part of the upper area 5104 which has the same effect of pressing the "X" button.

In one embodiment display manager of application 201 monitors (at a predetermined sampling rate) touch events via the operating system (OS) of the smartphone. If the OS returns a touch event, the display manager checks the coordinates of the touch event to determine which action should be taken. If the touch event is in the upper area or in the vicinity of the "X" button, display manager instructs the microphone (and ASR module if necessary) to terminate processing, and may return the user to the previous screen. If the touch event is in the vicinity of the waveform, display module provides the audio to ASR module to perform speech to text conversion and the text provided by ASR module is directed to NLP engine to determine the intent of the user. In one embodiment, touching any part of the lower area other than in the vicinity of "X" terminates the microphone and the query is processed by ASR and the NLP engine.

Figure 53:
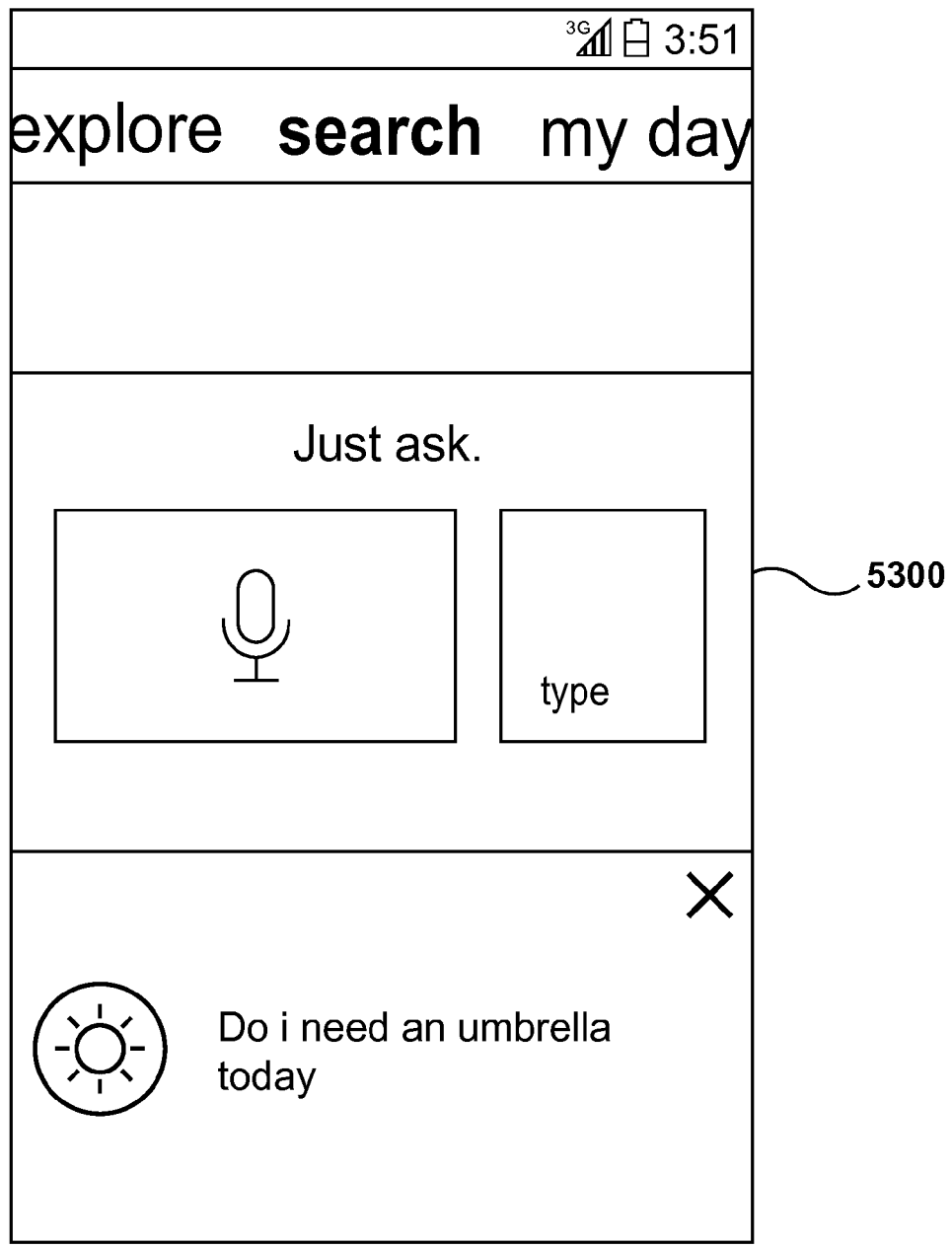

FIG. 53 shows an exemplary user interface screen 5300. As shown, the command uttered by the user has been converted to text, specifically to "Do I need an umbrella today". A user can terminate the action and return to the previous screen by pressing in the vicinity of the "X" button. Note that the lower area is colored in blue which is the color assigned to weather functionality. The color allows the user to verify the classification of the query at a glance and to cancel processing if the query is incorrectly classified or for another reason. The colors may be changed by interacting with a settings screen, and the preferences will be saved to a user preferences file or database 4520.

While various embodiments have been described above, it should be understood that they have been presented by way of example only, and not limitation. For example, any of the any of the elements associated with conversational system 300, intelligent services engine 150, and application 201 may employ any of the desired functionality set forth hereinabove. Furthermore, in various embodiments the conversational system 300, intelligent services engine 150 and application 201 may have more components or less components than described herein to employ the desired functionality set forth herein. Thus, the breadth and scope of a preferred embodiment should not be limited by any of the above-described embodiment.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more intermediaries.

What is claimed is:

1. A computer-implemented method for making a voice input to a computing device, the voice input for instructing the computing device to perform at least one task, the method being performed by one or more processors of the computing device and comprising:
   receiving at the computing device one or more user inputs to display a voice input interface;
   displaying the voice input interface;
   receiving the voice input at the voice input interface;
   providing the voice input to an automatic speech recognition engine for processing the voice input and producing a text representation of the voice input;
   displaying the text representation of the voice input on the voice input interface, wherein the voice input interface is configured to process the text representation and further configured to allow a user to modify the text representation before a results screen is displayed to the user; and
   displaying a progress representation on the voice input interface,
   wherein the voice input interface is configured to allow the user to modify the text representation to generate a modified text representation after processing, and
   wherein processing the modified text representation includes performing natural language processing on the modified text representation to identify at least one domain, the at least one task, and at least one parameter to which the modified text representation relates.

2. The method of claim 1, wherein the voice input interface is configured to allow the user to cancel the processing of the text representation while the progress representation is being displayed.

3. The method of claim 2, wherein the processing of the text representation comprises performing one or more commands.

4. The method of claim 1, wherein processing the modified text representation includes performing the at least one task.

5. A non-transitory computer readable storage medium for storing instructions for making a voice input to a computing device, the voice input for instructing the computing device to perform at least one task, the instructions when executed by a processor cause the processor to:
   display a voice input interface when one or more predetermined inputs is received by the computing device;
   receive the voice input uttered by a user at the voice input interface;
   provide the voice input to an automatic speech recognition engine for processing the voice input and for producing a text representation of the voice input;
   display the text representation of the voice input on the voice input interface, wherein the voice input interface is configured to process the text representation and further configured to allow the user to modify the text representation before a results screen is displayed to the user; and
   display a progress representation on the voice input interface,
   wherein the voice input interface is configured to allow the user to modify the text representation to generate a modified text representation after processing, and
   wherein processing the modified text representation includes performing natural language processing on the modified text representation to identify at least one domain, the at least one task, and at least one parameter to which the modified text representation relates.

6. A system for making a voice input to a computing device, the voice input for instructing the computing device to perform at least one task, the system including at least one computer processor and comprising:
   a voice input interface configured to receive the voice input uttered by a user;
   a user interface for receiving at the computing device, one or more user inputs to display the voice input interface; and
   an automatic speech recognition engine for processing the voice input and producing a text representation of the voice input,
   the voice input interface further configured to display the text representation of the voice input on the voice input user interface and display a progress representation on the voice input user interface,
   wherein the voice input user interface is configured to process the text representation and is configured to allow the user to modify the text representation before a results screen is displayed to the user,
   wherein the voice input interface is configured to allow the user to modify the text representation to generate a modified text representation after processing, and
   wherein the voice input interface is configured to process the modified text representation by performing natural language processing on the modified text representation to identify at least one domain, the at least one task, and at least one parameter to which the modified text representation relates.

7. The system of claim 6, wherein the voice input interface is configured to allow the user to cancel the processing of the text representation while the progress representation is being displayed.

8. The system of claim 7, wherein the voice input interface is configured to process of the text representation by performing one or more commands.

9. The system of claim 6, wherein the voice input interface is configured to process the modified text representation by performing the at least one task.

* * * * *